United States Patent
Shinohara et al.

(10) Patent No.: US 8,638,390 B2
(45) Date of Patent: Jan. 28, 2014

(54) CAMERA BODY AND IMAGING APPARATUS INCLUDING AN UNLOCKING MECHANISM

(75) Inventors: Junichi Shinohara, Yokohama (JP); Ryota Kaga, Tokyo (JP); Takashi Tada, Kawasaki (JP); Shu Kambe, Fujisawa (JP)

(73) Assignee: Ricoh Company, Ltd., Tokyo (JP)

( * ) Notice: Subject to any disclaimer, the term of this patent is extended or adjusted under 35 U.S.C. 154(b) by 471 days.

(21) Appl. No.: 12/938,753

(22) Filed: Nov. 3, 2010

(65) Prior Publication Data
US 2011/0109790 A1 May 12, 2011

(30) Foreign Application Priority Data
Nov. 9, 2009 (JP) ................................. 2009-255924

(51) Int. Cl.
*H04N 5/225* (2006.01)
(52) U.S. Cl.
USPC .......................................................... 348/373
(58) Field of Classification Search
USPC .............................. 348/373, 374, 375; 396/529
See application file for complete search history.

(56) References Cited

U.S. PATENT DOCUMENTS

| | | | | |
|---|---|---|---|---|
| 5,844,604 | A | * | 12/1998 | Myeong .......................... 348/373 |
| 6,020,982 | A | | 2/2000 | Yamauchi et al. |
| 6,707,490 | B1 | | 3/2004 | Kido et al. |
| 7,253,839 | B2 | * | 8/2007 | Kato ................................ 348/373 |
| 7,259,923 | B2 | | 8/2007 | Nuno et al. |
| 7,280,147 | B2 | | 10/2007 | Kitajima et al. |
| 7,286,164 | B2 | | 10/2007 | Shinohara et al. |
| 7,477,454 | B2 | | 1/2009 | Shinohara et al. |
| 7,505,216 | B2 | | 3/2009 | Nuno |
| 7,664,385 | B2 | | 2/2010 | Shinohara |

(Continued)

FOREIGN PATENT DOCUMENTS

| | | |
|---|---|---|
| CN | 1337519 A | 2/2002 |
| CN | 101498881 A | 8/2009 |

(Continued)

OTHER PUBLICATIONS

U.S. Appl. No. 12/916,948, filed Nov. 1, 2010, Kaga, et al.

(Continued)

*Primary Examiner* — Gary C Vieaux
(74) *Attorney, Agent, or Firm* — Oblon, Spivak, McClelland, Maier & Neustadt, L.L.P.

(57) ABSTRACT

A camera body to which an image pickup unit including an optical system, an image pickup device, and an image-pickup-unit connector is detachably attached, includes a recess to which the image pickup unit is freely detachably attached and which includes a back wall, an upper wall, and a side wall to be opened on a lower side, a lateral side, and a front side of the camera body. The back wall faces a rear of the image pickup unit, the upper wall is located on an upper side of the camera body in a normal use state. The camera body includes a locking mechanism to control a movement of the image pickup unit placed in the recess in a direction in which the image pickup unit moves away from the side wall, a first unlocking mechanism provided to be exposed from the camera body and configured to unlock a locked state made by the locking mechanism in response to an unlocking manipulation, and a second unlocking mechanism provided to be enclosed inside the camera body and configured to unlock the locked state made by the locking mechanism in response to an unlocking manipulation.

14 Claims, 53 Drawing Sheets

(56) References Cited

U.S. PATENT DOCUMENTS

| | | |
|---|---|---|
| 7,683,939 B2 | 3/2010 | Shinohara et al. |
| 7,738,031 B2 | 6/2010 | Shinohara |
| 8,456,569 B2 * | 6/2013 | Kaga et al. .................. 348/374 |
| 2002/0089678 A1 | 7/2002 | Aoto et al. |
| 2005/0200737 A1 | 9/2005 | Shinohara et al. |
| 2007/0086772 A1 | 4/2007 | Shinohara |
| 2007/0248356 A1 | 10/2007 | Toji |
| 2008/0218622 A1 | 9/2008 | Shinohara |
| 2009/0067826 A1 | 3/2009 | Shinohara et al. |
| 2009/0190288 A1 | 7/2009 | Tanabe et al. |
| 2011/0216237 A1 | 9/2011 | Shinohara et al. |

FOREIGN PATENT DOCUMENTS

| | | |
|---|---|---|
| JP | 8-201899 A | 8/1996 |
| JP | 10-228055 A | 8/1998 |
| JP | 2000-10166 | 1/2000 |
| JP | 2000-19594 A | 1/2000 |
| JP | 2004-133043 | 4/2004 |
| JP | 2004-193771 | 7/2004 |
| JP | 2005-189474 A | 7/2005 |
| JP | 2005-354177 | 12/2005 |
| JP | 2006-186453 A | 7/2006 |
| JP | 2006-317710 | 11/2006 |
| JP | 2007-174040 | 7/2007 |
| JP | 2008-276078 | 11/2008 |
| JP | 2008-276079 | 11/2008 |
| JP | 2011-78073 | 4/2011 |
| WO | WO 2010/061960 A1 | 6/2010 |
| WO | WO 2010061960 A1 * | 6/2010 |

OTHER PUBLICATIONS

Office Action issued Jan. 23, 2013 in Chinese Patent Application No. 201010624982.3 (with English translaiton).

* cited by examiner

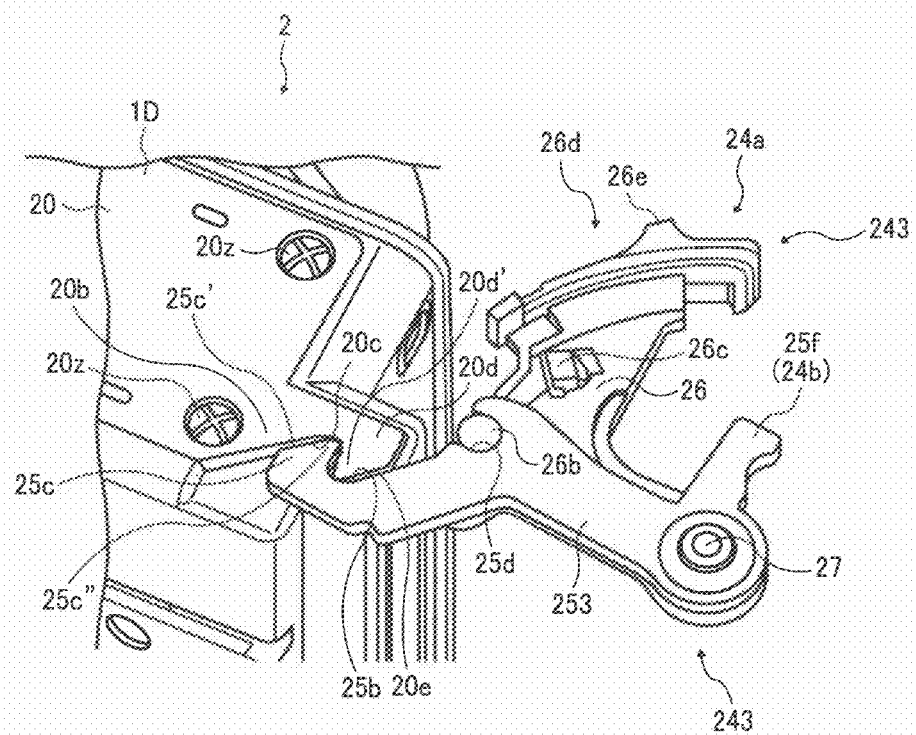
FIG. 41
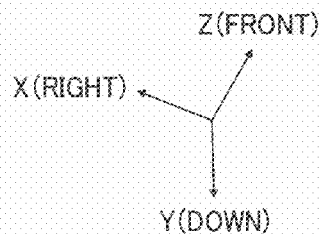

CAMERA BODY AND IMAGING APPARATUS INCLUDING AN UNLOCKING MECHANISM

CROSS REFERENCE TO RELATED APPLICATIONS

The present application is based on and claims priority from Japanese Application Number 2009-255924, filed on Nov. 9, 2009, the disclosure of which is hereby incorporated by reference herein in its entirety.

BACKGROUND OF THE INVENTION

1. Field of the Invention

The present invention relates to improvements of a camera body which an image pickup unit is attached to or detached from, and an imaging apparatus including a combination of the image pickup unit and the camera body.

2. Description of the Related Art

Conventionally, an imaging apparatus in which an image pickup unit is detachably attachable to a camera body has been known (see Japanese Patent Application Publication No. 2005-354177, for example).

In this conventional imaging apparatus, a camera body has a housing recess to which an image pickup unit is detachably attached to be housed therein. The housing recess includes a back wall section (rear part), and includes an upper wall section (upper surface part), a lower wall section (lower surface part) and a side wall section (side surface part) which are integrally formed with the back wall section. In the camera body, an attachment/detachment opening is provided on the side far from the side wall section, the attachment/detachment opening being formed of the back wall section, the upper wall section, and the lower wall section.

In the conventional imaging apparatus, the image pickup unit is housed in the camera body by placing the image pickup unit in front of the attachment/detachment opening and pushing the image pickup unit toward the side wall section along the back wall section. On the other hand, the image pickup unit is removed from the camera body by pulling the image pickup unit out in a direction away from the side wall section along the back wall section.

Although the conventional imaging apparatus allows an image pickup unit to be detached from the camera body in response to manipulation on a manipulating section (for example, an eject button) for detaching the image pickup unit, there is a possibility that the image pickup unit cannot be detached from the camera body in a situation where the manipulating section is inoperable.

SUMMARY OF THE INVENTION

The present invention has been made in light of the circumstances described above, and an object of the present invention is to provide a camera body and an imaging apparatus which allow an image pickup unit to be detached from the camera body even in a situation where a manipulating section for detaching the image pickup unit is inoperable.

To achieve the above object, a camera body according to an embodiment of the present invention, to which an image pickup unit is detachably attached, the image pickup unit including an optical system configured to guide light incoming from a subject, an image pickup device configured to convert a subject image formed by light guided by the optical system into an electrical signal, and an image-pickup-unit connector section configured to perform communication with outside, includes a recess to which the image pickup unit is freely detachably attached and which includes a back wall section, an upper wall section, and a side wall section to be opened on a lower side, a lateral side, and a front side of the camera body, the back wall section facing a rear of the image pickup unit when viewed from the image-pickup-unit side, the upper wall section being connected to the back wall section and located on an upper side of the camera body in a normal use state, and the side wall section being connected to the back wall section and the upper wall section. The camera body includes a locking mechanism configured to control a movement of the image pickup unit placed in the recess in a direction in which the image pickup unit moves away from the side wall section, a first unlocking mechanism provided to be exposed from the camera body and configured to unlock a locked state made by the locking mechanism in response to an unlocking manipulation, and a second unlocking mechanism provided to be enclosed inside the camera body and configured to unlock the locked state made by the locking mechanism in response to an unlocking manipulation.

BRIEF DESCRIPTION OF THE DRAWINGS

FIG. 41 is an explanatory diagram explaining a configuration of a locking mechanism according to an embodiment similarly to FIG. 37.

DETAILED DESCRIPTION OF THE PREFERRED EMBODIMENTS

Hereinafter, preferred embodiments of this invention will be described in detail based on the drawings.

Figure 4:
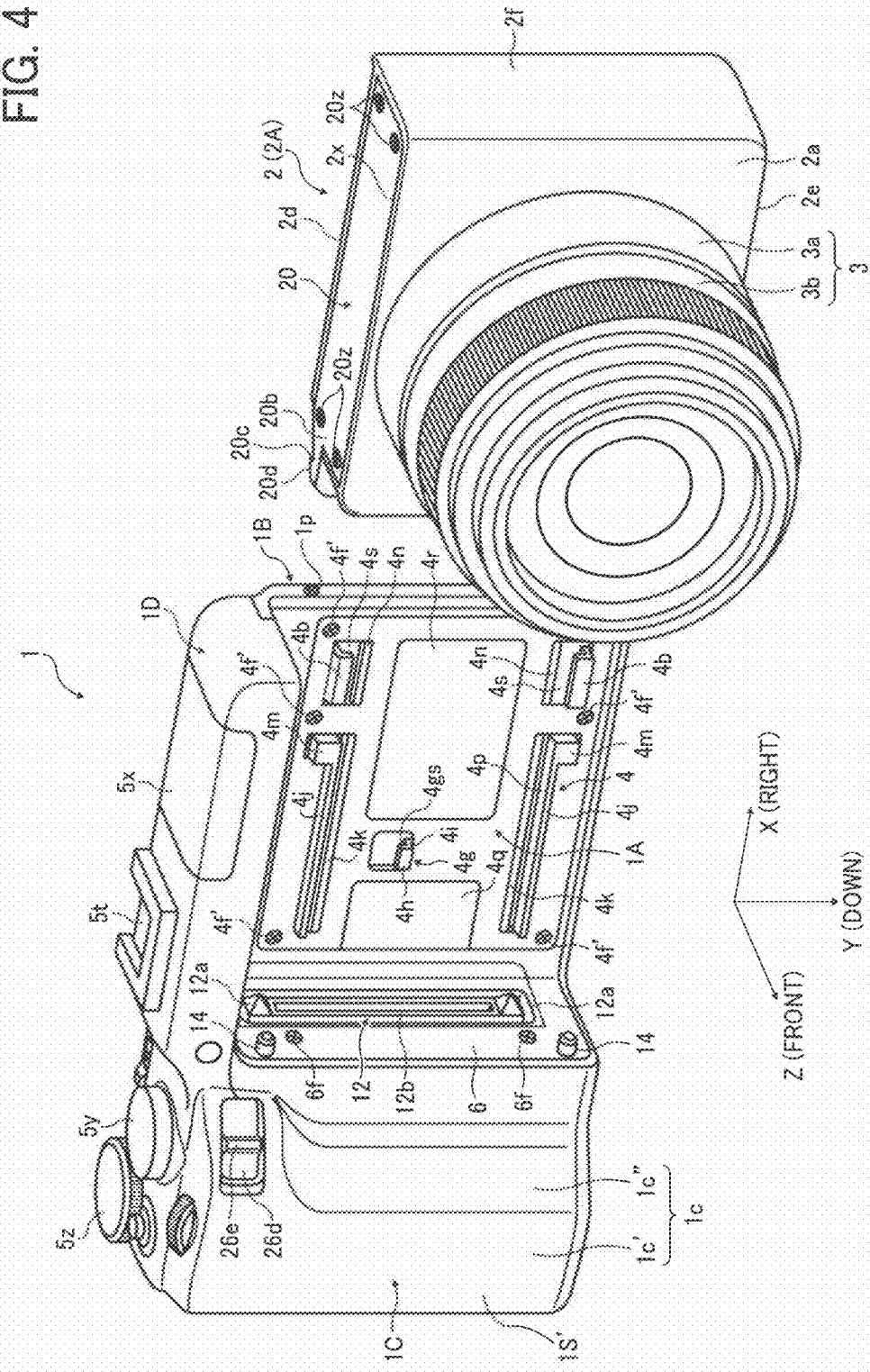
FIG. 4 is an explanatory diagram showing a state before the image pickup unit is attached to the camera body shown in FIG. 1 or a state after the image pickup unit is pulled out of the camera body, and a view of the camera body and the image pickup unit according to an embodiment of the present invention as viewed from the front side and from a right oblique direction.
Figure 37:
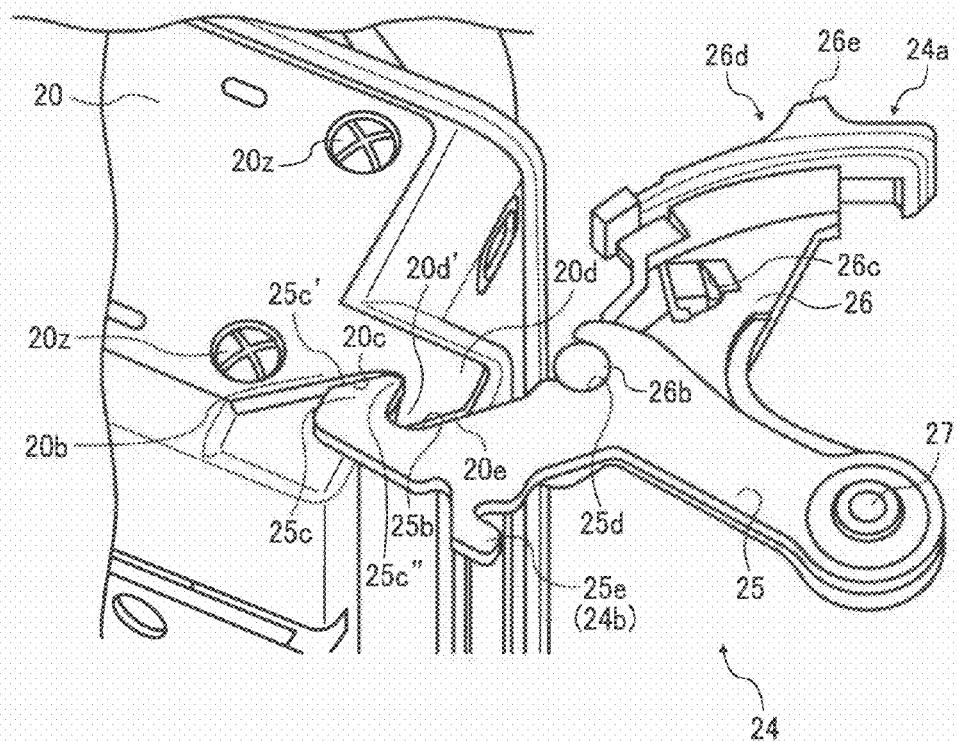
FIG. 37 is an explanatory diagram showing a locking mechanism in a locked state.
Figure 37:
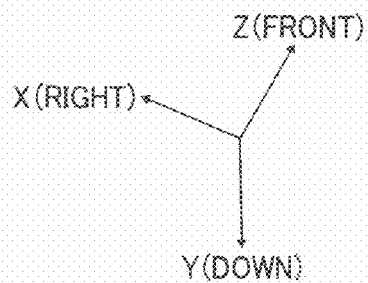

As shown in, for example, FIG. 4, a camera body 1 according to an embodiment of the present invention, to which an image pickup unit 2 including an optical system configured to guide light incoming from a subject, an image pickup device configured to convert a subject image formed by light guided by the optical system into an electrical signal, and an image-pickup-unit connector section 11 configured to perform communication with outside is detachably attached, includes a recess 1A to which the image pickup unit 2 is freely detachably attached and which includes a back wall section 1B, an upper wall section 1D, and a side wall section 1C to be opened on a lower side, a lateral side, and a front side of the camera body, the back wall section 1B facing a rear of the image pickup unit when viewed from the image-pickup-unit side, the upper wall section 1D being connected to the back wall section and located on an upper side of the camera body in a normal use state, and the side wall section 1C being connected to the back wall section and the upper wall section. As shown in, for example, FIG. 5C, the camera body includes a locking mechanism 24 configured to control a movement of the image pickup unit 2 placed in the recess 1A in a direction in which the image pickup unit 2 moves away from the side wall section, a first unlocking mechanism 24a provided to be exposed from the camera body and configured to unlock a locked state made by the locking mechanism in response to an unlocking manipulation and a second unlocking mechanism 24b provided to be enclosed inside the camera body and configured to unlock the locked state made by the locking mechanism in response to an unlocking manipulation (see, for example, FIG. 37).

[Embodiment 1]
(Outline Description of Camera Body 1 and Image Pickup Unit 2)

Figure 1:
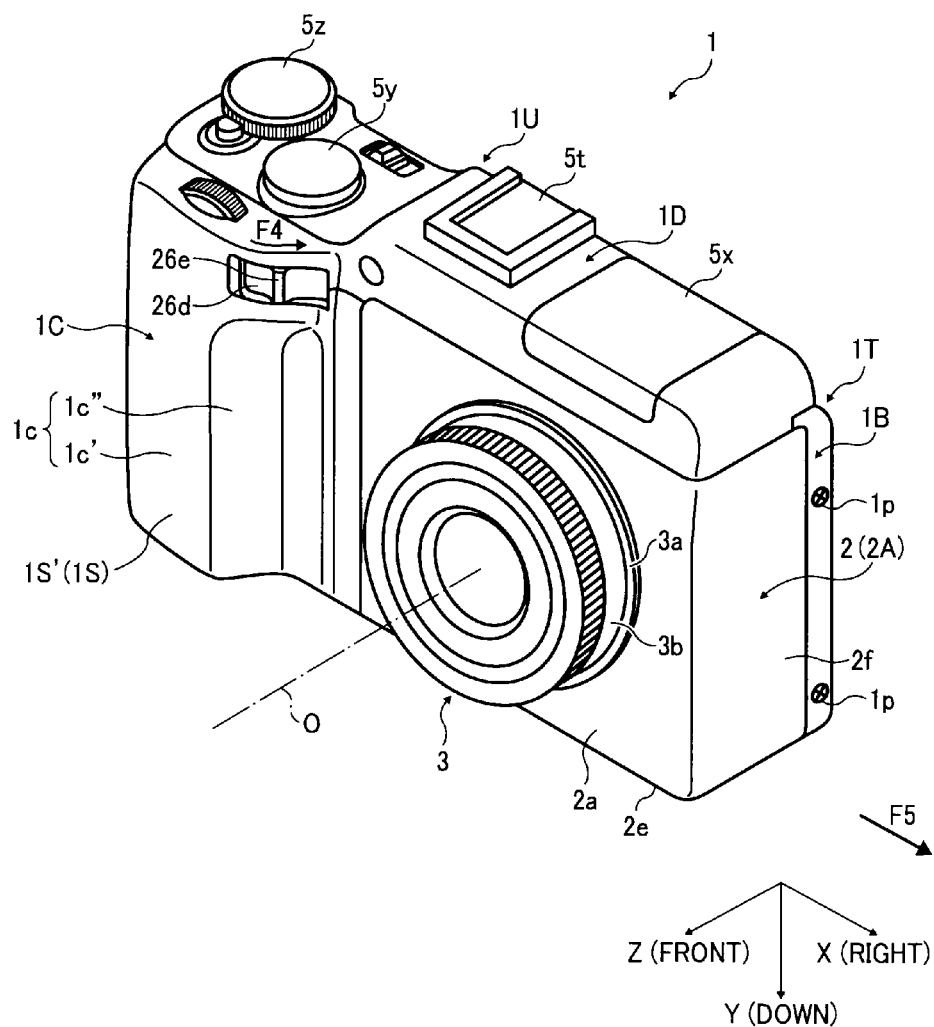
FIG. 1 is an explanatory diagram showing a state where a camera body and an image pickup unit according to an embodiment of the present invention are attached to each other, and an external view of an imaging apparatus including the camera body and the image pickup unit as viewed from a front oblique direction.
Figure 2:
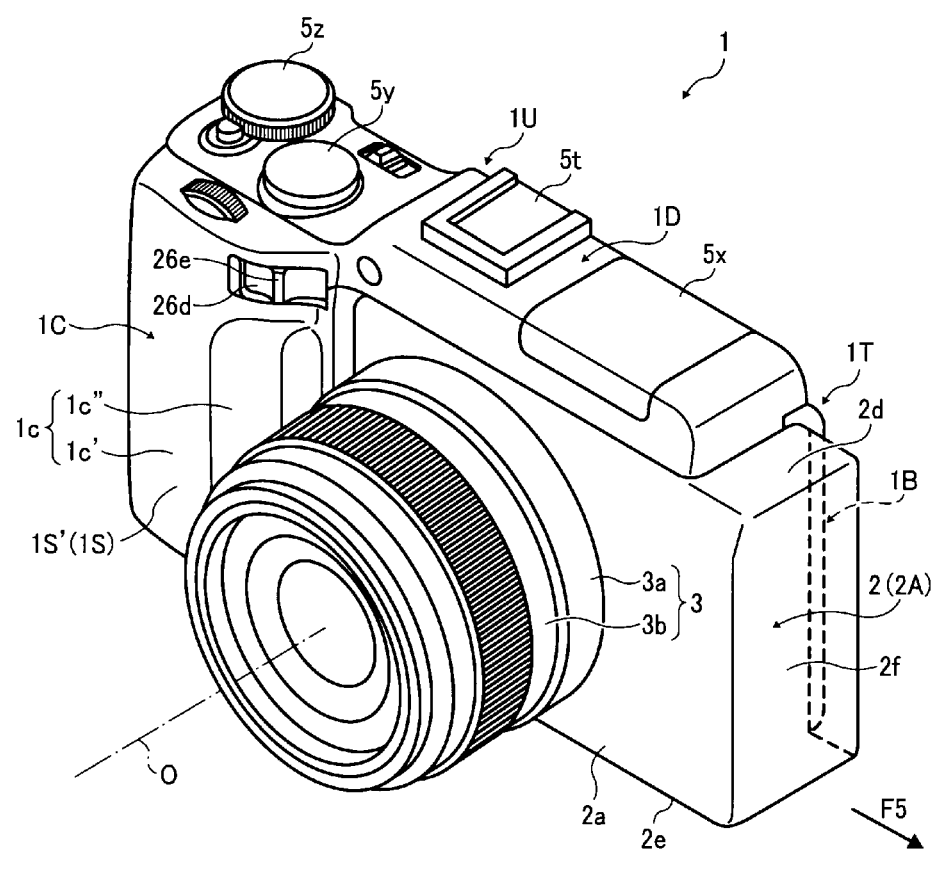
FIG. 2 is an explanatory diagram showing a state where an image pickup unit different from the image pickup unit shown in FIG. 1 is attached to the camera body according to an embodiment of the present invention and an external view of an imaging apparatus including the camera body and the image pickup unit as viewed from a front oblique direction.
Figure 2:
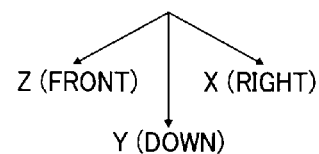
Figure 3A:
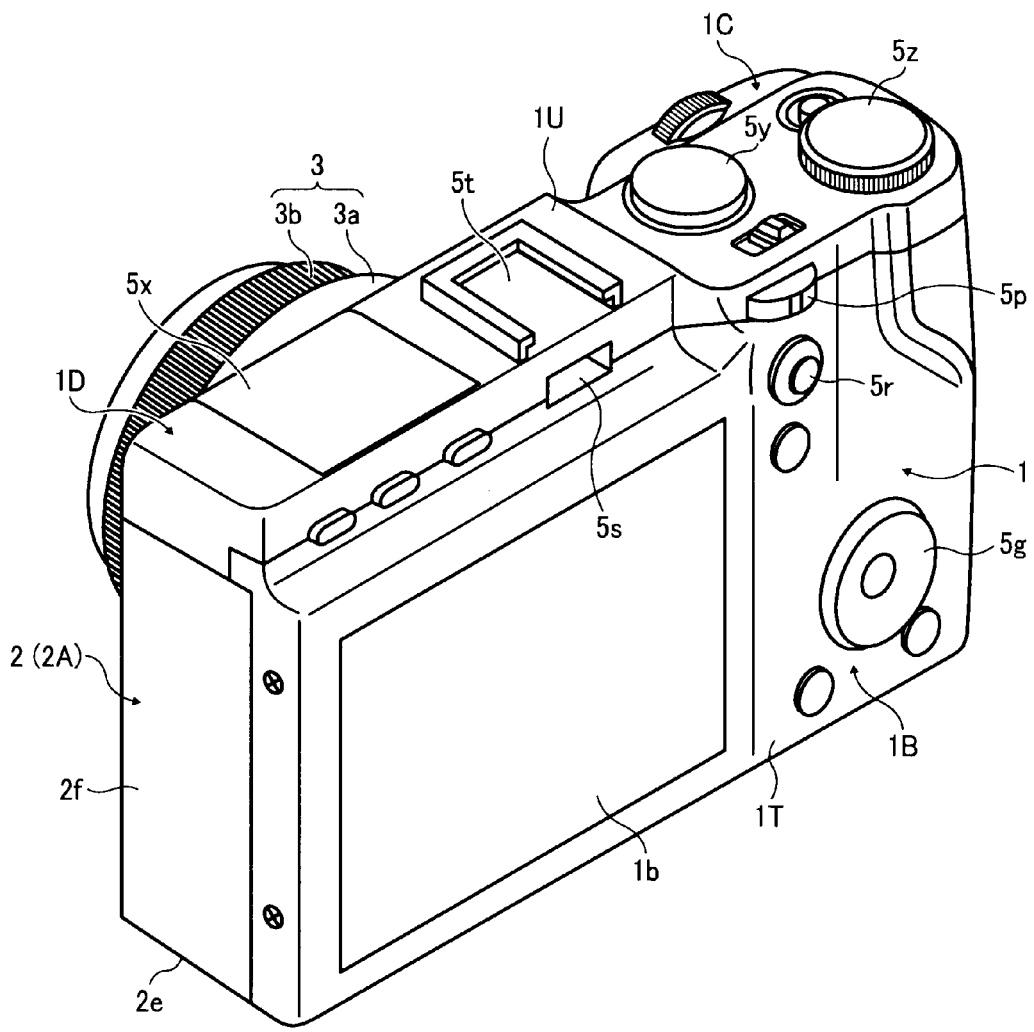
FIG. 3A is an external view of the image pickup unit shown in FIG. 1 as viewed from the rear (diagonally upward right) side.
Figure 3A:
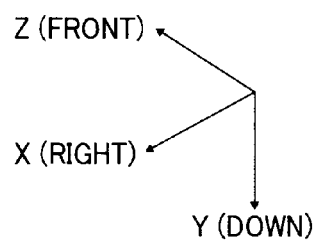
Figure 3B:
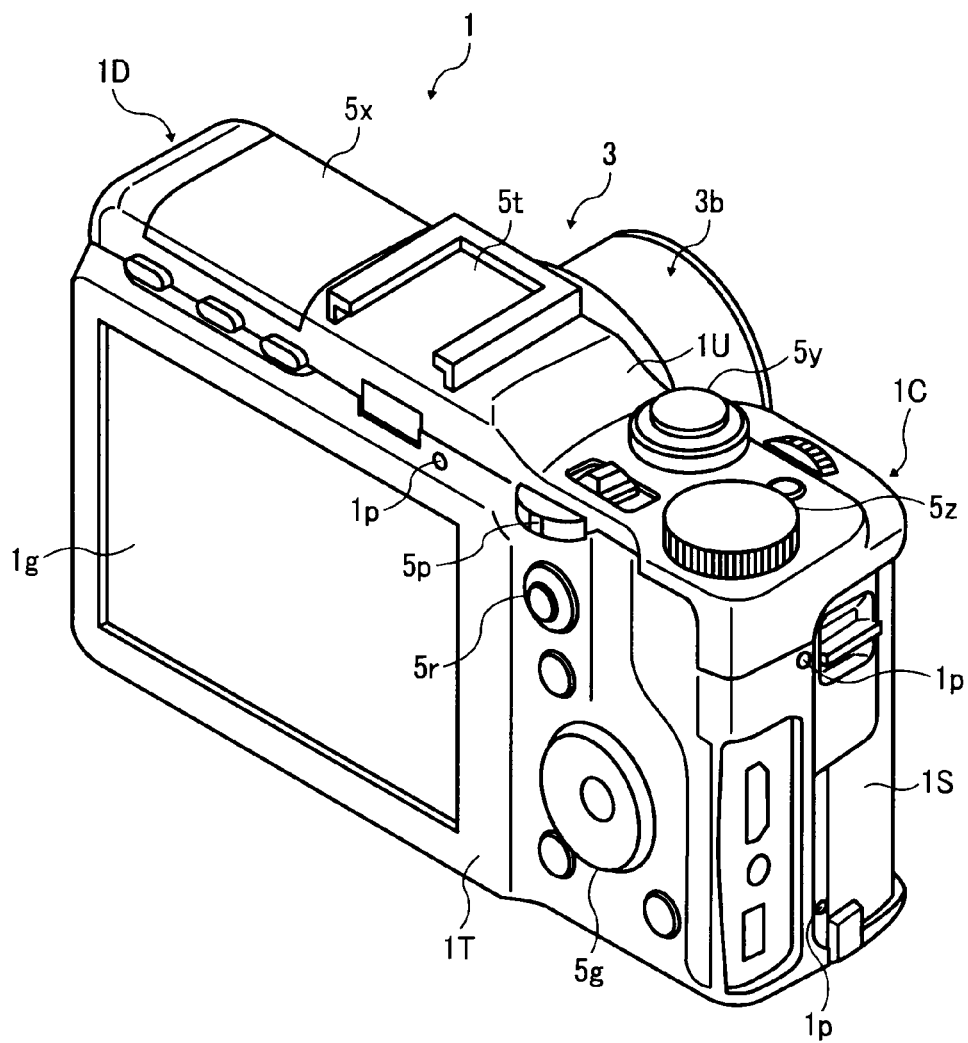
FIG. 3B is an external view of the image pickup unit shown in FIG. 1 as viewed from the rear (diagonally upward left) side.
Figure 3B:
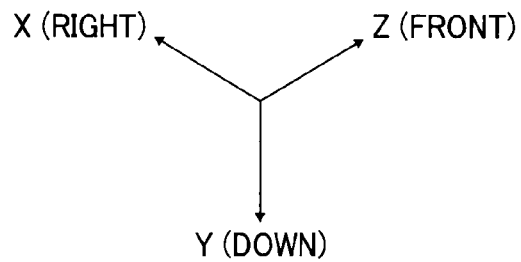
Figure 3C:
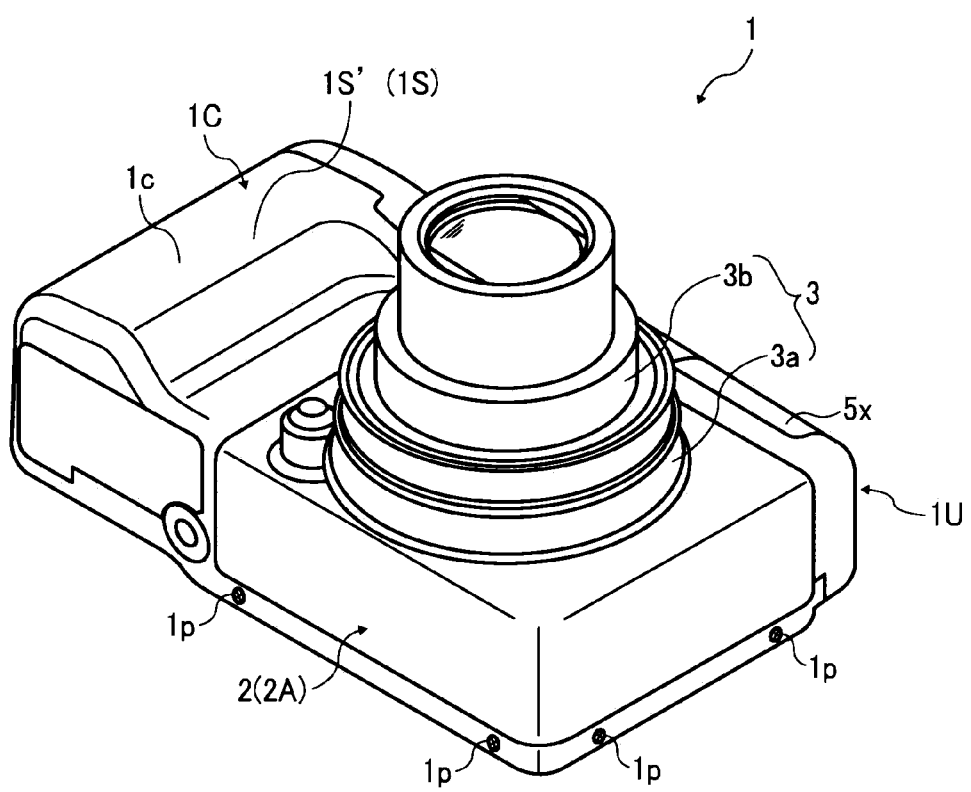
FIG. 3C is an external view of the image pickup unit shown in FIG. 1 as viewed from the rear (diagonally forward right) side.
Figure 3C:
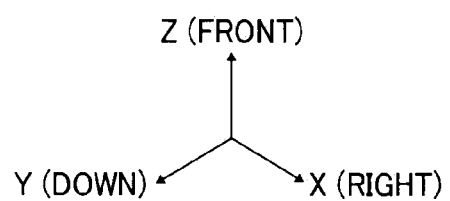

FIGS. 1 to 3C show a state where an image pickup unit having a cuboid shaped housing according to an embodiment of the present invention is attached to a camera body. FIGS. 1 and 2 show the camera body which the image pickup unit is attached to and which is viewed from a front oblique direction, FIG. 3A shows the camera body in FIG. 1 viewed from a rear right oblique direction, FIG. 3B shows the camera body in FIG. 1 viewed from a rear left oblique direction, and FIG. 3C shows the camera body in FIG. 1 viewed from a lower right oblique direction.

In FIGS. 1 to 3C, numeral 1 designates the camera body and 2 the image pickup unit. The image pickup unit 2 has a cuboid-shaped housing 2A. Here, the image pickup unit 2 includes an interchangeable lens barrel unit which includes an image pickup optical system and an image pickup device. FIG. 2 shows a state where an image pickup unit 2 having a housing 2A that has different size from the image pickup unit 2 attached to the camera body 1 shown in FIG. 1 is attached to the camera body 1.

The size of an image pickup device placed inside the housing 2A of the image pickup unit 2 shown in FIG. 2 is different from that of an image pickup device placed inside the housing 2A of the image pickup unit 2 shown in FIG. 1.

That housing 2A has a lens barrel 3 on its front face 2a. As shown in FIG. 4, the image pickup unit 2 can be attached to and detached from the camera body 1. FIG. 4 shows a state where the image pickup unit 2 shown in FIG. 1 is pulled out of the camera body shown in FIG. 1.

As shown in FIGS. 1, 2, and 4, the lens barrel 3 includes a guiding cylinder 3a and a movable barrel 3b. The movable barrel 3b is placed on the guiding cylinder 3a so that the movable barrel 3b can advance or retreat in a direction in which an optical axis O extends. A lens system such as zoom lens or the like is provided on the movable barrel 3b. The image pickup optical system including the lens system directs light incoming from a subject to the image pickup device, and the subject image is formed on the image pickup device which converts incident light into an electrical signal.

The Z direction in FIG. 1 is a direction parallel to an optical axis direction of the image pickup optical system (lens system) of the lens barrel 3 with the image pickup unit 2 attached to the camera body 1, and referred to as a front-back direction in the first embodiment. A positive side of the Z direction is the front face side of the camera (front side) and a negative side of the Z direction is a rear side (back side) of the camera.

The X direction in FIG. 1 is a direction perpendicular to the optical axis direction of the image pickup optical system (lens system) of the lens barrel 3 with the image pickup unit 2 attached to the camera body 1, and referred to as a left-right direction in the first embodiment. A positive side of the X direction is right side and a negative side of the X direction is left side.

The Y direction in FIG. 1 is a direction perpendicular to the optical axis direction of the image pickup optical system (lens system) of the lens barrel 3 with the image pickup unit 2 attached to the camera body 1, and referred to as an up-down direction in the first embodiment. A positive side of the Y direction is a lower side and a negative side of the Y direction is an upper side.

(Detailed Description of Camera Body 1)

Figure 5A:
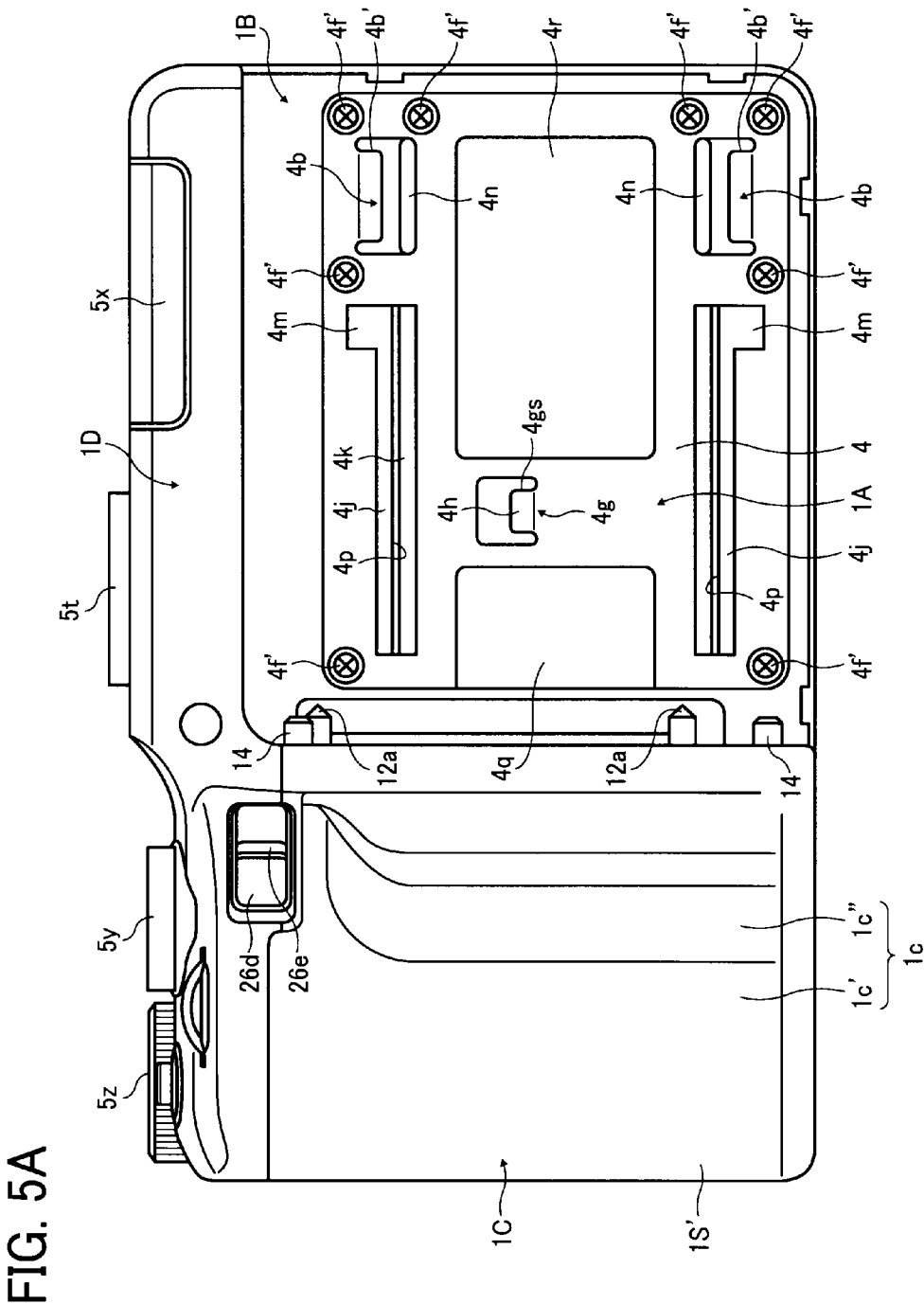
FIG. 5A is a view of the camera body shown in FIG. 4 as viewed from the front face side.
Figure 5B:
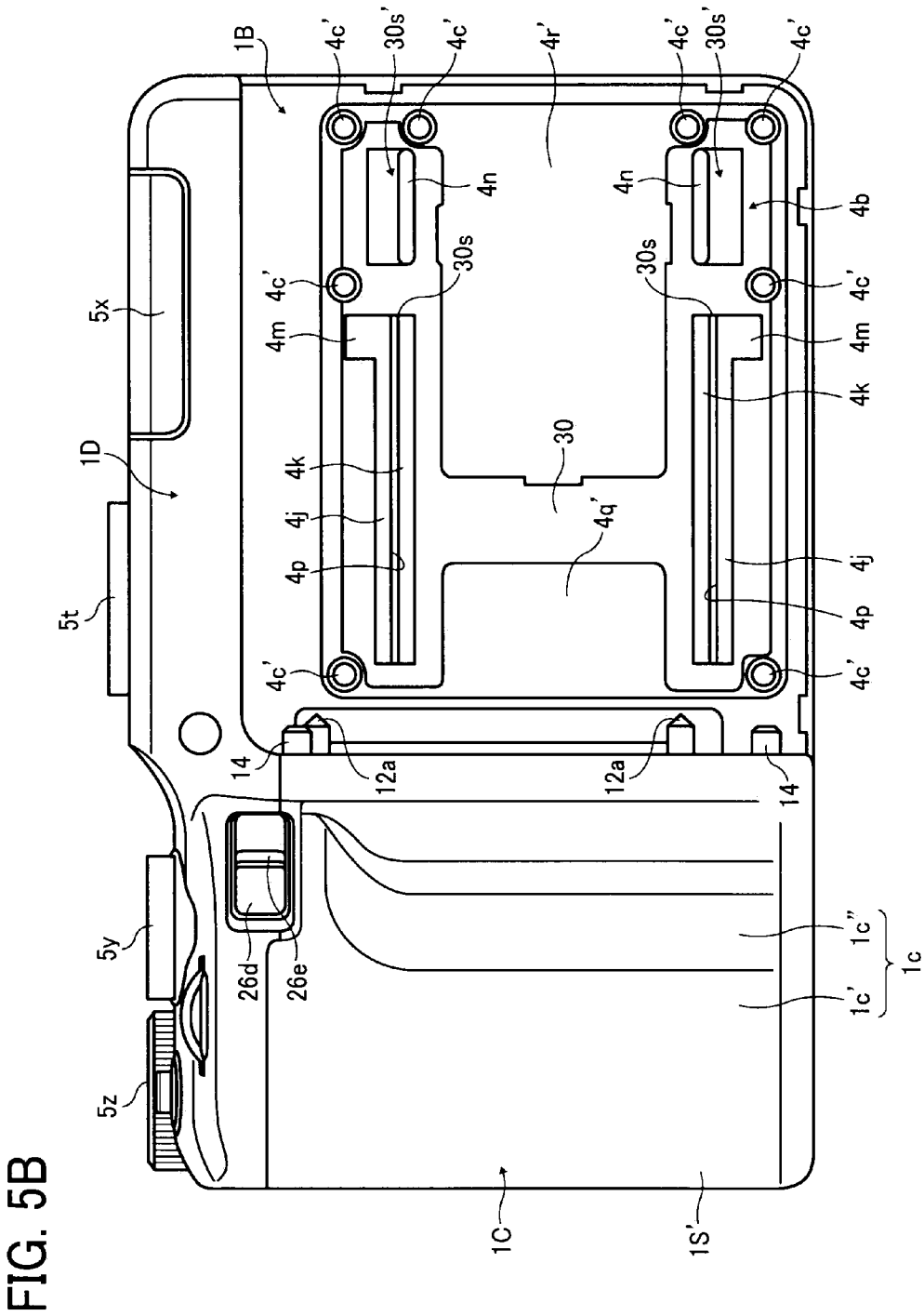
FIG. 5B is a view of the camera body from which a rear wall reinforcing sheet metal member for body shown in FIG. 5A is removed, as viewed from the front face side.

As shown in FIGS. 4 to 5B, the camera body 1 has a recess 1A as a space in which the housing 2A is placed. The recess 1A is formed of three wall sections of a back wall section 1B or a back surface section, a side wall section 1C or a side surface section, and an upper wall section 1D or an upper surface section which are made of resin. The back wall section 1B and the side wall section 1C are orthogonal to each other. The upper wall section 1D is orthogonal to the both wall sections 1B, 1C.

When the image pickup unit 2 is attached to the recess 1A and this image pickup unit 2 is viewed from a front face, that is to say, a subject side in the optical axis direction of the optical system, a rear part 2b (see FIG. 6) of the housing 2A faces the back wall section 1B. When the image pickup unit 2 is attached to the recess 1A and the image pickup unit 2 is viewed from the front face, a left side surface 2c of the housing 2A shown in FIG. 8 faces the side wall section 1C. When the image pickup unit 2 is placed in the recess 1A and the image pickup unit 2 is viewed from the front face, an upper surface 2d of the housing 2A faces the upper wall section 1D.

The back wall section 1B, the side wall section 1C and the upper wall section 1D are integrally formed. The recess 1A has its outline shape defined by a rear wall surface (XY plane) of the back wall section 1B, a side wall surface (YZ plane) of the side wall section 1C and an upper wall surface (ZX plane) of the upper wall section 1D. Hereinafter, each of the wall surfaces which define the outline shape is referred to as a constituting wall surface which constitutes the recess 1A. When the housing 2A is placed, the recess 1A is opened to a downward direction (Y direction) in which a lower surface 2e of the housing 2A is located, a right lateral direction (X direction) in which a right side surface 2f of the housing 2A is located, and a forward direction (Z direction) in which the front face 2a of the housing 2A is located.

Note that the X direction is also referred to as a first direction in which the image pickup unit 2 moves toward or away from the side wall section 1C, and the Y direction is referred to as a vertical direction (Y direction) to the first direction.

Manipulating sections for electrically manipulating the camera body 1 and the image pickup unit 2 are provided at appropriate positions on the back wall section 1B, the side wall section 1C and the upper wall section 1D. In the first embodiment, as shown in FIGS. 1 to 4, a release button 5y and a dial 5z, for example, are provided as the manipulating sections on the upper wall section 1D. In addition, a popup type strobe device 5x and a hot shoe section 5t are provided on the upper wall section 1D. In addition, an ADJ lever 5p, a direction instruction switch 5q, a replay switch 5r, and so on are provided as the manipulating sections on the back wall section 1B. As shown in FIG. 3A, an electronic viewfinder connection terminal 5s is provided on the back wall section 1B. An electronic viewfinder device (not shown) is connected to the electronic viewfinder connection terminal 5s.

Figure 7A:
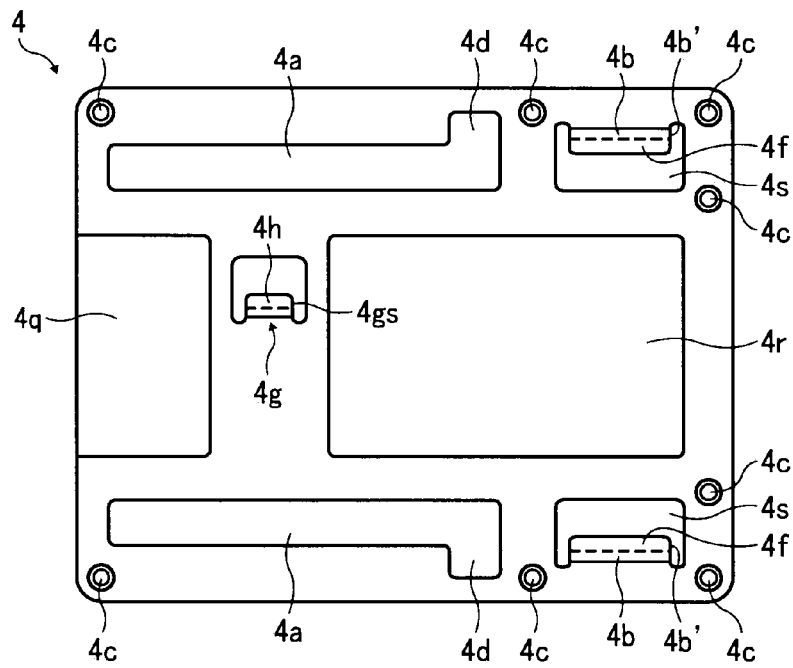
FIG. 7A is a plan view of the rear wall reinforcing sheet metal member for body shown in FIG. 5A and a front face view thereof.
Figure 7B:
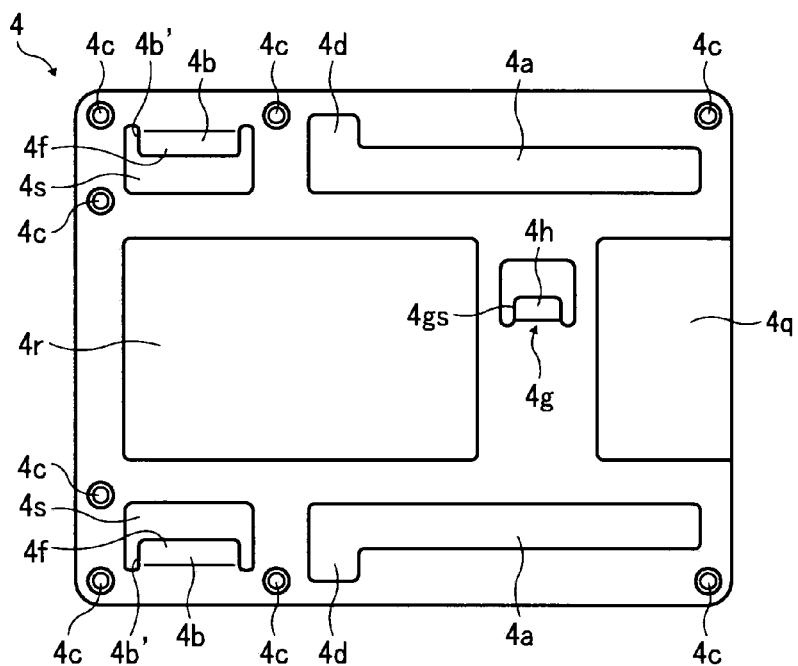
FIG. 7B is a plan view of the rear wall reinforcing sheet metal member for body shown in FIG. 7A and a backside view thereof.
Figure 7C:
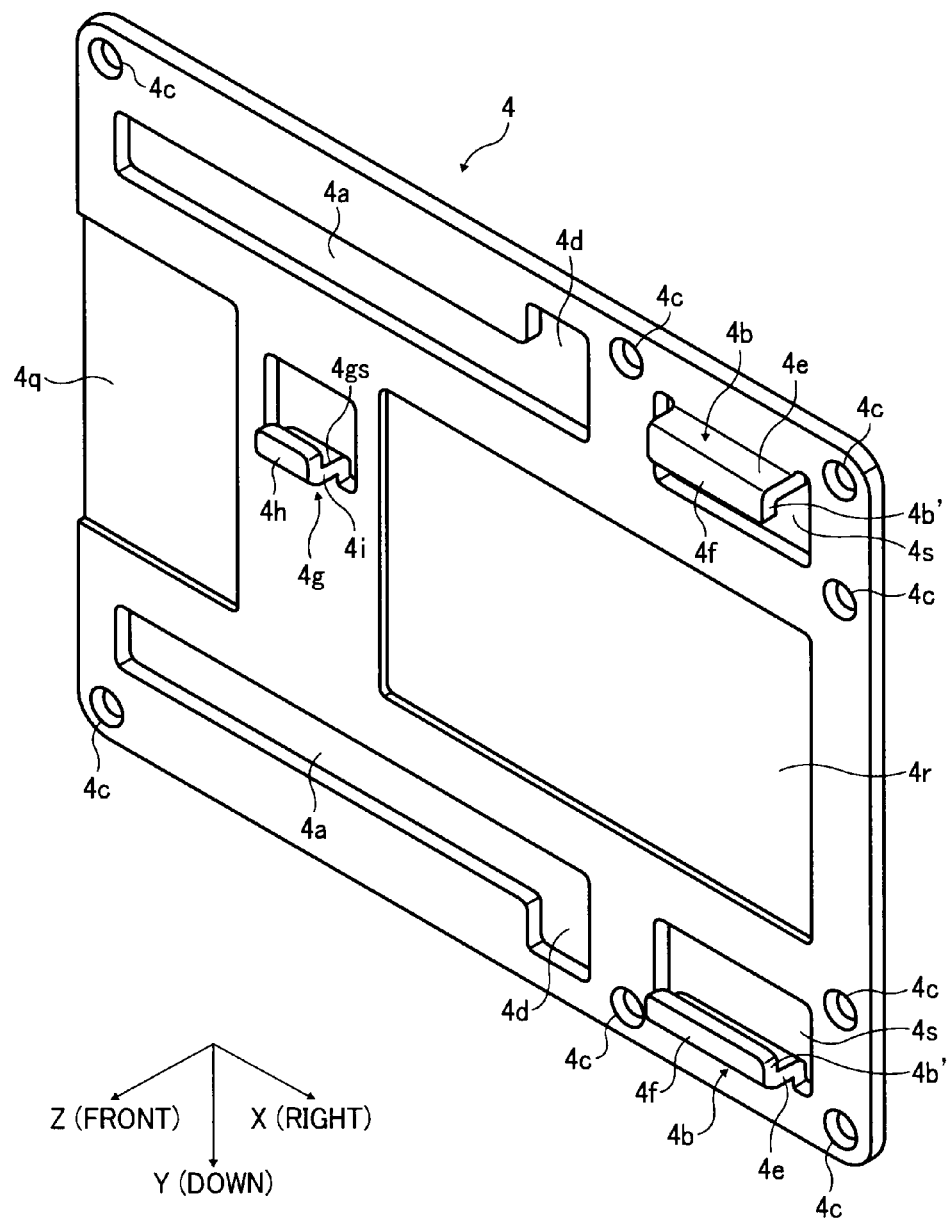
FIG. 7C is a perspective view of the rear wall reinforcing sheet metal member for body shown in FIGS. 7A and 7B.

As shown in FIG. 5A, and FIGS. 7A to 7C, on the back wall section 1B, a rear wall surface reinforcing sheet metal member for body 4 is provided as a rear surface wall. FIGS. 7A to 7C show the rear wall surface reinforcing sheet metal member for body 4 which has been removed from the back wall section 1B. When the image pickup unit 2 is set to the camera body 1, the rear part 2b thereof faces the rear wall surface reinforcing sheet metal member for body 4.

The rear wall surface reinforcing sheet metal member for body 4 has an almost rectangular outline. This rear wall surface reinforcing sheet metal member for body 4 is molded by pressing, for example. As enlarged and shown in FIGS. 7A to 7C, this rear wall surface reinforcing sheet metal member for body 4 has paired insertion openings 4a, 4a, paired engaging claws 4b, 4b which also serve as an biasing section to be described later, and screw holes 4c.

In addition, the biasing section includes a first biasing section and a second biasing section, and any one of the paired engaging claws 4b, 4b is referred to as a first engaging claw and any other one a second engaging claw.

The paired insertion openings 4a, 4a are formed at an interval in a vertical direction (up-down direction) and extend in parallel to each other in a horizontal direction (left-right direction). Right ends of the paired insertion openings 4a, 4a are rectangular openings 4d, 4d. Rectangular stopper protrusions to be described later are fitted into the rectangular openings 4d, 4d.

The paired engaging claws 4b, 4b are placed at positions far away from the side wall section 1C and placed at an interval in a vertical direction (up-down direction). As enlarged and shown in FIG. 7C, the paired engaging claws 4b, 4b each include a cut and bent section 4e and an inflected plate section 4f. In the rear wall surface reinforcing sheet metal member for body 4, insertion openings 4s, 4s are formed at parts where the paired engaging claws 4b, 4b are formed.

On the rear wall surface reinforcing sheet metal member for body 4, an engaging protrusion 4g is formed at an almost middle position of the vertical direction (up-down direction) in which the insertion opening 4a and the insertion opening 4a are formed at an interval. The engaging protrusion 4g includes a cut and bent section 4i and an inflected section 4h. The engaging protrusion 4g serves a function to have later-described connector sections to fit into each other at appropriate posture and angle. This engaging protrusion 4g, detailed structure of which will be described later, is located at an almost center of the camera-body connector section 12 when it is viewed from a vertical direction (Y direction) to a first direction in which the image pickup unit 2 moves toward or away from the side wall section 1C.

FIG. 5B shows a state in which the rear wall surface reinforcing sheet metal member for body 4 is removed from the back wall section 1B. In the back wall section 1B formed is a recess in which a resin plate 30 is placed. On the resin plate 30, paired raised sections 30s are formed at parts facing the paired insertion openings 4a, 4a, and paired raised sections 30s' is formed at parts facing the paired insertion openings 4s, 4s. On the paired raised sections 30s, paired resin-made guiding protrusion sections 4j, 4j which extend in a left-right direction, and paired resin-made sliding contact ribs 4k, 4k are formed. Rectangular stopper protrusions 4m are formed at the right ends of the paired resin-made guiding protrusion sections 4j, 4j. On the paired raised sections 30s', sliding contact ribs 4n, 4n are formed, respectively. The paired raised sections 30s, 30s are located between the side wall section 1C and the paired raised sections 30s', 30s'.

In addition, the paired resin-made guiding protrusion sections 4j, 4j constitute a camera-body guiding mechanism, any one of the paired resin-made guiding protrusion sections 4j, 4j is referred to as a first guiding protrusion and any other one of the paired resin-made guiding protrusion sections 4j, 4j is referred to as a second guiding protrusion.

The camera-body guiding mechanism serves as a guiding mechanism which, in cooperation with an image-pickup-unit guiding mechanism to be described later, controls a positional relation of the camera-body connector section 12 to the image-pickup-unit connector section 11 and guides the image pickup unit 2 in a direction toward or away from the side wall section 1C.

The paired resin-made sliding contact ribs 4k, 4k and the paired resin-made sliding contact ribs 4n, 4n are placed at an interval in the left-right direction. The paired sliding contact ribs 4k, 4k are provided in parallel to and in proximity to or adjacent to the paired guiding protrusion sections 4j, 4j, respectively. In the paired guiding protrusion sections 4j, 4j, guide surfaces 4p, 4p are formed on the side where the paired sliding contact ribs 4k, 4k are placed. The guide surfaces 4p, 4p exist on a plane parallel to the XY plane. The cut and bent section 4i extends in a positive orientation of the Z direction.

Figure 6:
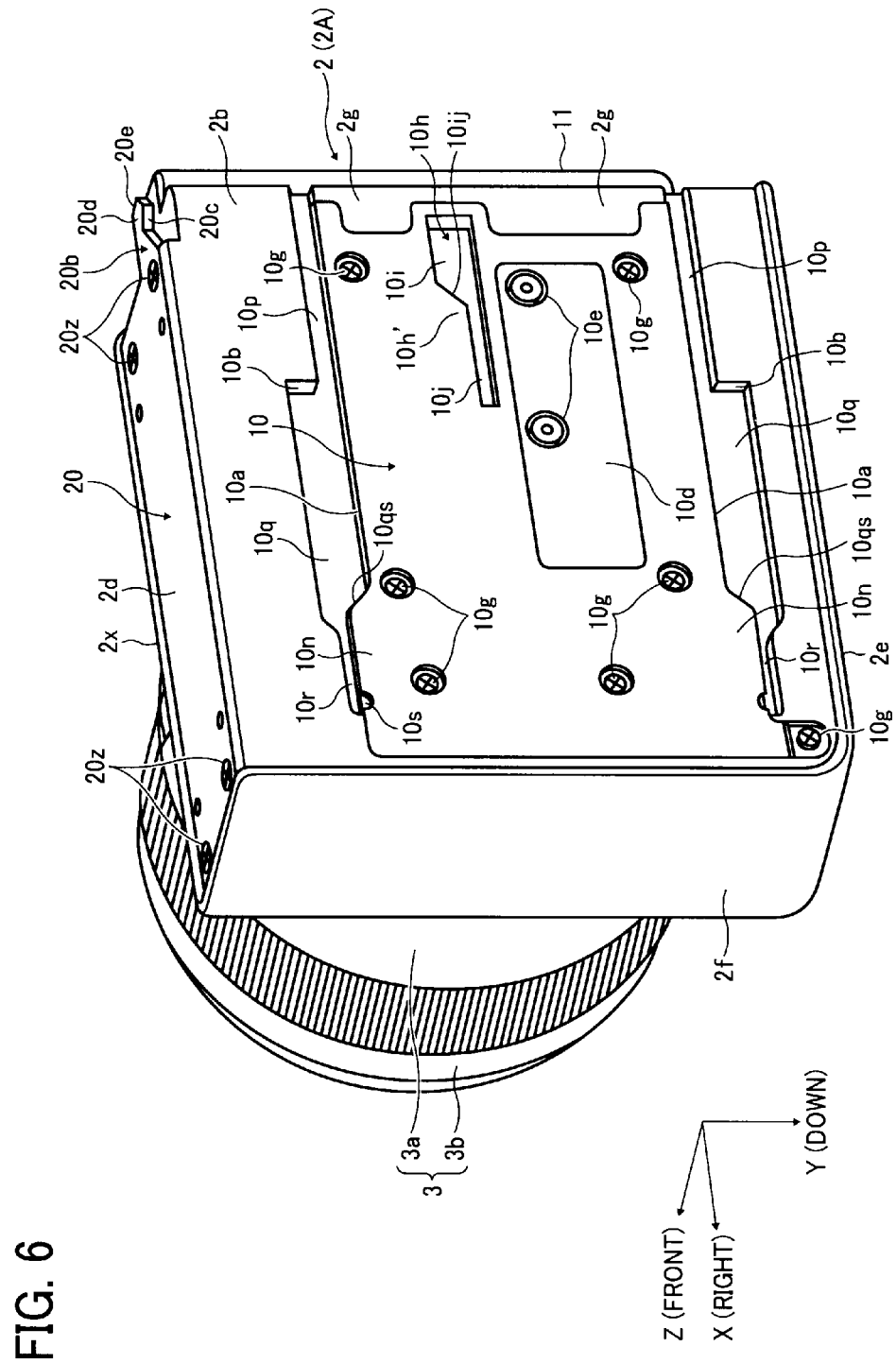
FIG. 6 is an external view of the image pickup unit shown in FIG. 4 as viewed from the rear side.

Peripheral edges 10a, 10a of a rear wall surface reinforcing sheet metal member for unit 10 shown in FIG. 6 are in sliding contact with the guide surfaces 4p, 4p. Notch walls 10b, 10b of the rear wall surface reinforcing sheet metal member for unit 10 abut on the rectangular stopper protrusions 4m when the image pickup unit 2 is pulled out. A detailed structure of the rear wall surface reinforcing sheet metal member for unit 10 is described later. As shown in FIG. 5B, on the back wall section 1B, screw holes 4c' are formed at appropriate positions corresponding to screw holes 4c of the rear wall surface reinforcing sheet metal member for body 4.

As shown in FIGS. 7A to 7C, raised flat plate sections 4q, 4r raised to the back wall section 1B are formed on the right and left sides of and in the middle part in the vertical direction of the rear wall surface reinforcing sheet metal member for body 4. As shown in FIG. 5B, the back wall section 1B has recesses 4q', 4r' having a shape corresponding to the raised flat plate sections 4q, 4r formed. The rear wall surface reinforcing sheet metal member for body 4 are given rigidity by the raised flat plate sections 4q, 4r.

Figure 5C:
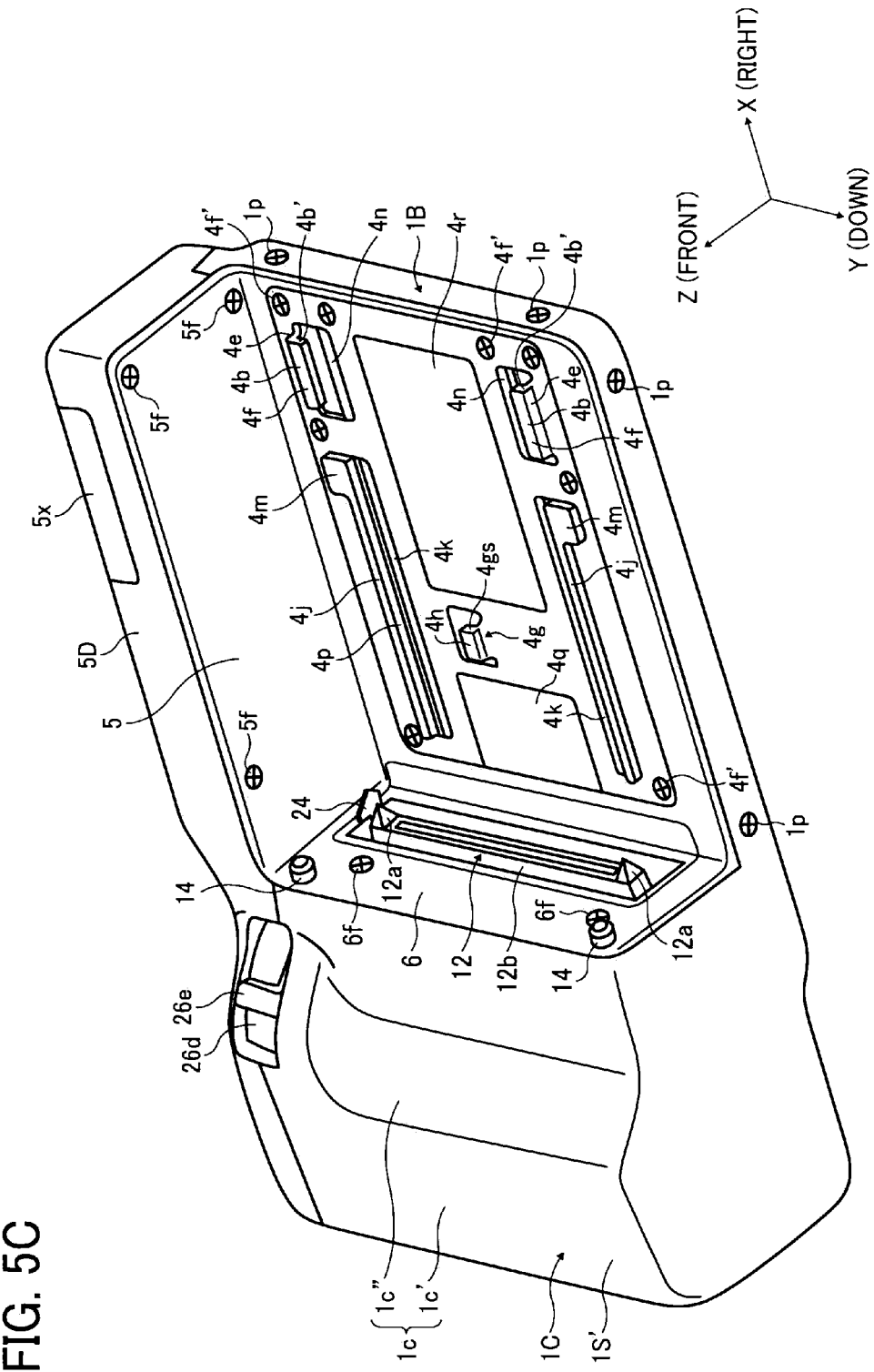
FIG. 5C is an external view of the camera body shown in FIG. 4 as viewed obliquely from below.

As shown in FIGS. 4, 5A, and 5C, the rear wall surface reinforcing sheet metal member for body 4 and the resin plate 30 are fixed to the back wall section 1B by locking screws 4f in the following state. Specifically, the raised flat plate sections 4q, 4r correspond to the paired recesses 4q', 4r'; the paired resin-made guiding protrusion sections 4j, 4j and the paired resin-made sliding contact ribs 4k, 4k are inserted into the paired insertion openings 4a, 4a; and the paired resin-made sliding contact ribs 4n, 4n are inserted into the insertion openings 4s, 4s.

A side wall surface reinforcing sheet metal member for body 6 is fixed as a side surface wall to the side wall section 1C by locking screws 6f, as shown in FIGS. 4 and 5C. The side wall surface reinforcing sheet metal member for body 6 faces the left side surface 2c of the housing 2A when it is set to the recess 1A of the housing 2A. The side wall surface reinforcing sheet metal member for body 6 stands up, when the side wall surface reinforcing sheet metal member for body 6 is viewed straight with the back wall section 1B located on the downside, the upper wall section 1D located on the right side and yet the forward direction being the topside.

An upper wall surface reinforcing sheet metal member for body 5 is fixed as an upper surface wall by locking screws 5f to the upper wall section 1D, as shown in FIG. 5C. The upper wall surface reinforcing sheet metal member for body 5 faces the upper surface 2d of the housing 2A when it is set to the recess 1A of the housing 2A. The upper wall surface reinforcing sheet metal member for body 5 stands up forward from the back wall section 1B, when the side wall section 1C is viewed straight from the lateral side with the upper wall section 1D located on the top side.

As shown in FIGS. 5A to 5C, the camera body 1 has a grip section 1c connected to the side wall section 1C. The grip section 1c includes a bulging section 1c' and a finger rest recess 1c''. The bulging section 1c' bulges forward (the Z direction from the rear side to the front face side is defined as forward), that is to say, in a direction facing a subject in the optical axis of the optical system. The finger rest recess 1c'' is located between the bulging section 1c' and the recess 1A. The finger rest recess 1c'' is adjacent to the bulging section 1c'. When a user grips the grip section 1c with his/her right hand, he/she can place his/her long finger to little finger on the finger rest recess 1c'.

A storage chamber is formed inside the grip section 1c. The storage chamber houses a battery and various electrical parts requested by the imaging apparatus. That is to say, the storage chamber houses a battery, a circuit used to control the image pickup unit 2 by manipulating the manipulating sections, a processing circuit to process an image captured by the image pickup unit 2, a recording medium which stores the image captured by the image pickup unit 2 and processed by the processing circuit, a power circuit, a strobe control circuit, a circuit board on which circuit parts constituting these are mounted, etc.

As shown in FIGS. 3A and 3B, on the rear of the back wall section 1B provided is a display surface 1b which displays images as a display section on the basis of image data captured by the image pickup unit 2. On the display surface 1b, images recorded in a recording medium are reproduced and displayed. The size of the back wall section 1B is almost determined by that of the display surface 1b.

The camera body 1 has a front cover member 1S, an upper cover member 1U, and a rear cover member 1T as parts of an exterior member of the camera body. The front cover member 1S covers the front side (positive side in the Z direction) of the camera body 1, and forms the surface shape from the front side to the middle position (see FIG. 3B) as viewed in the Z direction at the left side part of the recess 1A, i.e., at the front side and the left side of the grip section 1c connected to the side wall section 1C. In the embodiment 1, a grip member 1S' as a covering member is affixed to the surface of the front cover member 1S (see FIG. 1 and the like), and FIG. 3B shows a state where the grip member 1S' is not provided. The grip member 1S' is formed with an elastic member designed to improve feel of the touch and prevent slip when the side wall section 1C (the bulging section 1c' and the finger rest recess 1c') is held by the right hand. The grip member 1S' is affixed with an adhesive or a double-sided adhesive tape in the embodiment 1, and thus it is assumed that the grip member 1S' can be stripped off relatively easily.

The upper cover member 1U covers the upper side (negative side in the Y direction) of the camera body 1, and forms the surface shape of the upper wall section 1D (see FIGS. 1 and 3B). In the upper cover member 1U, the release button 5y, the dial 5z, the strobe device 5x (its opening), the hot shoe section 5t or the like are provided.

The rear cover member 1T covers the rear side (negative side in the Z direction) of the camera body 1, and forms the surface shape of the back wall section 1B, i.e., all the areas except the display surface 1b in the rear surface, the area to the recess 1A in the right side surface, and the area from the rear side to the middle position as viewed in the Z direction in the left side surface (see FIGS. 1 and 3B). The rear cover member 1T is configured not to interfere with the image pickup unit 2 attached to the recess 1A. In the rear cover member 1T, the above-described direction indication switch 5q, the reproduction switch 5r or the like are provided.

When each cover member is attached to the camera body 1, each manipulating section provided in the cover member is connected or abutted as appropriate to the circuit board and the like provided in the back side (inner side) of the corresponding cover member so as to perform the manipulation caused.

These three cover members form an integral outer shape with the cover members attached to the camera body 1 and adjacent to each other. In the embodiment 1, the above-described ADJ lever 5p is provided at the boundary between the upper cover member 1U and the rear cover member 1T (see FIGS. 3A and 3B), and the lock release button 26d described later is provided at the boundary between the upper cover member 1U and the front cover member 1S (see FIGS. 1 and 2).

In the embodiment 1, the upper cover member 1U is mounted to the camera body 1 with three locking screws 5f (see FIG. 5C) screwed (arranged) in the upper wall surface of the upper wall section 1D that is a part of the wall surfaces included in the recess 1A provided in the front side of the camera body 1 in order to fix the upper wall surface reinforcing sheet metal member for body 5 to the upper wall section 1D. Also, the front cover member 1S is mounted to the camera body 1 with two locking screws 6f (see FIG. 5C) screwed (arranged) in the side wall surface of the side wall section 1C that is a part of the wall surfaces included in the recess 1A provided in the front side of the camera body 1 in order to fix the side wall surface reinforcing sheet metal member for body 6 to the side wall section 1C. Thus, the camera body 1 in a normal use state (state where the image pickup unit 2 is attached thereto) has a high quality in appearance because the locking screws 5f for mounting the upper cover member 1U and the locking screws 6f for mounting the front cover member 1S are not visually recognized. Although in the embodiment 1, the locking screws 5f for fixing the upper wall surface reinforcing sheet metal member for body 5, and the locking screws 6f for fixing the side wall surface reinforcing sheet metal member for body 6 are used, the cover members may be fixed to the camera body 1 with the locking screws to be screwed (arranged) in the wall surfaces included in the recess 1A so as to use the provision of the recess 1A, that is to say, in the configuration of the embodiment 1, the cover members may be fixed to the camera body 1 with the locking screws screwed (arranged) from the upper wall surface of the upper wall section 1D, or the side wall surface of the side wall section 1C, or the back wall surface of the back wall section 1B that are the wall surfaces included in the recess 1A, and thus the invention is not limited to the embodiment 1. Using the provision of the recess 1A (hereinafter, referred to as simply utilizing the recess 1A) is to use those portions that cannot be visually recognized from the outside in a normal use state after attaching the image pickup unit 2 to the camera body 1.

Also, in the embodiment 1, the rear cover member 1T is mounted to the camera body 1 with seven locking screws 1p screwed from the outside (see FIGS. 3B and 3C). The cover member 1T is configured not to interfere with the image pickup unit 2 attached to the recess 1A as described above, and thus can be detached from the camera body 1 as described later by removing the seven locking screws 1p even with the image pickup unit 2 attached (set) to the recess 1A. In the embodiment 1, although one of the seven locking screws 1p (located at the lower right in FIG. 3B (lower part of the left side surface (surface on the negative side in the X direction))) is located in the back of the grip member 1S', the grip member 1S' can be stripped off relatively easily as described above, and thus the removal of the locking screws 1p is not blocked.

In this manner, since the upper cover member 1U, the front cover member 1S, and the rear cover member 1T are attached to the camera body 1 so as to enclose the camera body 1, rigidity of the entire camera (imaging apparatus) is improved. Also, the three locking screws 5f for fixing the upper cover member 1U utilizing the recess 1A, and the two locking screws 6f for fixing the front cover member 1S utilizing the recess 1A are provided in the camera body 1 in addition to the seven locking screws 1p for fixing the rear cover member 1T, and thus rigidity of the entire camera (imaging apparatus) is improved.

Figure 8:
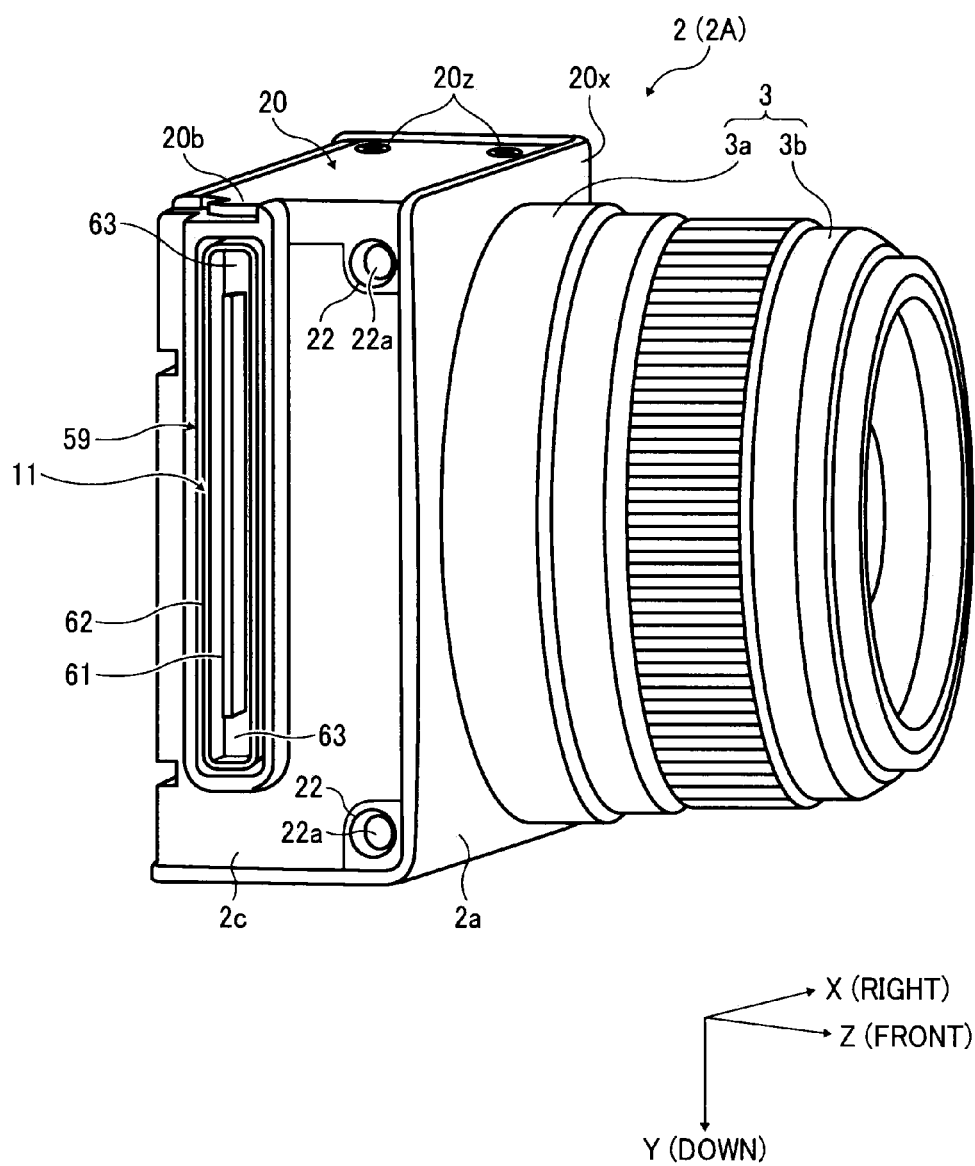
FIG. 8 is a perspective view of the image pickup unit shown in FIG. 6 as viewed from the left side.

As shown in FIG. 8, on the image pickup unit 2 provided is an image-pickup-unit connector section 11 which extends vertically on the left side surface 2c facing the side wall surface reinforcing sheet metal member for body 6. The image-pickup-unit connector section 11 is fixed to a connector board (plug base set) on which electric circuits are wired. The plug base set is placed in a floating structure inside the image pickup unit 2. The image-pickup-unit connector section 11 protrudes outward from the left side surface 2c.

When the image pickup unit 2 is attached to the camera body 1 and the image-pickup-unit connector section 11 and the camera-body connector section 12 are electrically joined, this floating structure serves a function to absorb and alleviate any mounting error of the image-pickup-unit connector section 11 and the camera-body connector section 12, and to mitigate stress to be applied when the image-pickup-unit connector section 11 and the camera-body connector section 12 are fitted.

As shown in FIG. 4, on the camera body 1 provided is the camera-body connector section 12 which is adjacent to the side wall surface reinforcing sheet metal member for body 6 and extends vertically. The camera-body connector section 12 has positioning protrusions 12a, 12a at both ends in the vertical direction. The image-pickup-unit connector section 11 has positioning holes (to be described later) at the both ends in the vertical direction. A commercially available bay connector, for example, is used for the image-pickup-unit connector section 11 and the camera-body connector section 12.

The camera-body connector section 12 is placed so that it will not inadvertently touch a rising base of the side wall section 1C which stands up from the back wall section 1B, when the side wall surface reinforcing sheet metal member for body 6 is viewed straight with the back wall section 1B located on the downside, the upper wall section 1D located on the right side and yet the forward direction being the topside. The camera-body connector section 12 has a covering member 12b which covers a connector terminal 12c shown in FIGS. 19 and 20. The action of the covering member 12b will be described later.

The camera-body connector section 12 faces the recess 1A. As the image pickup unit 2 moves in a direction from right to left when the image pickup unit 2 is attached to and set in the camera body 1, the camera-body connector section 12 is fitted into the image-pickup-unit connector section 11 and the camera body 1 and the image pickup unit 2 are connected. In addition, details of the setting of the image pickup unit 2 to the camera body 1 and detailed structure of the image-pickup-unit connector section 11 and the camera-body connector section 12 will be described later.

As shown in FIG. 4, and FIGS. 5A to 5C, on the side wall section 1C, paired auxiliary fitting protrusions 14, 14 are formed at an interval in the up-down direction. The auxiliary fitting protrusions 14 are located above the camera-body connector section 12 when the side wall section 1C is viewed straight with the back wall section 1B located on the downside, the upper wall section 1D located on the right side and yet the forward direction being the topside. The paired auxiliary fitting protrusions 14, 14 have a capability of preventing the connector terminal 12c (see FIG. 19, etc.) of the camera-body connector section 12 and the connector terminal (to be described later) of the image-pickup-unit connector section 11 from being destroyed, in cooperation with paired auxiliary fitting holes to be described later, when inadvertent twisting force is applied to the image pickup unit 2.

(Description of External Shape of Image Pickup Unit 2)

In the image pickup unit 2, paired auxiliary fitting holes 22 is formed on the left side surface 2c to be faced by the side wall surface reinforcing sheet metal member for body 6, as shown in FIG. 8. When the image pickup unit 2 is attached to and set in the camera body 1, the paired auxiliary fitting protrusions 14, 14 are fitted into the paired auxiliary fitting holes 22. A shock absorbing member 22a such as a sponge, rubber or the like is placed on the bottom of the paired auxiliary fitting holes 22. Alternatively, the placement may be adopted such that the paired auxiliary fitting holes 22 are formed on the side wall section 1C and the paired auxiliary fitting protrusions 14, 14 are formed on the left side surface 2c of the housing 2A.

Figure 9:
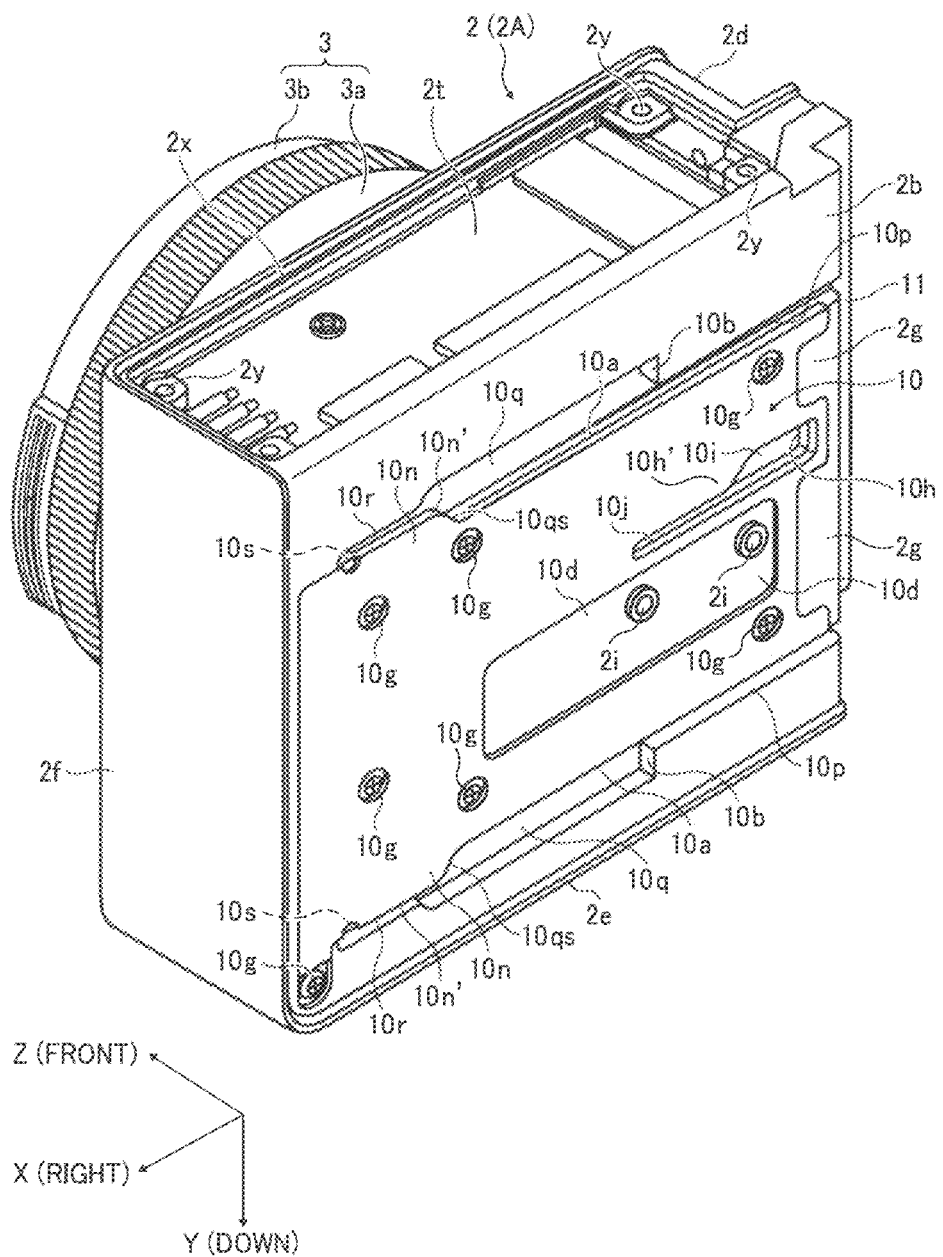
FIG. 9 is an external view of the image pickup unit, as viewed from the rear side, from which an upper surface reinforcing sheet metal member for unit shown in FIG. 6 is removed.
Figure 10A:
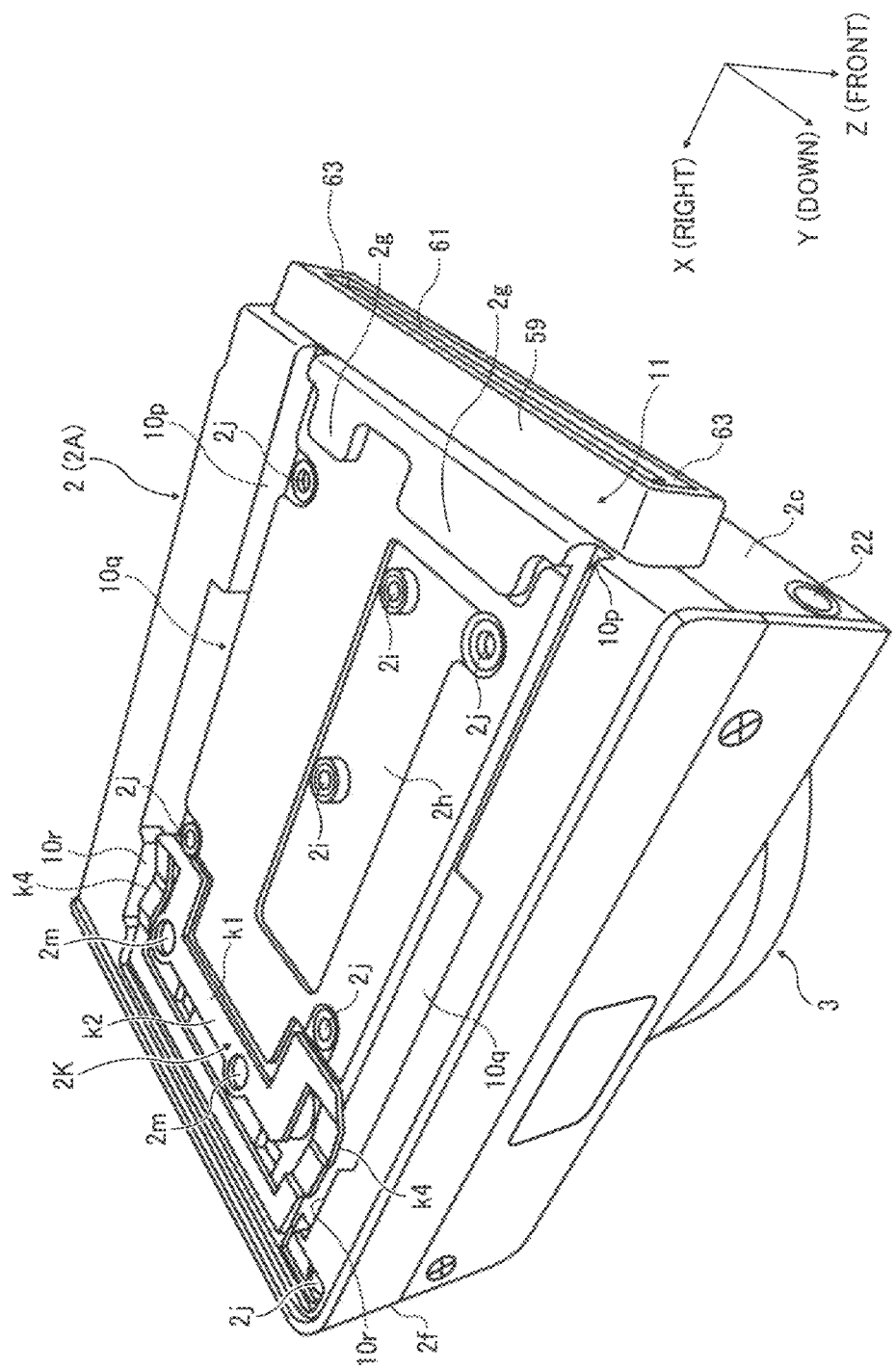
FIG. 10A is an external view of the image pickup unit, as viewed from the rear side, from which a rear wall reinforcing sheet metal member for unit shown in FIG. 6 is removed.

On the rear part 2b of the housing 2A, positioning raised sections 2g, 2g are formed on the side of the left side surface 2c, as shown in FIGS. 6, 9, and 10A. Also, on the rear part 2b of the housing 2A, as shown in FIG. 10A, not only a rectangular recess 2h and paired cylindrical sections 2i are formed, but also screw holes 2j are formed at appropriate positions.

On the side of the right side surface 2f of the housing 2A, a plate spring 2K having an inclined elastic plate section as a biasing spring which constitutes a part of the biasing section is placed. The plate spring 2K has the screw holes 2m, 2m formed. A detailed structure of the plate spring 2K will be described later.

Figure 11A:
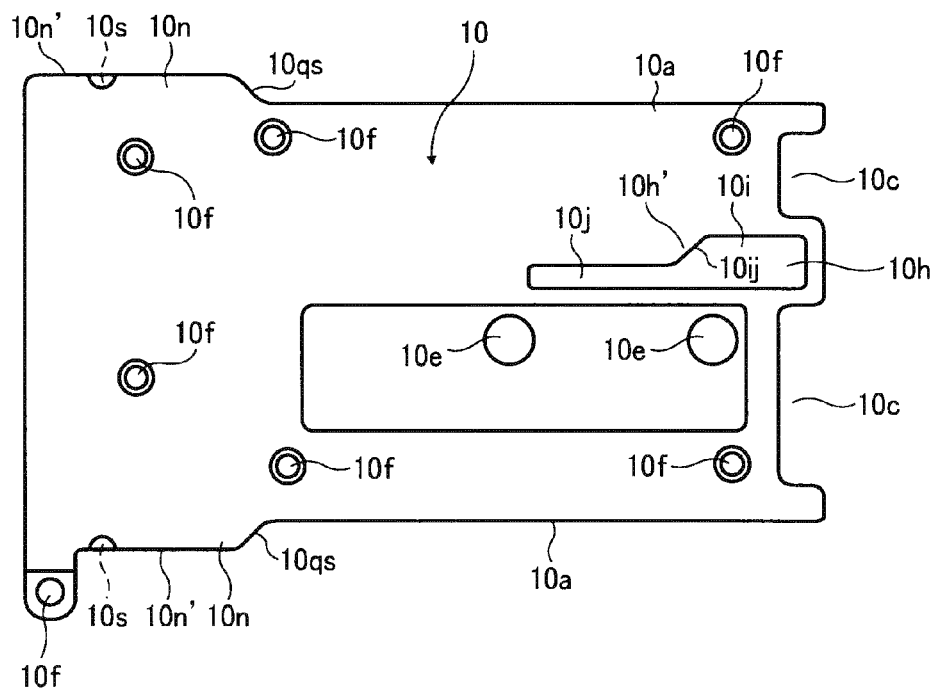
FIG. 11A is a plan view of the rear wall reinforcing sheet metal member for unit shown in FIG. 6 as viewed from the front face side.
Figure 11B:
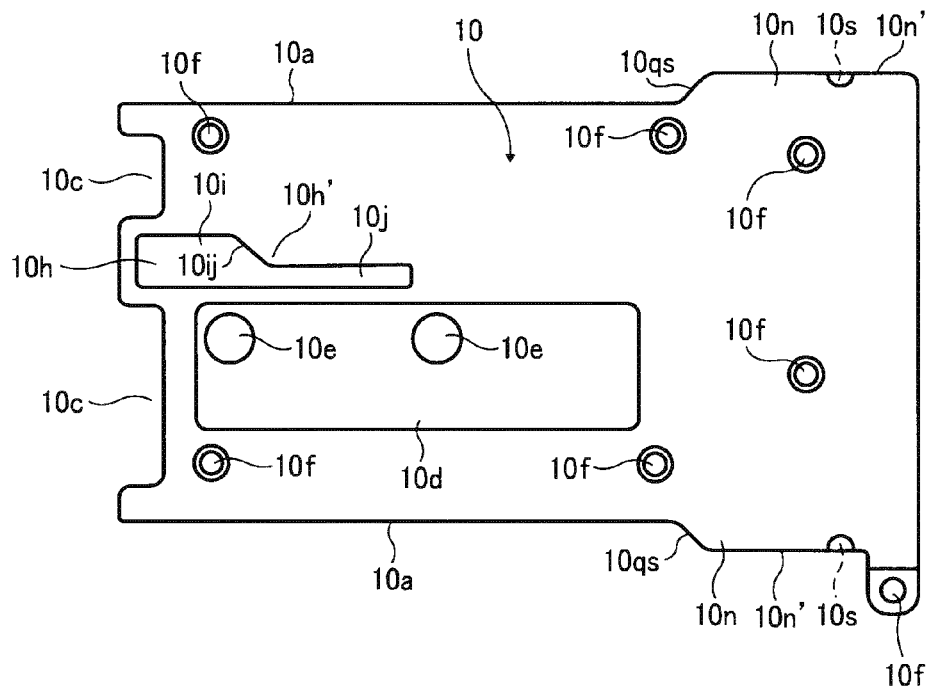
FIG. 11B is a rear view of the rear wall reinforcing sheet metal member for unit shown in FIG. 11A.
Figure 11C:
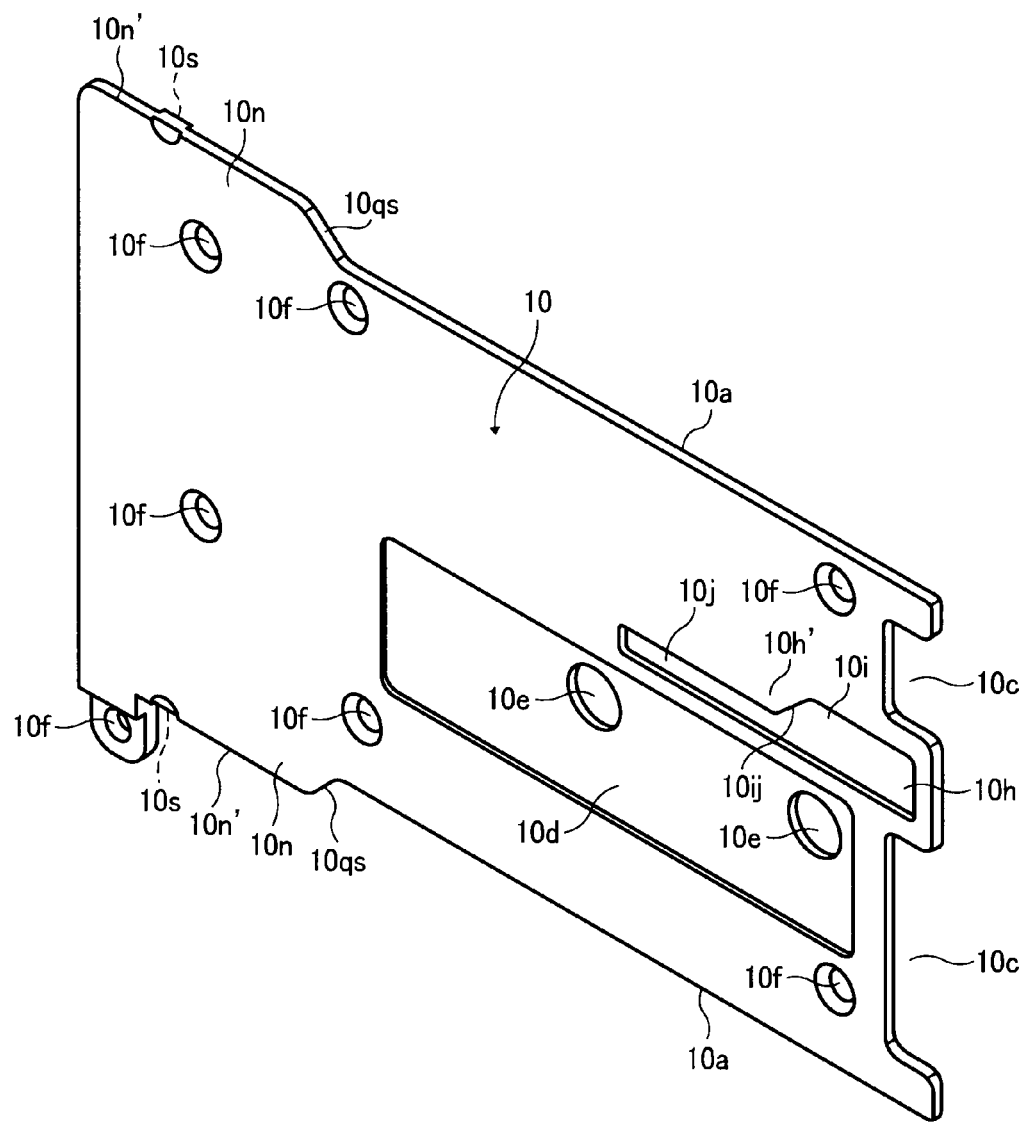
FIG. 11C is a perspective view of the rear wall reinforcing sheet metal member for unit shown in FIG. 11A.

On the rear part 2b of the housing 2A, a rear wall surface reinforcing sheet metal member for unit 10 is provided. The rear wall surface reinforcing sheet metal member for unit 10 has an almost rectangular shape, as shown in FIGS. 11A to 11C. On the rear wall surface reinforcing sheet metal member for unit 10, positioning notches 10c, 10c are formed corresponding to the positioning raised sections 2g, 2g.

Figure 10B:
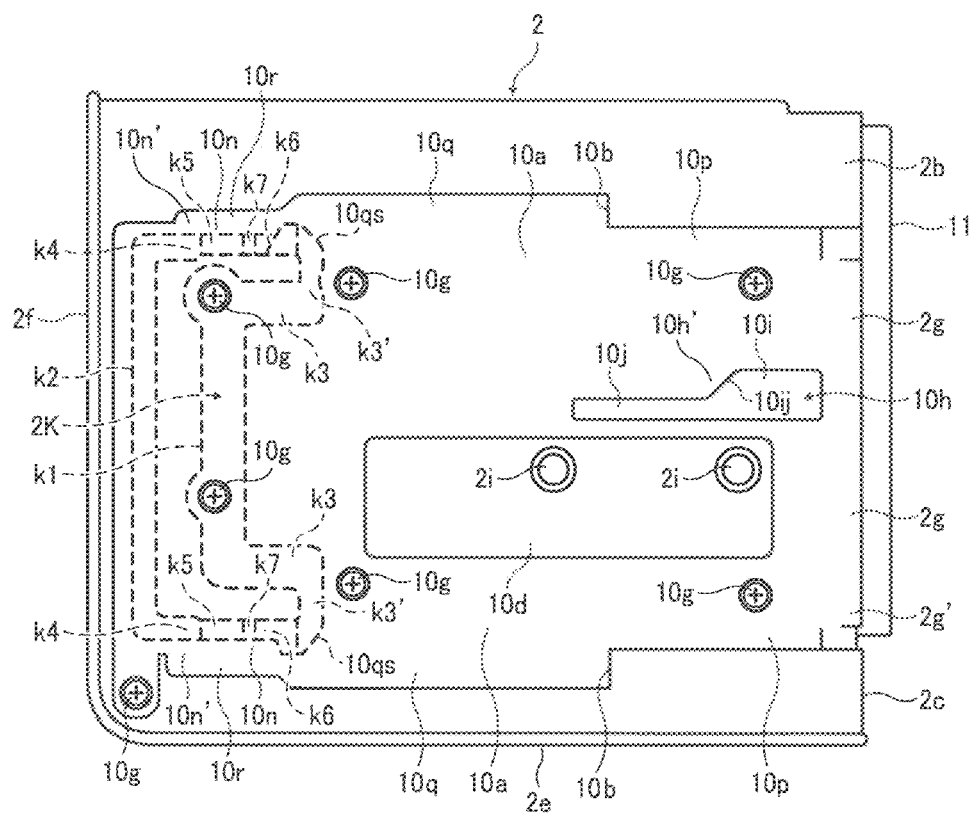
FIG. 10B is a plan view showing a positional relationship of a plate spring and the rear wall reinforcing sheet metal member for unit shown in FIG. 10A.
Figure 10B:
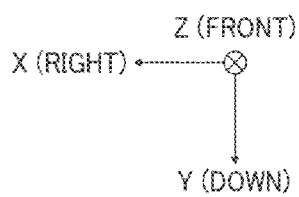

The rear wall surface reinforcing sheet metal member for unit 10 has a tabular raised section 10d having a shape corresponding to the rectangular recess 2h. On the tabular raised section 10d formed are fitting holes 10e into which the paired cylindrical sections 2i fit. In a periphery of the rear wall surface reinforcing sheet metal member for unit 10, screw holes 10f are formed at positions corresponding to the screw holes 2j. The rear wall surface reinforcing sheet metal member for unit 10 is fixed to the rear part 2b by locking screws 10g (see FIG. 6, etc.). The plate spring 2K is fixed when the rear wall surface reinforcing sheet metal member for unit 10 is fixed by the locking screws 10g to the rear part 2b of the housing 2A. FIG. 10B shows a state where the plate spring 2K is fixed to the rear part 2b integrally with the rear wall surface reinforcing sheet metal member for unit 10 of the housing 2A.

In the rear wall surface reinforcing sheet metal member for unit 10 formed is a guiding hole 10h which extends in the left-right direction on the right side when the rear wall surface reinforcing sheet metal member for unit 10 is viewed from the rear side with the rear wall surface reinforcing sheet metal member for unit 10 attached to the housing 2A. In addition, in the rear wall surface reinforcing sheet metal member for unit 10 formed are engaging plate sections 10n, 10n which also serve as a part of the biasing section, on the left side and on the peripheral edges 10a, 10a (edge sections of the rear wall surface reinforcing sheet metal member for unit 10 in the up-down direction) when the rear wall surface reinforcing sheet metal member for unit 10 is viewed from the rear side with the rear wall surface reinforcing sheet metal member for unit 10 attached to the housing 2A.

Between the rear part 2b and the rear wall surface reinforcing sheet metal member for unit 10 formed are paired guiding protrusion entry allowing holes 10p, an engaging claw entry allowing hole 10q, and guiding holes for engaging claw cut and bent section 10r, as shown in FIGS. 6 and 9. The paired guiding protrusion entry allowing holes 10p extend in a left-right direction of the resin plate 30 and allow the guiding protrusion section 4j to enter. The engaging claw entry allowing hole 10q allows the rectangular stopper protrusion 4m and the engaging claw 4b to enter. The guiding holes for engaging claw cut and bent section 10r guide the cut and bent section 4e of the engaging claw 4b. In the engaging plate sections 10n, 10n, semicircular convex sections 10s, 10s, facing the end of the guiding holes for engaging claw cut and bent section 10r, formed are in the peripheral edges 10n', 10n', as shown in FIGS. 11A to 11C. The semicircular convex sections 10s, 10s are located at the ends of the guiding holes for an engaging claw cut and bent section 10r and projected to a direction in which the plate spring 2K exists. The action of the semicircular convex sections 10s, 10s will be explained together with that of the plate spring 2K.

In addition, the paired guiding protrusion entry allowing holes 10p constitute an image-pickup-unit guiding mechanism, and any one of the paired guiding protrusion entry allowing holes 10p is referred to as a first guiding groove which is provided on the rear part 2b of the image pickup unit 2 and extends in a direction corresponding to a first direction. Any other one of the paired guiding protrusion entry allowing holes 10p is referred to as a second guiding groove which is provided on the rear part 2b of the image pickup unit 2 and extends in a direction corresponding to the first direction.

The paired engaging claws 4b are provided on the far side of the camera-body connector section 12. Therefore, if there were no engaging protrusion 4g, the cut and bent section 4e of the engaging claw 4b would not be guided to the guiding hole for engaging claw cut and bent section 10r, and the inflected plate section 4f of the paired engaging claws 4b would abut on the engaging plate section 10n. Thus, even though the rear part 2b of the image pickup unit 2 were obliquely inclined to the rear wall of the back wall section 1B, the camera-body connector section 12 and the image-pickup-unit connector section 11 might be fitted and connected to each other.

If the camera-body connector section 12 and the image-pickup-unit connector section 11 were forcibly fitted to each other with the rear part 2b of the image pickup unit 2 obliquely inclined to the rear wall of the back wall section 1B, the camera-body connector section 12 and the image-pickup-unit connector section 11 might be destroyed.

The guiding hole 10h has a role to prevent the camera-body connector section 12 and the image-pickup-unit connector section 11 from being destroyed. As shown in FIGS. 6, 9, and FIGS. 11A to 11C, the guiding hole 10h includes an engaging protrusion entry allowing hole (an insertion opening section) 10i which allows entry of the inflected section 4h of the engaging protrusion 4g and a guiding hole for engaging protrusion cut and bent section 10j which guides the cut and bent section 4i in a left-right direction.

Width of the guiding hole for engaging protrusion cut and bent section 10j is designed to be smaller than that of the inflected section 4h, and a constituting wall section (angle controlling abutting section) 10h' which includes the guiding hole for engaging protrusion cut and bent section 10j and the engaging protrusion entry allowing hole 10i is such structured that a connection of the camera-body connector section 12 and the image-pickup-unit connector section 11 is prevented by the inflected section 4h abutting on the constituting wall section 10h'.

That is to say, the engaging protrusion entry allowing hole 10i is formed so that whenever the right edges 4b', 4b' of the paired engaging claws 4b, 4b shown in FIGS. 5A, 5C, and FIGS. 7A to 7C abut on the constituting wall section which constitutes an inclined wall 10qs shown in FIGS. 6, 9, and FIGS. 11A to 11C, an edge 4gs of the engaging protrusion 4g shown in FIGS. 4, 5A, 5C and FIGS. 7A to 7C abuts on the constituting wall section 10h' which constitutes an inclined wall 10ij.

Because of this, when the inflected plate section 4f of the engaging claw 4b abuts and rests on the engaging plate section 10n from the outside, the inflected section 4h of the engaging protrusion 4g abuts and rests on the constituting wall section 10h' and the image pickup unit 2 floats parallel to the rear wall of the back wall section 1B. Thus, positions of the auxiliary fitting protrusions 14 and the auxiliary fitting holes 22 are out of alignment, thus preventing a connection of the camera-body connector section 12 and the image-pickup-unit connector section 11. In addition, if the inflected plate section 4f is located inside the image pickup unit 2 relative to the engaging plate section 10n, both connector sections 11, 12 are connected in parallel.

Figure 12:
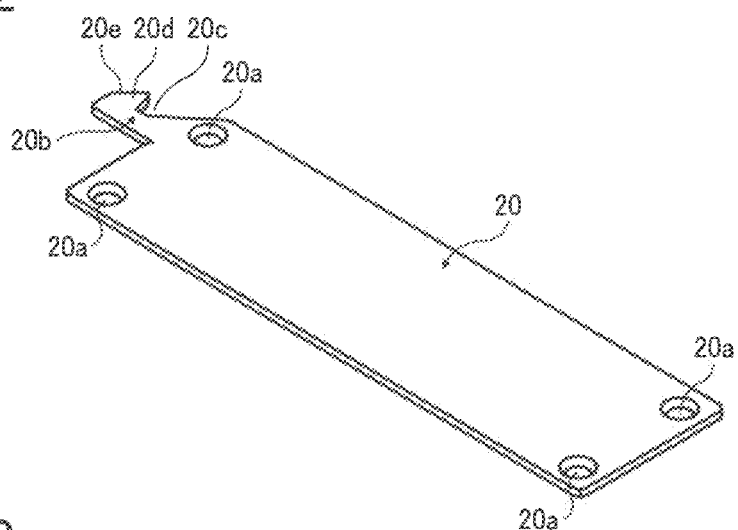
FIG. 12 is a perspective view of the upper wall reinforcing sheet metal member for unit shown in FIG. 6.

On the upper surface 2d of the housing 2A, an upper wall surface reinforcing sheet metal member for image pickup unit 20 shown in FIGS. 4, 6, 8 and 12 is placed. As shown in FIG. 12, the upper wall surface reinforcing sheet metal member for image pickup unit 20 has screw holes 20a at appropriate positions. The upper wall surface reinforcing sheet metal member for image pickup unit 20 has an extended plate section 20b which is extended more outward than the left side surface 2c of the housing 2A.

As shown in FIG. 9, on the upper surface 2d of the housing 2A, a place of placement 2t of the upper wall surface reinforcing sheet metal member for image pickup unit 20 is defined by a surrounding wall 2x which surrounds a circumference of the upper wall surface reinforcing sheet metal member for image pickup unit 20. In the placement place 2t, screw holes 2y are formed at positions corresponding to the screw holes 20a of the upper wall surface reinforcing sheet metal member for image pickup unit 20. The upper wall surface reinforcing sheet metal member for image pickup unit 20 is placed at the placement place 2t and fixed by locking screws 20z to the upper surface 2d, as shown in FIGS. 4, 6, and 8.

In this way, the extended plate section 20b extends along the upper surface of the image-pickup-unit connector section 11. In the extended plate section 20b, a notch section 20c and a to-be-locked claw 20d as a to-be-locked member are formed, as shown in FIG. 12. A locking claw, to be described later, as a locking member enters the notch section 20c. The to-be-locked claw 20d enters the notch section of the locking member to be described later. The to-be-locked claw 20d has an inclined wall 20e. The image pickup unit 2 is fixed to the camera body 1 by engagement of the locking member and the to-be-locked member.

In a state that the image pickup unit 2 is fixed to the camera body 1, as shown in FIGS. 1 and 2, as the upper wall surface reinforcing sheet metal member for image pickup unit 20 is surrounded by the surrounding wall 2x, it is not visible even when the image pickup unit 2 is viewed from the front face. This makes appearance of the imaging apparatus look better and prevents entry of any dust between the upper surface 2d of the image pickup unit 2 and the upper wall section 1D of the camera body 1.

(Description of Locking Mechanism and Unlocking Mechanism)

Figure 13:
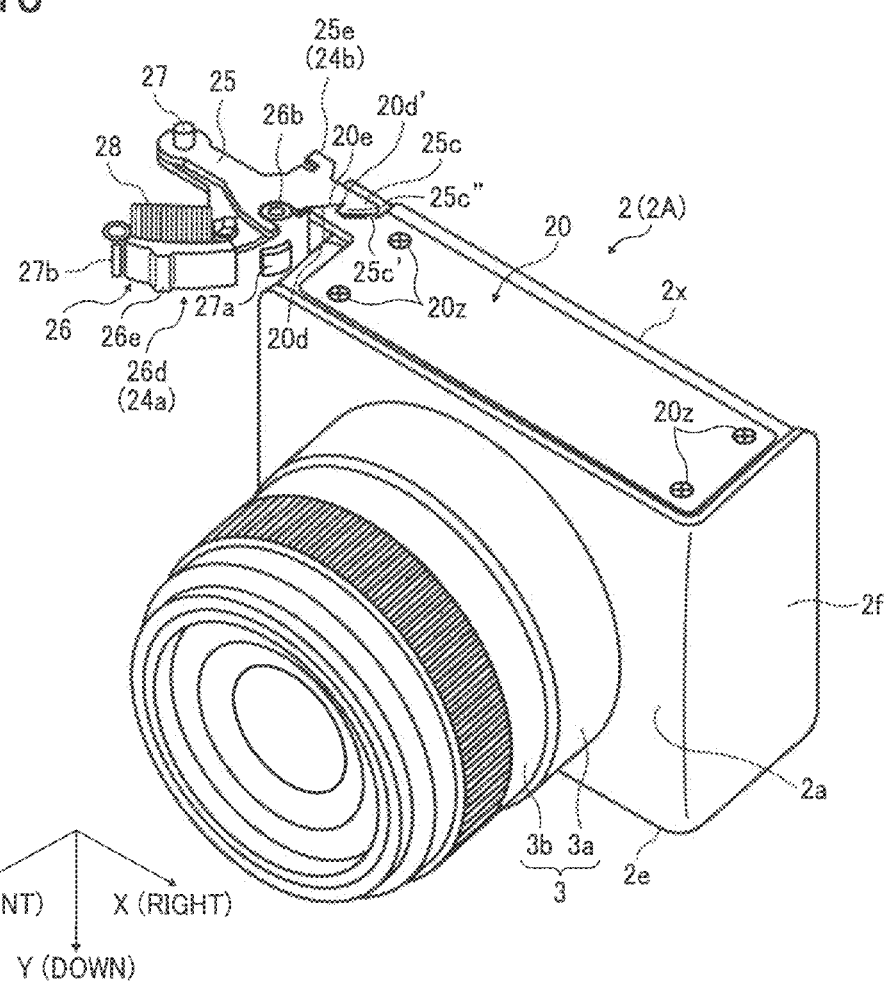
FIG. 13 is a perspective view showing an engagement relationship of the image pickup unit, a locking member, and an unlocking member shown in FIG. 1.
Figure 14:
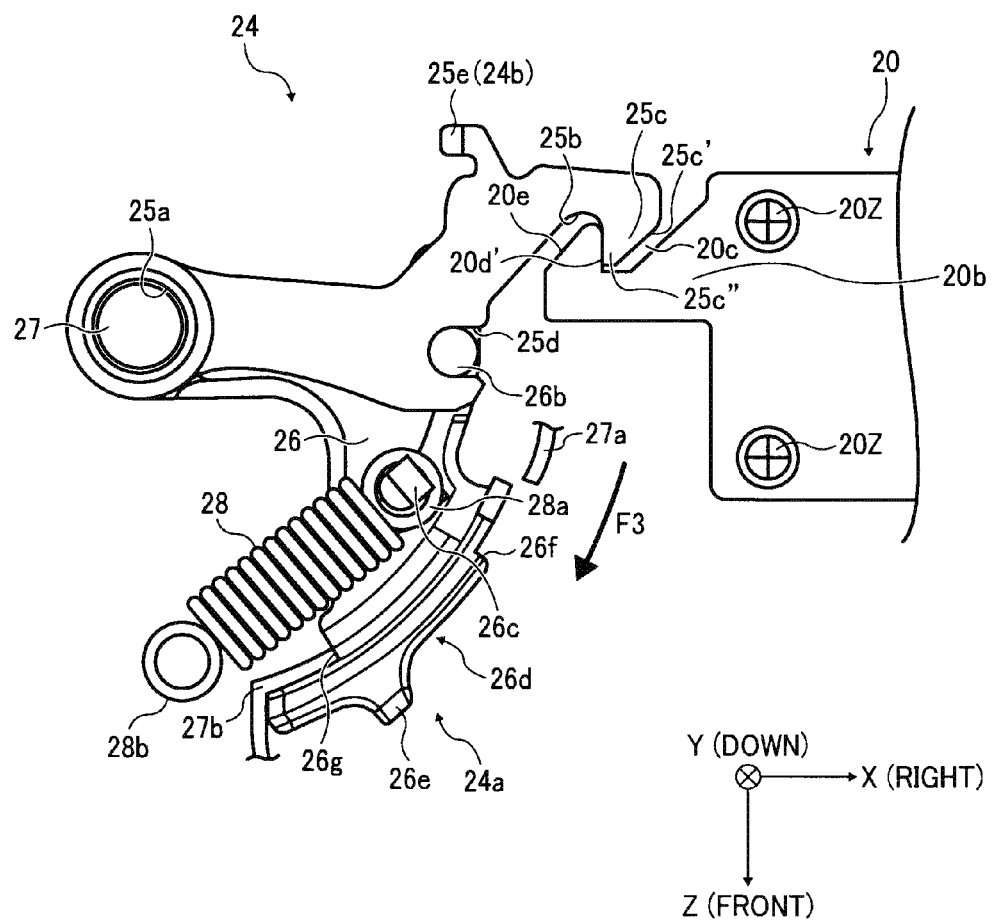
FIG. 14 is a partial enlarged view showing an engagement relationship of the locking member, the unlocking member, and a to-be-locked member shown in FIG. 13.

In the camera body 1, a locking mechanism 24 shown in FIGS. 13 and 14 is provided. The locking mechanism 24 is located at a crossing section (corner) where the side wall section 1C and the upper wall section 1D meet (see FIG. 5C). The locking mechanism 24 has a capability of locking the image pickup unit 2. As shown in FIG. 5C, the locking mechanism 24 is located in the proximity of the upper left corner with respect to the housing 2A, when the housing 2A is viewed from an oblique direction with the housing 2A placed in the recess 1A.

As shown in FIGS. 13 and 14, the locking mechanism 24 roughly includes a locking plate 25 (see FIGS. 15 and 16) as a locking member, a spindle 27, a stopper 27a, and a stopper 27b. The stopper 27a, the stopper 27b, and the spindle 27 are fixed to the camera body 1. The locking plate 25 serves a function to lock the image pickup unit 2 in cooperation with the to-be-locked claw 20d provided in the image pickup unit 2 as a to-be-locked member.

A first unlocking mechanism 24a and a second unlocking mechanism 24b are provided to unlock the image pickup unit 2 locked to the camera body 1 by the locking mechanism 24. The first unlocking mechanism 24a roughly includes an unlocking manipulating member (unlocking plate) 26 engaged with the locking plate 25 via a fitting protrusion 26b described later (see FIGS. 17 and 18), a spindle 27, a stopper 27a, and a stopper 27b. The second unlocking mechanism 24b roughly includes the locking plate 25, a forced unlocking protrusion section 25e as the second unlocking mechanism formed therein, a spindle 27, a stopper 27a, and a stopper 27b.

In a normal use state, the unlocking manipulating member 26 serves a function as a manipulating section to unlock the image pickup unit 2 locked to the camera body 1 by the locking plate 25. Since the unlocking manipulating member 26 in the embodiment 1 is a part that is directly touched and manipulated by a user, it is formed of a resin material. Also, the locking plate 25 in the embodiment 1 is engaged with the to-be-locked claw 20d as described later that is provided in the upper wall reinforcing sheet metal member for image pickup unit 20 of the image pickup unit 2, and its strength needs to be ensured, and thus the locking plate 25 is formed of a sheet metal member.

The unlocking manipulating member 26 is provided at a position similar to that of a remove button of an interchangeable lens barrel unit of a conventional single lens reflex camera (see FIG. 1), when the camera body 1 is viewed from the front face. Thus, even a user who is accustomed to a conventional single-lens reflex camera of interchangeable lens barrel type can easily perform removal operation of the image pickup unit 2, and erroneous operation is less likely to occur. Hence, it is possible to provide a camera body 1 from which an image pickup unit can be easily removed, while reducing risk due to erroneous operation.

Figure 15:
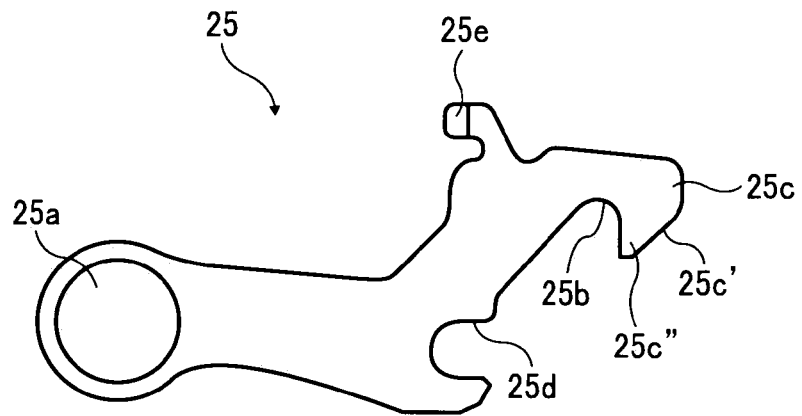
FIG. 15 is a plan view of the locking member shown in FIG. 14.
Figure 16:
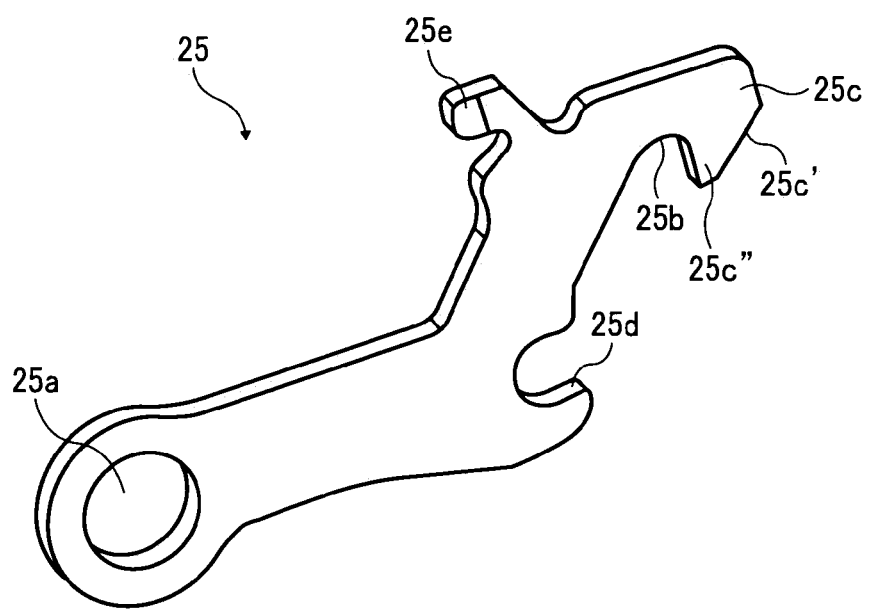
FIG. 16 is a perspective view of the locking member shown in FIG. 15.

As shown in FIGS. 15 and 16, the locking plate 25 has a shaft hole 25a, a notch section 25b, a locking claw 25c, a fitting recess 25d, and a protrusion section for forcibly unlocking 25e. The spindle 27 (see FIGS. 13 and 14) is passed through the shaft hole 25a. The locking plate 25 is capable of being turned around the spindle 27. A claw tip 25c'' of the locking claw 25c is directed forward, when a direction from the rear side to the front face side of the camera body 1 is defined to be forward. In addition, a claw tip 20d' (see FIG. 14) of a to-be-locked claw 20d is directed to a direction facing the back wall section 1B with the image pickup unit 2 placed in the recess 1A. That is to say, the claw tip 20d' of the to-be-locked claw 20d is directed backward when a direction from the front face side to the rear side of the camera body 1 is defined as backward.

An inclined wall 25c' is formed in the locking claw 25c. The inclined wall 25c' is engaged with and pressed by an inclined wall 20e provided in the image pickup unit 2, and thereby produces component force that turns the locking plate 25 backward (the negative side of the Z direction) with the spindle 27 as a supporting point, when the image pickup unit 2 is attached to the camera body 1 by moving the image pickup unit 2 from right to left relative to the camera body 1.

The fitting recess 25d is a notch for fitting a later-described fitting protrusion 26b of the unlocking manipulating member 26, and the fitting connects between the locking plate 25 and the unlocking manipulating member 26.

Figure 38:
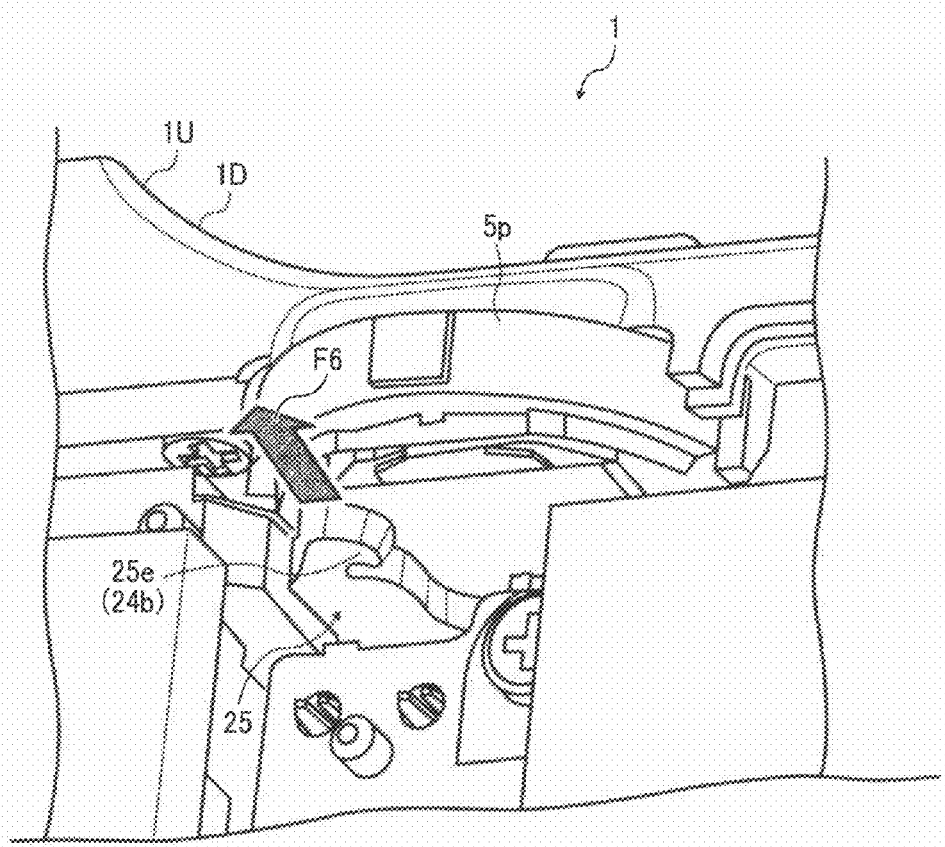
FIG. 38 is an explanatory diagram showing a state where the locked state is released by a second unlocking mechanism similarly to the enlarged main part of FIG. 36.

Pulling the forced unlocking protrusion section 25e from the rear side (negative side in the Z direction) (biasing to the rear side) allows the locking plate 25 to be turned backward (negative side in the Z direction) with the spindle 27 as a supporting point (turning in an unlocking manipulation direction described later). The forced unlocking protrusion section 25e has an arrangement relationship (see FIGS. 36 and 38) that allows the same to be exposed and manipulated to be pulled from the outside (turning in an unlocking manipulation direction described later) as the rear cover member 1T (see FIG. 1 and the like) is detached (see FIG. 35). In the embodiment 1, in order to satisfy the above-mentioned arrangement relationship, the forced unlocking protrusion section 25e is provided so as to be located below the ADJ lever 5p when the locking mechanism 24 is in a locked state in the side wall section 1C (see FIGS. 36 and 38). Thus, in the embodiment 1, the forced unlocking protrusion section 25e is in the middle position between the locking claw 25c and the fitting recess 25d, and protrudes toward the shaft hole 25a.

Figure 17:
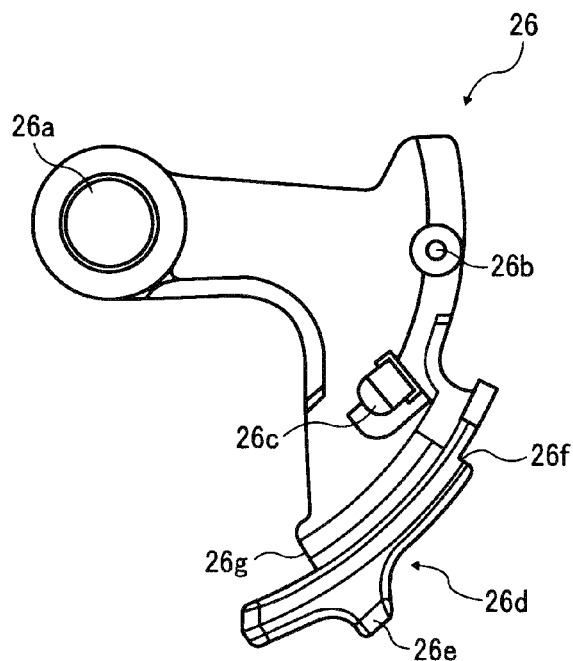
FIG. 17 is a plan view of the unlocking member shown in FIG. 14.
Figure 18:
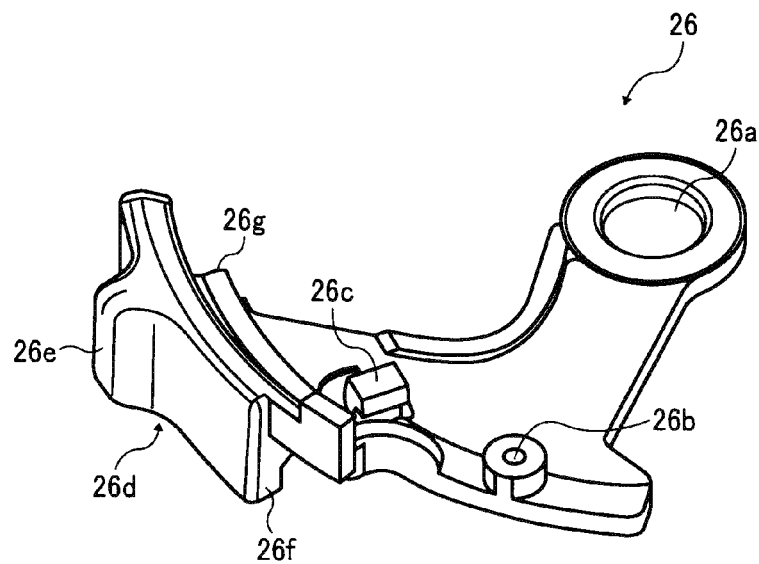
FIG. 18 is a perspective view of the unlocking member shown in FIG. 17.

As shown in FIGS. 17 and 18, the unlocking manipulating member 26 has a shaft hole 26a, a fitting protrusion 26b, a latching protrusion 26c and an unlock button 26d. The spindle 27 which rotatably supports the locking plate 25 passes through the shaft hole 26a. Similarly to the locking plate 25, the unlocking manipulating member 26 is free to turn around the spindle 27.

The fitting protrusion 26b serves a function to connect between the locking plate 25 and the unlocking manipulating member 26 by fitting the fitting protrusion 26b into the fitting recess 25d of the locking plate 25. Accordingly, the locking plate 25 and the unlocking manipulating member 26 are integrally turned around the spindle 27 in a state where the fitting protrusion 26b is fitted into the fitting recess 25d.

One end section 28a of the locking spring 28 is latched onto the latching protrusion 26c. The other end section 28b of the locking spring 28 is latched onto a latching protrusion 28c (see FIG. 40) provided at an appropriate position inside the side wall section 1C. The locking spring 28 serves a function to turn and bias the unlocking manipulating member 26, accordingly the locking plate 25 forward with the spindle 27 as a center (an arrow direction F3 in FIG. 14).

As shown in FIGS. 1 and 2, the unlock button 26d is provided to be exposed outward from the boundary between the upper cover member 1U and the front cover member 1S, and is located above the finger rest recess 1c" when the side on which the upper wall section 1D exists is up. That is to say, the finger rest recess 1c" is located below the unlocking manipulating member 26. The unlock button 26d has a finger receiving section 26e which protrudes outward from the grip section 1c.

The upper part of the grip 1c is usually at a position which does not hinder a user from gripping the grip section while shooting. Since the position does not easily allow inadvertent manipulation, it is possible to provide a camera body from which an image pickup unit can be easily detached, while further reducing risk of erroneous operation. Furthermore, since the unlocking manipulating member 26 is provided at a position above the grip recess where the user's finger is less likely to reach when gripping a grip convex section, a concern of erroneous operation can be further reduced.

In the embodiment 1, the unlock button 26d is turned along the appearance shape of the grip section 1c. The locking plate 25 and the unlocking manipulating member 26 overlap each other, and are turned with the spindle 27 as a supporting point. The locking plate 25 is turned on almost the same plane as a turning plane of the unlock button 26d. The turning of the locking plate 25 around the spindle 27 allows the image pickup unit 2 to be locked to the camera body 1 by the engagement of the locking claw 25c with the to-be-locked claw 20d of the image pickup unit 2, and allows the same to be unlocked from the camera body 1, and the detailed operations are described later. As described later, turning of the unlock button 26d, i.e., the unlocking manipulating member 26, and locking plate 25 backward (negative side in the Z direction) around the spindle 27 (see the arrow F4 in FIG. 1) releases a locked state, and thus this turning direction is referred to as an unlocking manipulation direction. This unlocking manipulation direction is a direction against the direction of biasing by the locking spring 28 (see the arrow F3 in FIG. 14).

In the unlocking manipulating member 26 and the locking plate 25, turning range around the spindle 27 is controlled by the stopper 27a and the stopper 27b. In the embodiment 1, the stopper 27a and stopper 27b are provided in the front cover member 1S (see FIG. 40). The stopper 27a can abut on a first abutting surface 26f of the unlocking manipulating member 26, and serves a function to control the turning of the unlocking manipulating member 26 and the locking plate 25 in the unlocking manipulation direction. The stopper 27b can abut on a second abutting surface 26g of the unlocking manipulating member 26, and serves a function to control the turning of the unlocking manipulating member 26 and the locking plate 25 in the turning and biasing direction of the locking spring 28. Thus, with the locking claw 25c of the locking plate 25 being not engaged with the to-be-locked claw 20d of the image pickup unit 2, the unlocking manipulating member 26 and the locking plate 25 are held in a state where the second abutting surface 26g is abutted on the stopper 27b by turning and biasing of the locking spring 28.

(Detailed Structure of Camera-Body Connector Section 12 and Image-Pickup-Unit Connector Section 11)

Figure 19:
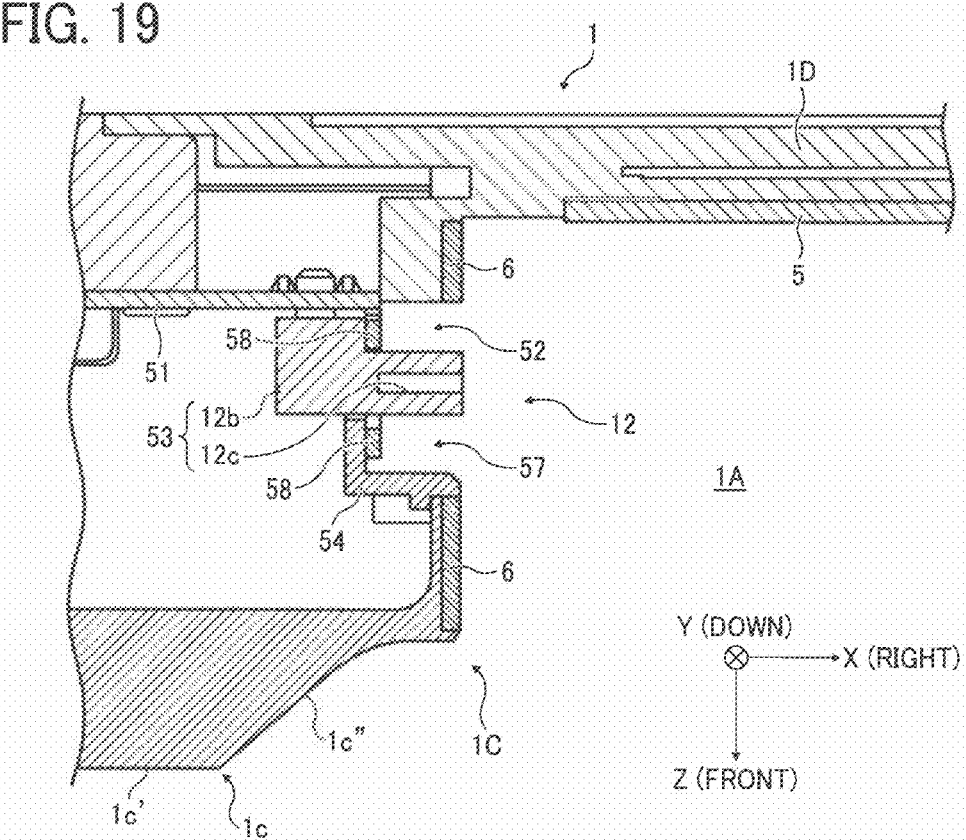
FIG. 19 is a cross sectional view showing a detailed structure of a camera-body connector section shown in FIGS. 4 and 5C.
Figure 20:
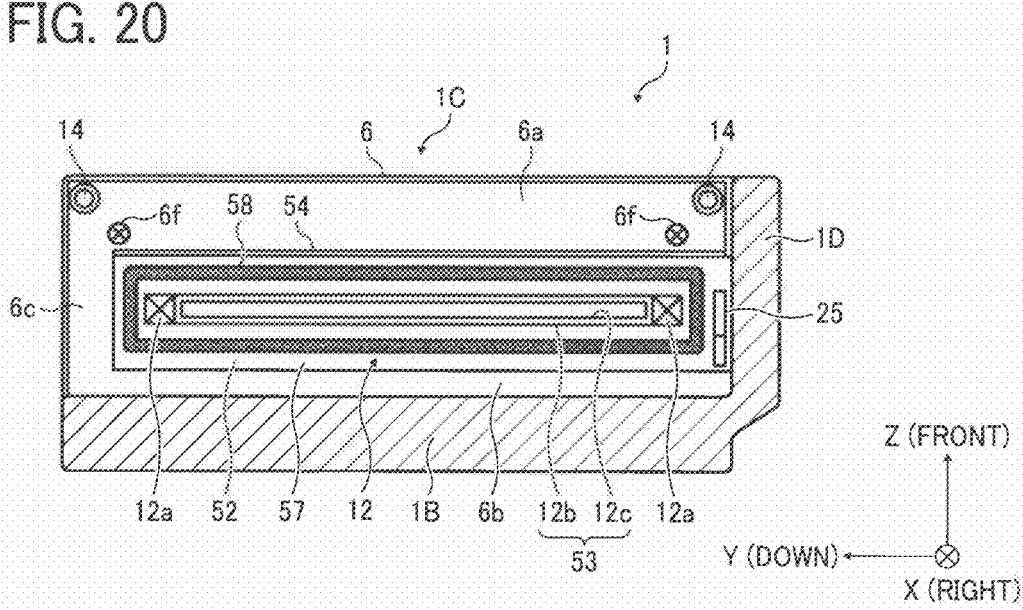
FIG. 20 is a cross sectional view showing a state where the camera-body connector section shown in FIG. 19 is viewed straight with the back wall section on the downside.

As shown in FIGS. 19 and 20, in the side wall section 1C, an opening for fitting 52 which opens to the recess 1A is formed corresponding to the image-pickup-unit connector section 11. A connector main body 53 is placed in the opening 52. The camera-body connector section 12 is formed by placing the connector main body 53 in the opening 52. The side wall surface reinforcing sheet metal member for body 6 is placed so as to avoid the opening 52.

Here, as shown in FIG. 20, the side wall surface reinforcing sheet metal member for body 6 includes an upper marginal plate section 6a, a lower marginal plate section 6b and a connecting plate section 6c which connects the plate sections 6a and 6b, when the side wall section 1C is viewed from the front face, with the back wall section 1B on the downside and the upper wall section 1D on the right side. The connecting plate section 6c is located on the left side and the right side of the side wall surface reinforcing sheet metal member for body 6 is open.

An outline configuration of the opening 52 is defined by a connector cover member 54 provided in the side wall section 1C and the back wall section 1B. The connector main body 53 is formed of the connector terminal 12c covered with the covering member 12b.

Figure 21:
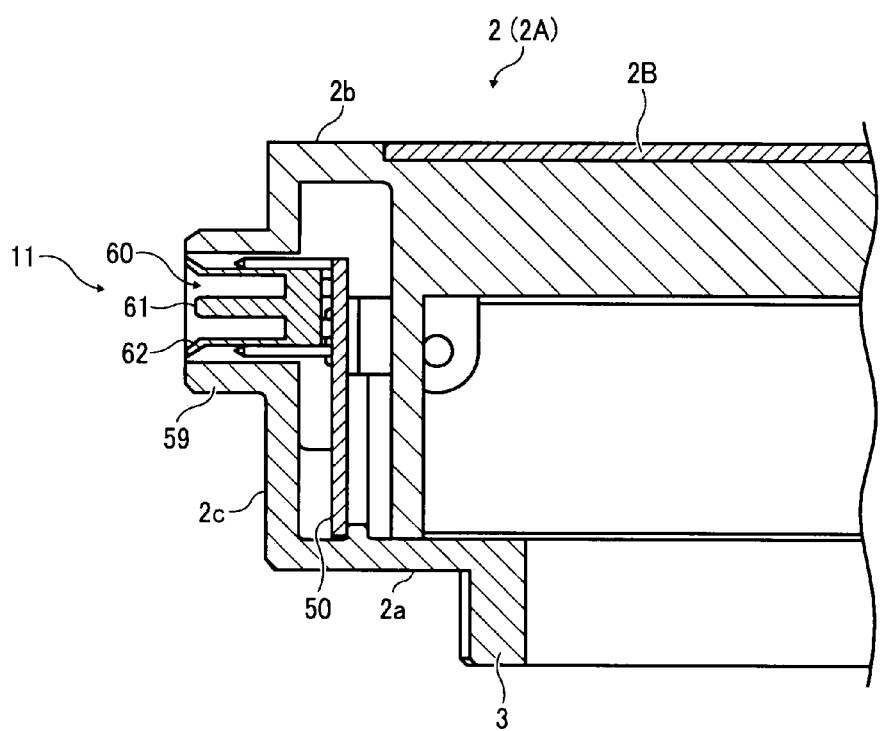
FIG. 21 is a cross sectional view showing a detailed structure of the image-pickup-unit connector section shown in FIG. 8.

To enable data transfer (communications) between the camera body 1 and the image pickup unit 2, the connector main body 53 is connected to a connector main body 60 of the image-pickup-unit connector section 11 shown in FIG. 21.

The connector terminal 12c can be electrically connected with a connector terminal 61, as a result of horizontal movement of the connector main body 60 of the image-pickup-unit connector section 11 relative to the connector terminal 61. Here, the connector terminal 12c is of female type. In addition, the connector terminal 61 is of male type. Additionally, the connector terminal 61 is surrounded by a surrounding member 62. As shown in FIG. 8, positioning holes 63 into which positioning protrusion 12a, 12a are fitted are formed between the surrounding member 62 and the connector terminal 61.

The connector terminal 12c is connected to a connector board 51 which is fixed to the camera body 1. On the connector board 51, electric circuits such as a circuit to control the image pickup unit 2 by manipulating the manipulating section, a processing circuit to process images captured by the image pickup unit 2, or the like are wired.

The covering member 12b is formed of an elongated shape so as to cover the connector terminal 12c. The covering member 12b serves a function to prevent the electric circuit, an electric element or the like from being damaged by discharge, caused by a touch of a human hand, of static electricity accumulated on human body, when the image pickup unit 2 is attached to the camera body 1.

In the camera-body connector section 12, an annular groove 57 surrounding the connector main body 53 is formed due to a difference in dimensions of the opening 52 and the connector main body 53. The annular groove 57 is such dimensioned that a connector cover section 59 as a fitting protrusion of the image-pickup-unit connector section 11 can enter medially, while surrounding the connector main body 53 and the connector main body 60 which are mutually connected. A rectangular sealing member 58 which surrounds the connector main body 53 is provided in the annular groove 57. As shown in FIG. 20, in the annular groove 57, the locking plate 25 is placed more closely to the upper wall section 1D than to the sealing member 58.

The connector cover section 59 of the image-pickup-unit connector section 11 protrudes from the left side surface 2c of the housing 2A. The connector main body 60 is placed within the connector cover 59.

The sealing member 58 is shaped like a sheet formed of elastically deformable materials such as rubber (elastic resin material) or sponge (spongy resin material). The sealing member 58 is bonded to an annular wall forming the annular groove 57 using an adhesive or the like. The sealing member 58 has a dust-proof or water-proof function which prevents dust or liquid or the like from adhering to the connector main body 53 (connector terminal 12c) and the connector main body 60 (connector terminal 61) which are mutually connected as shown in FIG. 22.

Figure 22:
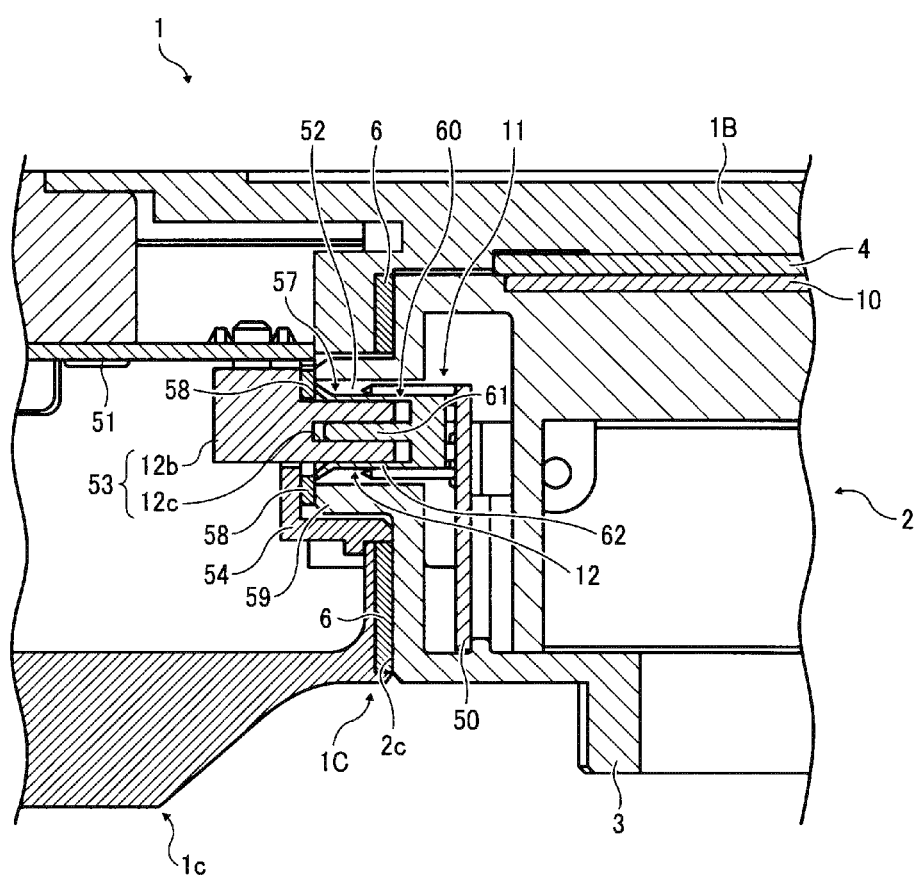
FIG. 22 is a cross sectional view showing how the camera-body connector section shown in FIG. 19 and the image-pickup-unit connector section shown in FIG. 21 are connected to each other.

As shown in FIG. 22, when the image pickup unit 2 is attached to the recess 1A of the camera body 1 in an appropriate manner, the left side surface 2c of the housing 2A abuts on the side wall section 1C, that is to say, the side wall surface reinforcing metal sheet member for body 6, thereby performing positioning of the image pickup unit 2 in the left-right direction (the X direction) in the recess 1A.

In addition, with the image pickup unit 2 attached to the recess 1A of the camera body 1, the connector cover section 59 (see FIG. 21) of the image-pickup-unit connector section 11 is loosely fitted into the annular groove 57 of the camera-body connector section 12, the connector main body 60 of the image-pickup-unit connector section 11 is appropriately connected to the connector main body 53 of the camera-body connector section 12 by the paired positioning holes 63 and the paired positioning protrusions 12a, and thus the camera body 1 and the image pickup unit 2 are connected so that they can electrically communicate.

Then, a tip of the connector cover section 59 of the image-pickup-unit connector section 11 is brought into contact with the sealing member 58, by applying pressure, provided in the annular groove 57 of the camera-body connector section 12. Reliable sealing between the tip of the connector cover section 59 and the sealing member 58 is possible by the tip of the connector cover section 59 coming into contact with the sealing member 58 through application of pressure. Thus, it is possible to prevent entry of dust or liquid or the like from the recess 1A of the camera body 1 into the connector cover section 59 of the connector main body 60 of the connector section 11.

(Description of Shape of Plate Spring 2K)

Figure 23:
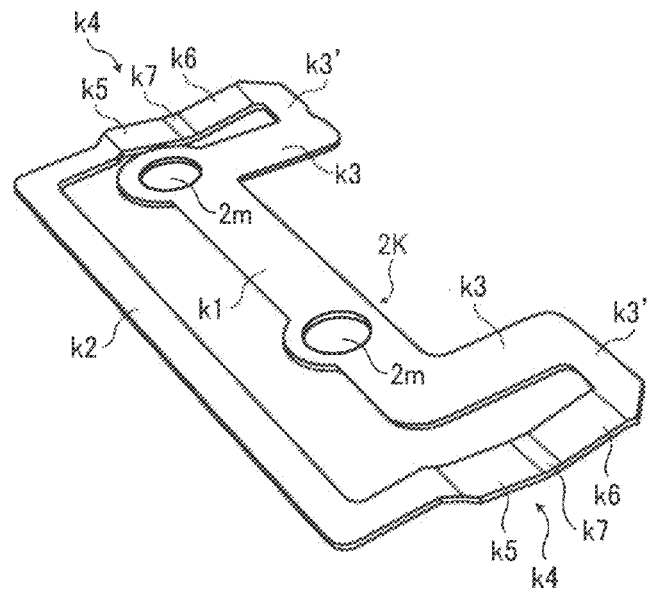
FIG. 23 is an enlarged perspective view showing an appearance configuration of the plate spring shown in FIG. 10A.
Figure 24:
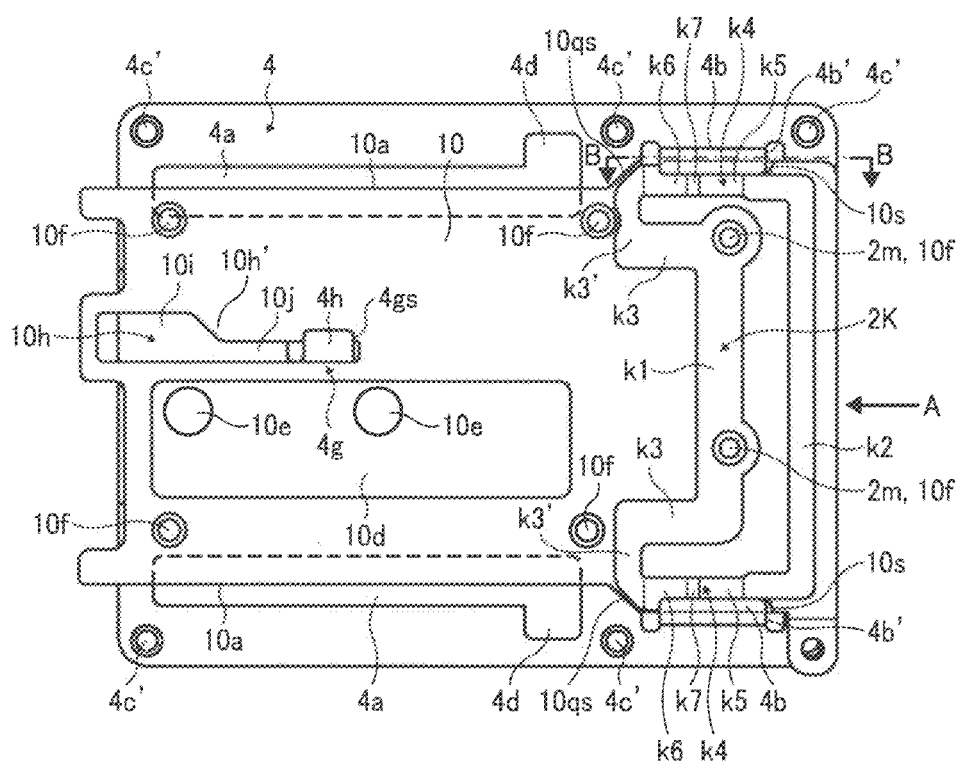
FIG. 24 is a plan view showing a relative positional relationship of the rear wall reinforcing sheet metal member for body shown in FIG. 5A, the rear wall reinforcing sheet metal member for unit shown in FIGS. 6 and 9, and the plate spring shown in FIGS. 10A, 10B and 23.

FIG. 23 is an enlarged perspective view showing an appearance configuration of the plate spring 2K. FIG. 24 is a view showing a positional relationship of the plate spring 2K, the rear wall surface reinforcing sheet metal member for unit 10 and the rear wall surface reinforcing sheet metal member for body 4 when their engagement is in a complete state.

As shown in FIGS. 10B, 23 and 24, the plate spring 2K has a mounting plate section k1 and a free plate section k2. The mounting plate section k1 and the free plate section k2 are almost parallel to each other and extend in a direction orthogonal to the paired guiding holes for engaging claw cut and bent section 10r of the image pickup unit 2 shown in FIGS. 6 and 10B. The paired screw holes 2m, 2m are formed at an interval in the paired the mounting plate sections k1. The mounting plate sections k1 have paired parallel plate sections k3, k3 which extend in parallel with the guiding holes for engaging claw cut and bent section 10r from the parts where the screw holes 2m, 2m are formed. The paired parallel plate sections k3, k3 have orthogonal plate sections k3', k3' which orthogonally extend in a direction to the engaging claw entry allowing hole 10q on the same plane in the proximity to the border between the guiding holes for engaging claw cut and bent section 10r and the engaging claw entry allowing hole 10q. The paired orthogonal plate sections k3', k3' are connected to each other at both ends in a direction in which the free plate section k2 extends.

In FIGS. 23 and 24, signs k4, k4 designate connecting plate sections which connect the paired orthogonal plate sections k3', k3' and the free plate section k2. As shown in FIG. 23, the paired connecting plate sections k4, k4 includes inclined elastic plate sections k5, k6 and abutting plate sections k7. The paired connecting plate sections k4, k4 extends along the guiding holes for engaging claw cut and bent section 10r. The inflected plate sections 4f, 4f of the paired engaging claws 4b, 4b are configured so that with reference to the rear wall surface reinforcing sheet metal member for unit 10, they face the connecting plate sections k4, k4 from the inside of the image pickup unit 2 rather than from the rear wall surface reinforcing sheet metal member for unit 10. That is to say, the inflected plate sections 4f, 4f of the paired engaging claws 4b, 4b are configured so that they face the connecting plate sections k4, k4.

The inclined elastic plate section (biasing plate spring (plate spring 2K)) k5, k6 are located on the engaging plate sections 10n, 10n facing the engaging claws 4b, 4b and bias the image pickup unit 2 to the back wall section 1B. Therefore, the plate spring 2K (the inclined elastic plate section k5, k6) serves as the biasing section which biases the image pickup unit 2 to the back wall section 1B of the camera body 1 in cooperation with the paired engaging claws 4b, 4b and the engaging plate sections 10n, 10n facing the paired engaging claws 4b, 4b.

If there was no engaging protrusion 4g when the inflected plate section 4f abuts on the engaging plate section 10n from the outside of the image pickup unit 2, both connector sections 11, 12 might be connected to each other with the image pickup unit 2 inclined to the rear wall surface reinforcing sheet metal member for body 4 of the camera body 1. However, according to the embodiment of the present invention, no such problem occurs because of the following reasons.

Figure 26:
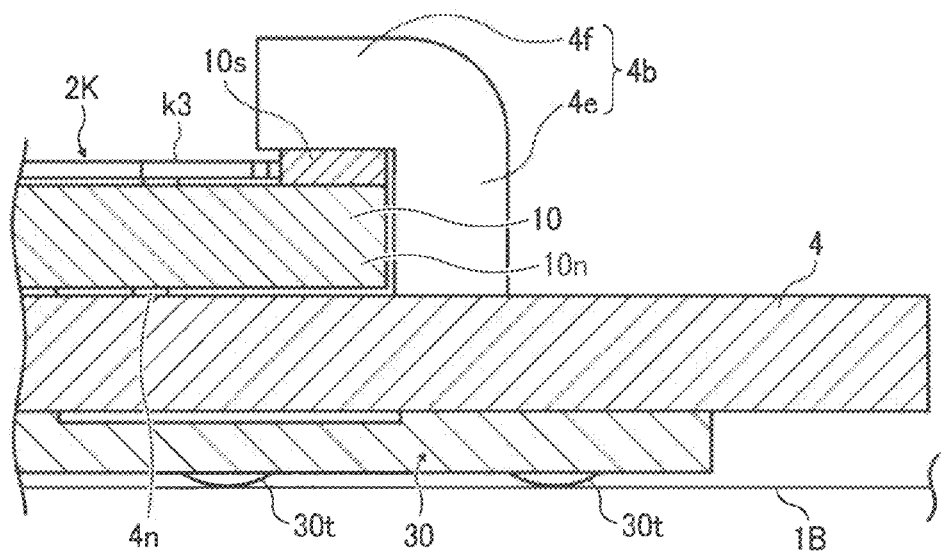
FIG. 26 is a cross sectional view showing an engagement relationship between the rear wall reinforcing sheet metal member for unit shown in FIG. 25 in a partially enlarged manner.
Figure 27:
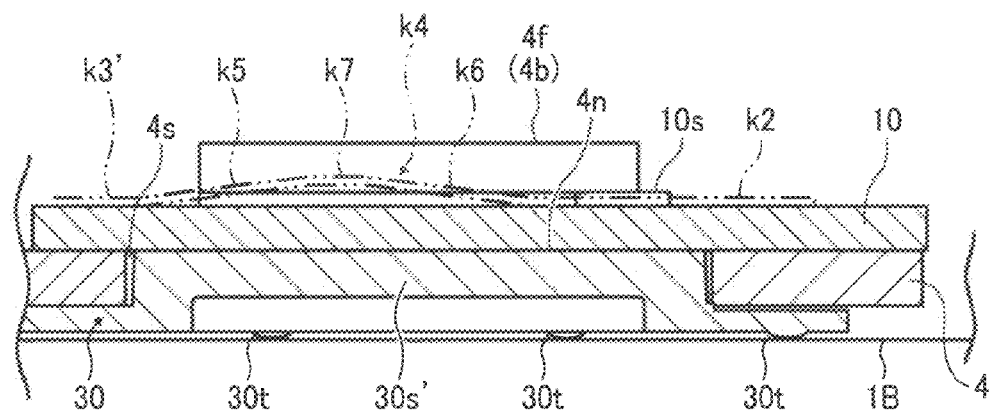
FIG. 27 is a cross sectional view along an arrow B-B line shown in FIG. 24.

In addition, as shown in FIGS. 26 and 27, when the inflected plate section 4f is located within the image pickup unit 2 with respect to the engaging plate section 10n, irrespective of presence of engaging protrusion 4g, there is no possibility that both connector sections 11, 12 are connected to each other with the image pickup unit 2 inclined to the rear wall surface reinforcing sheet metal member for body 4 of the camera body 1.

Paired engaging claws 4b, 4b can abut on the abutting plate section k7 with the image pickup unit 2 appropriately attached to the camera body 1, that is to say, with the image-pickup-unit connector section 11 and the camera-body connector section 12 connected to each other.

Figure 25:
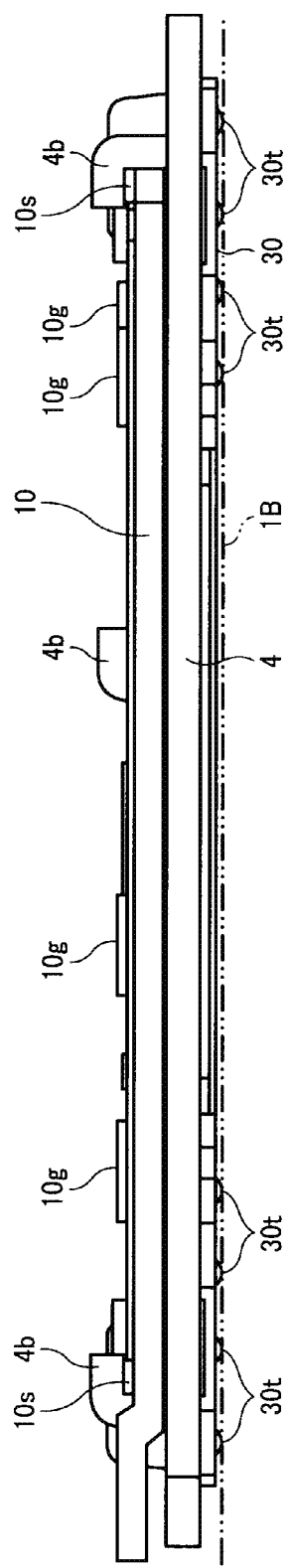
FIG. 25 is an explanatory view of an engagement relationship of the rear wall reinforcing sheet metal member for unit and the rear wall reinforcing sheet metal member for body shown in FIG. 24, as viewed from a direction of an arrow A shown in FIG. 24.

As shown in FIGS. 24 to 26, pressing force in a direction to the rear wall surface reinforcing sheet metal member for body 4 by biasing force due to elastic deformation of the inclined elastic plate sections k5, k6 is applied to the rear wall surface reinforcing sheet metal member for unit 10, with engagement of the engaging claw 4b with engaging plate sections 10n, 10n of the rear wall surface reinforcing sheet metal member for unit 10 being completed. As a result of this, the image pickup unit 2 is pressed against the camera body 1. In addition, the semicircular convex section 10s abuts on the inflected plate section 4f, and even if there is any gap attributed to a dimension error between the inflected plate section 4f and the rear wall surface reinforcing sheet metal member for unit 10, play due to this dimension error will be absorbed by elastic deformation of the plate spring 2K and the semicircular convex section 10s, as shown in FIG. 27. In addition, FIG. 27 shows a state of the plate spring 2K before the elastic formation in a two-dot chain line.

(Description of Sliding Contact Ribs 4k, 4n of Resin Plate 30 and Supplementary Description of Configuration of Resin Plate 30)

The function of the sliding contact rib 4k is identical to that of the sliding contact rib 4n. Thus, here, the function of the sliding contact rib 4n will be described with reference to FIGS. 28 and 29.

Figure 28:
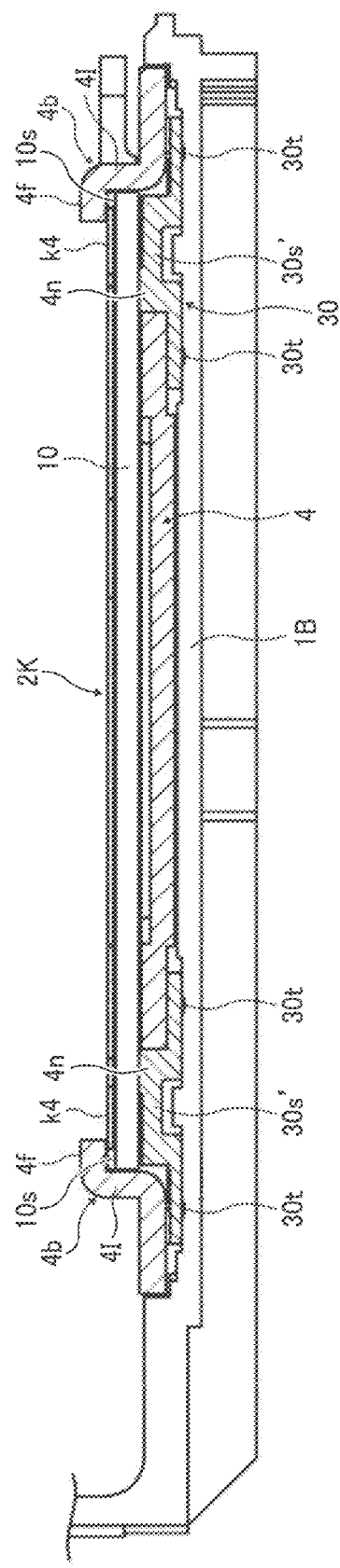
FIG. 28 is a view cross-sectionally showing in detail the engagement relationship of the rear wall reinforcing sheet metal member for unit and the rear wall reinforcing sheet metal member for body shown in FIG. 25.
Figure 29:
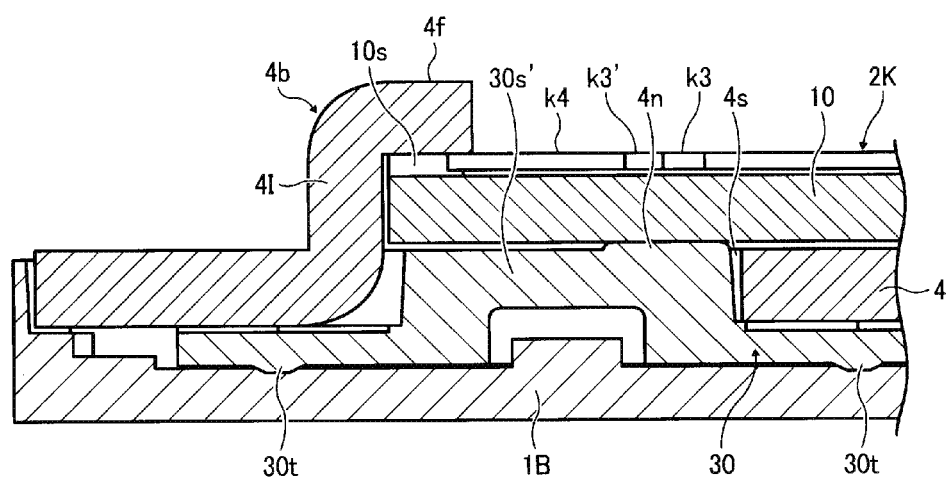
FIG. 29 is a partial enlarged cross-sectional view showing the engagement relationship of the rear wall reinforcing sheet metal member for unit and the rear wall reinforcing sheet metal member for body shown in FIG. 28.

If a configuration is such that the rear wall surface reinforcing sheet metal member for unit 10 comes into direct contact with the rear wall surface reinforcing sheet metal member for body 4 when the image pickup unit 2 is attached to or detached from the camera body 1 by sliding the image pickup unit 2 in a left-right direction, metallic sound is produced due to metal scraping of the rear wall surface reinforcing sheet metal member for body 4 and the rear wall surface reinforcing sheet metal member for unit 10. However, according to the first embodiment, it is possible to prevent production of metallic sound due to metal scraping because the configuration is such that when the image pickup unit 2 slides in a left-right direction with respect to the camera body 1, the rear wall surface reinforcing sheet metal member for unit 10 slides in the left-right direction while being in sliding contact with the resin-made sliding contact rib 4n, as shown in FIGS. 28 and 29.

Alternatively, as a configuration of placing the resin plate 30 in the recess of the back wall section 1B, if the image pickup unit 2 is pressed against the back wall section 1B, the resin plate 30 elastically deforms and rolls back due to a dimensional tolerance between the back wall section 1B and the resin plate 30, and so-called "clip-clop sound" is produced due to the roll-back of the resin plate 30. In the first embodiment, however, since a configuration is such that multiple semicircular protrusions 30t are formed to absorb a dimensional tolerance between the back wall section 1B and the resin plate 30 at appropriate positions on a surface of the resin plate 30 on the side facing the back wall section 1B, as shown in FIGS. 25 to 29, the configuration can prevent the roll-back and elastic deformation due to the dimensional tolerance and avoid "clip-clop sound" due to the roll-back.

(Circuit Configuration of Electrical Parts Incorporated in Camera Body 1 and Image Pickup Unit 2)

Now, electrical parts incorporated in the camera body 1 and image pickup unit 2 will be described with reference to FIG. 30.

Figure 30:
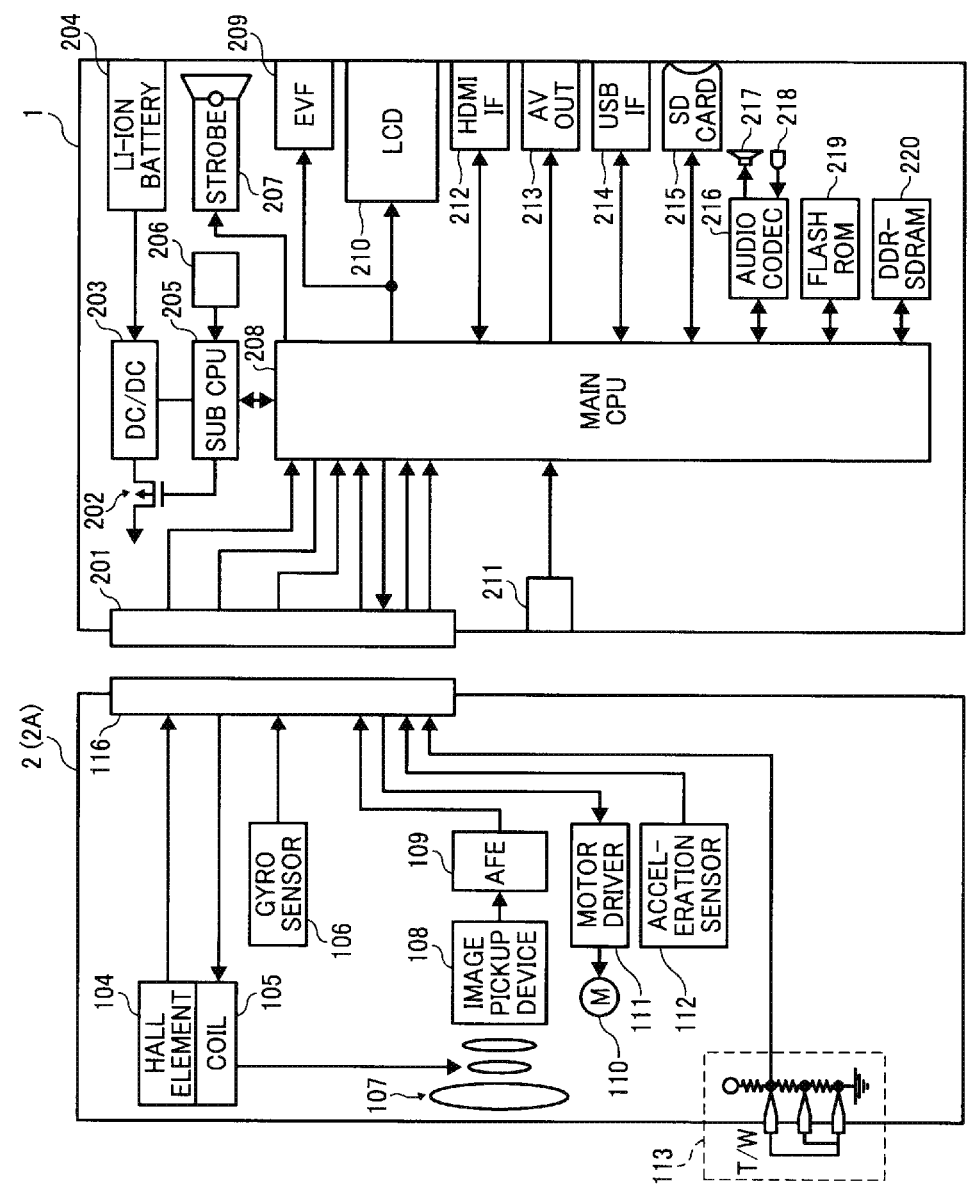
FIG. 30 is a circuit diagram showing one example of an electrical part built in the imaging apparatus shown in FIGS. 1 and 2.

As shown in FIG. 30, for example, in the camera body 1 provided are a lithium ion battery 204, a strobe light emitting section 207, an electronic viewfinder device 209, a liquid crystal display device (LCD) 210 having a display surface 1b as a display section, a high-vision television connector interface (HDMIIF) 212, an audio-video (AVOUT) output terminal 213, an USB interface (USBIF) 214, an SD card interface (SD card) 215, an audio-codec circuit (Audio codec) 216, a speaker 217, a microphone 218, a flash ROM (Flash ROM) 219 as a recording medium which stores image data, a DDR-SDRAM 220, a main CPU 208 also functioning as a receiving section which receives image data, manipulation switches 206, 211 which give an imaging instruction, a sub-CPU (Sub CPU) 205 as an imaging instruction receiving section which receives an imaging instruction from the manipulation switch 206, a DC/DC power circuit 203, a switching element 202, and a connector terminal 201 (12c) of the camera-body connector section 12.

They constitute a part of electrical parts having publicly known functions which a digital camera is required to have as an imaging apparatus. The manipulating switch 206 is the release button 5y, for example, and the manipulating switch 211 is a manipulation key for manipulating the liquid crystal display (LCD) 210, for example, or the like. The liquid crystal display (LCD) 210 is provided on the back wall section 1B, for example. The manipulating switch 211 is provided at an appropriate position on the back wall section 1B.

In the housing 2A of the image pickup unit 2 are provided an imaging lens unit 107 as an optical system, an image pickup device 108, an AFE circuit 109, a hall element (Hall element) 104, a driving coil (Coil) 105, a gyro sensor (Gyro sensor) 106, a motor driver (Motor Driver) 111, a drive motor (M) 110, an acceleration detection sensor 112, a Tele/Wide detection switch 113, and a connector terminal 116 (61) of the image pickup unit connector section 11 which transmits image data.

These also constitute a part of included parts having the publicly known functions which a digital camera is required to have as an imaging apparatus. The imaging lens unit 107 includes multiple lenses, and a part of the multiple lens system is provided in the movable barrel 3b. In addition, in the first embodiment, although the configuration is described as having the drive motor (M) 110 and the motor driver 111 provided in the image pickup unit 2, a configuration may alternatively be such that they are provided in the camera body 1.

Here, power is supplied to the image pickup unit 2 from the camera body 1. The hall element 104, the driving coil 105, and the gyro sensor 106, for example, constitute a part of the image stabilization mechanism. Signals of the image stabilization mechanism are input into the main CPU 208 by way of the connector terminals 116, 201, and the main CPU 208 performs image stabilization operation on the basis of these signals. The image stabilization operation is an operation to correct blurring of images projected on a light receiving surface of an image pickup device caused by hand movement.

For example, such an operation may be to drive an image pickup device in a direction opposite to a direction of blurring detected by the gyro sensor 106 or to drive some optical devices of the image pickup lens unit 107 in a direction identical to the direction of blurring detected by the gyro sensor 106. A video signal of the image pickup device 108 is input into the main CPU 208 by way of the AFE circuit 109, subjected to predetermined image processing, and displayed on the liquid crystal display (LCD) 210 or the like.

Signals of the Tele/Wide detection switch 113 are input to the main CPU 208 by way of the connector terminals 116, 201, and the main CPU 208 controls the motor driver 111 and the drive motor 110 on the basis of the switch signals of the Tele/Wide detection switch 113 and the manipulating switch 211, and thereby drive controls the image pickup lens unit 107. Detection output of the acceleration detection sensor 112 is input to the main CPU 208 by way of the connector terminals 116, 201, and the main CPU 208 controls inclination of images to be displayed on the liquid crystal display (LCD) 210 based on detection output of the acceleration detection sensor 112. Based on the detection output of the acceleration detection sensor 112, a degree of inclination of the image pickup unit 2 to horizontality is displayed on the liquid crystal display (LCD) 210. The degree of inclination of the image pickup unit 2 to horizontality may be expressed by a numeric value or an image.

When the manipulating switch 206 is manipulated, the image pickup unit 2 captures a subject on the basis of an imaging instruction thereof and converts the subject image into image data. The connector terminal 116 transmits the image data to the main CPU 208.

Figure 31:
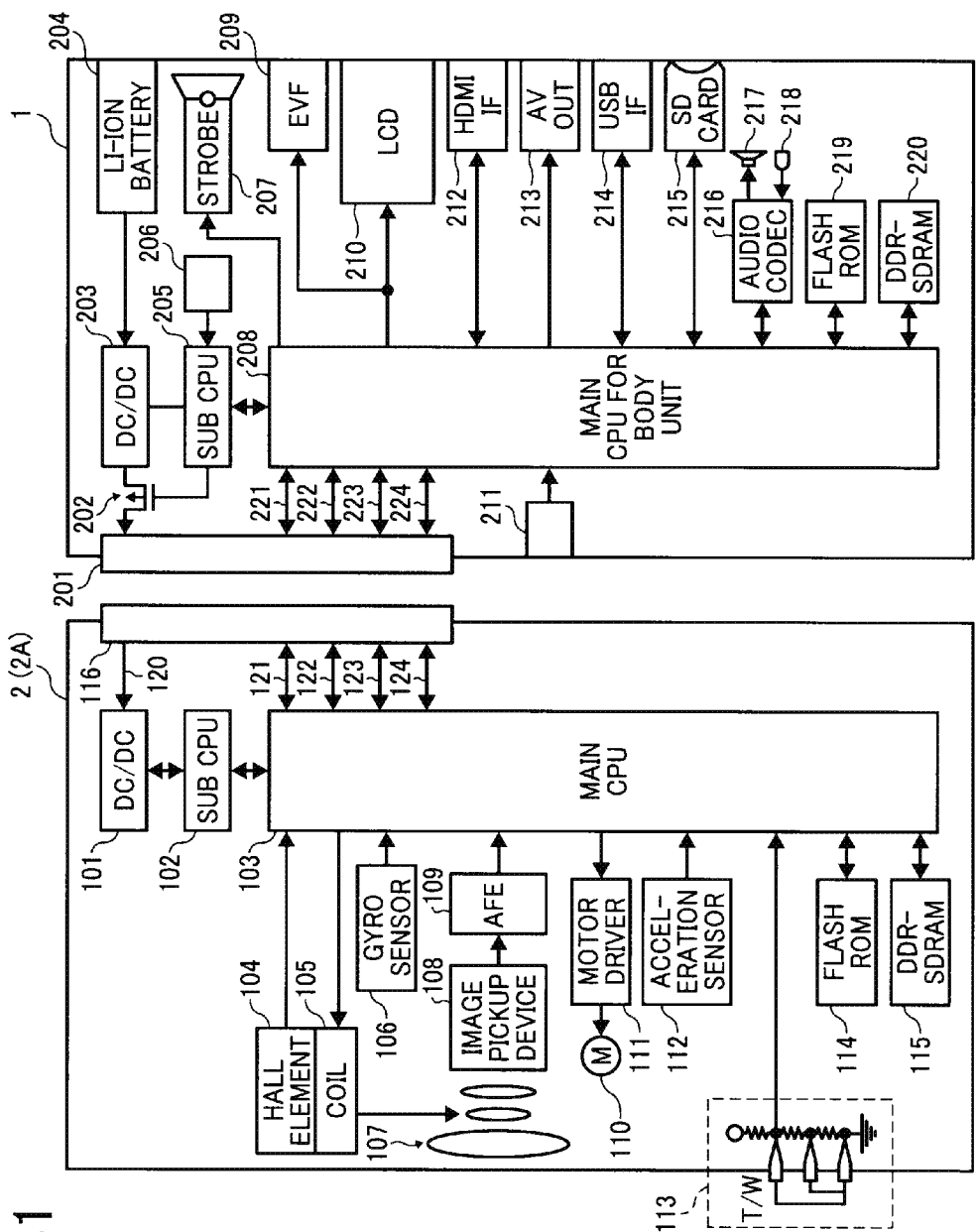
FIG. 31 is a circuit diagram showing another example of an electrical part built in the imaging apparatus shown in FIGS. 1 and 2.

As shown in FIG. 31, such a configuration can be adopted that a DC/DC power circuit 101, a sub CPU 102, a main CPU 103, a flash ROM 114, and a DDRSDRAM 115 are provided in the image pickup unit 2, and after the main CPU 103 performs image processing, an image processing signal is transmitted to the main CPU 208 by way of the connector terminals 116, 201. Alternatively, such a configuration can be adopted that the main CPU 103 performs compression processing into a format such as JPEG or the like, and transmits compressed image data to the main CPU 208 by way of the connector terminals 116, 201. Thus, the configuration in which the image pickup unit 2 performs image processing or compression processing enables stable images with less noise to be transmitted to the main CPU 208 of the camera body 1. These electrical parts are arranged on an electrical base (not shown).

Thus, according to the first embodiment of the present invention, as shown in FIGS. 1 and 2, image pickup units 2 of different sizes can be attached to or detached from the same camera body 1. If a camera body 1 and an image pickup unit 2 are configured so that when the image pickup unit 2 is attached to the camera body 1, a lower surface of the housing 2A of the image pickup unit 2 is flush with that of the camera body 1, handling of the camera body 1 to which the image pickup unit 2 is attached will be easier. Furthermore, if a configuration is such that even when an image pickup unit 2 of a different size is attached to the camera body 1, a lower surface of the image pickup unit 2 is flush with that of the camera body 1, handling of the camera body 1 will be easier irrespective of whatever size of the image pickup unit 2 is attached.

Since the recess 1A of the camera body 1 is open to three directions (right, down, forward) and the restriction on the size of an image pickup unit 2 to the camera body 1 is eased, a large-size high-sensitive image pickup device or a small-size image pickup device can be placed in the image pickup unit 2 according to a customer's need, and an image pickup unit 2 whose size differs in the right, left, up, down, forward and backward directions can be attached to or detached from a common camera body 1. In addition, as freedom in size of the lens barrel 3 of the image pickup unit 2 has been increased, the image pickup unit can be offered as an interchangeable lens group unit of a variety of lenses from a single-focus lens to a high-power zoom lens. Therefore, customers purchase only an image pickup lens 2 and will upgrade it as the image pickup device 108 progresses.

Since the recess 1A of the camera body 1 is opened to the two directions of the right and down directions, an image pickup unit 2 having different sizes in a left-right direction and an up-down direction can be attached. Thus, as the restriction on the size of the image pickup unit 2 to the camera body 1 has been eased, a large-size high-sensitive image pickup device or a small-size image pickup device can be placed in the image pickup unit 2 according to a customer's need, and image pickup units 2 of different sizes having different lens barrels 3 or image pickup devices can be attached to or detached from a common camera body 1. In addition, as freedom in size of the lens barrel 3 of the image pickup unit 2 has been increased, the image pickup unit 2 can be offered as an interchangeable lens group unit of a variety of lenses from a single-focus lens to a high-power zoom lens. Therefore, customers purchase only an image pickup lens 2 and will upgrade it as the image pickup device 108 progresses.

According to the embodiment of the present invention, as stated above, it is possible to attach to or detach from the same camera body 1 multiple image pickup units 2 which have lens barrels 3 or image pickup devices of different sizes and which have different sizes of housings placed in the recess. The lens barrel 3 of the image pickup unit 2 shown in FIG. 2 is longer and has larger optical system than the lens barrel 3 of the image pickup unit 2 shown in FIG. 1. It is also desirable to configure the camera body 1 and the image pickup unit 2 so that the lower surface 2e of the housing 2A of the image pickup unit 2 is flush with that of the camera body 1 when the image pickup unit 2 is attached to the camera body 1.

That is to say, here, as the recess 1A of the camera body 1 is opened to three directions, and as the restriction on the size of the image pickup unit 2 to the camera body 1 has been eased, a large-size high-sensitive image pickup device or a small-size image pickup device can be placed in the image pickup unit 2 according to a customer's need, and image pickup units 2 with different lens barrels 3 or image pickup devices can be attached to or detached from a common camera body 1. In addition, as freedom in size of the lens barrel 3 of the image pickup unit 2 has been increased, the image pickup unit can be offered as an interchangeable lens group unit of a variety of lenses from a single-focus lens to a high-power zoom lens. Therefore, customers purchase only an image pickup lens 2 and will upgrade it as the image pickup device 108 progresses. In addition, when a bay connector is used for both connector sections 11, 12, image data can be transferred in a short time.

In addition, there were restrictions on the size of an image pickup device, the distance between a lens mount and an image pickup device in an optical axis direction (flange back), a diameter of a lens mount or the like in a conventional standard for a lens mount for an interchangeable lens (Four Thirds System or the like, for example). Due to the restrictions, there was a limit on slimming/downsizing as an entire camera.

In contrast, in the present invention, the size of an image pickup device, the distance between an optical system and the image pickup device in an optical axis direction, a diameter of a lens barrel or the like can be freely set for each image pickup unit. Depending on an application of each image pickup unit, a variety of optical systems and various types/sizes of image pickup devices (types: CMOS, CCD or the like. Sizes: ASP-C, ⅔-inch type, ½.33 type or the like) can be freely combined.

In addition, when slimming/downsizing of an entire camera is performed, an entire size of an image pickup unit can be reduced since length of an optical axis direction of the image pickup unit 2 can be shortened and a diameter of a lens barrel can be reduced.

On the other hand, a larger-size image pickup device and a larger optical system can be combined to improve imaging performance of a camera, thereby being able to improve various imaging capabilities. Also in this case, since a degree of freedom in a combination of an optical system and an image pickup device is high and optimum designing is possible by combining an optical system and an image pickup device, an entire size of the image pickup unit can be reduced while improving the imaging performance. It is also possible to combine a large optical system with a small image pickup device or a small optical system with a large image pickup device, depending on applications.

Furthermore, since an image pickup unit which has been slimmed and downsized as an entire camera and an image pickup unit which has improved imaging performance of the camera can be attached to or detached from the same camera body, the entire imaging system including a camera having various characteristics can be reduced in weight and downsized. That is to say, according to the present invention, a digital camera (imaging device) itself and an entire imaging system can be downsized, thereby improving portability.

In addition, since a 68-pin bay connector is used for both connector sections 11, 12 which perform communications between the camera body 1 and the image pickup unit 2, transfer of large volume image data can be performed in a short time. Alternatively, in order to perform communications between a camera body 1 and an image pickup unit 2, other methods including a wireless communication system, an optical communication system, a contact communication system which performs communications by abutting instead of fitting may be used.

In addition, both connector sections 11, 12 supply power to the image pickup unit 2 from the camera body 1 (see FIG. 31). In the first embodiment, since both connector sections 11, 12 perform communications as well as power supply, failures are less likely to occur when pulling out or inserting the connectors. However, a configuration may be such that a connector for communications and a connector for power supply are separately provided.

(Procedure for Attaching Image Pickup Unit 2 to Camera Body 1)

Figure 32:
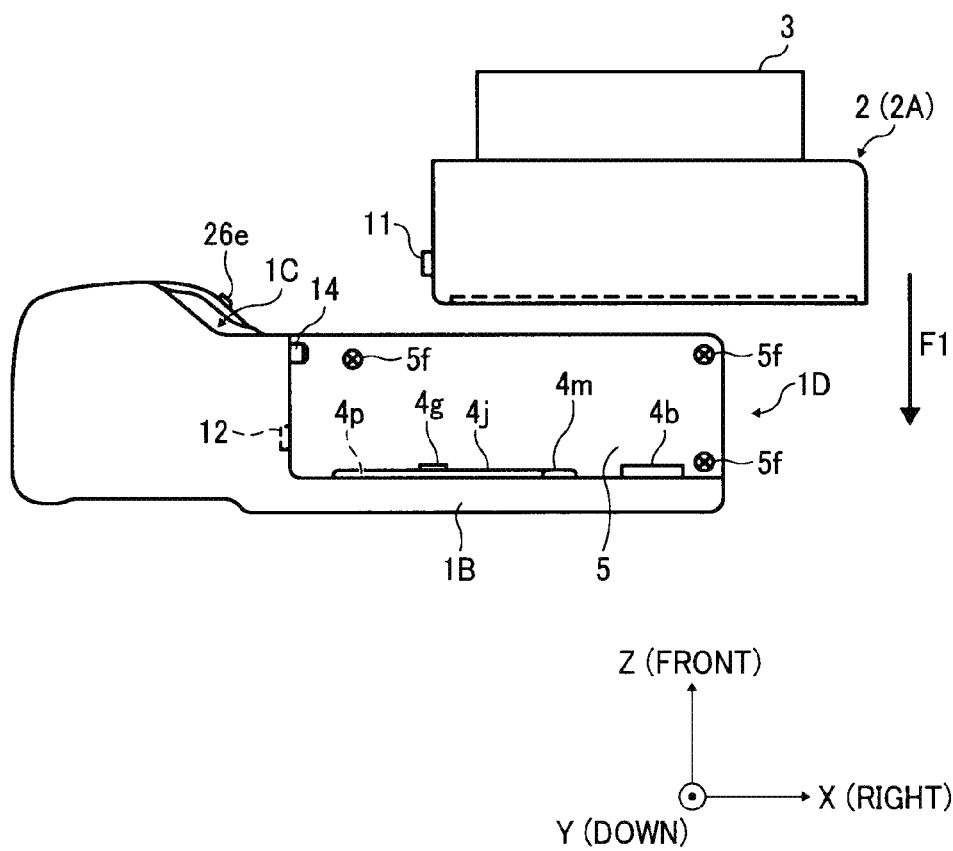
FIG. 32 is a view for explaining a state where the image pickup unit is attached to the camera body shown in FIG. 4.

Procedure for attaching an image pickup unit 2 to a camera body 1 is generally described. In FIG. 32, the image pickup body 1 is set to a rear part 1B of the camera body 1 by being moved to a negative side direction of the Z direction (see an arrow F1). Then, a camera-body connector section 12 and an image-pickup-unit connector section 11 are fitted by the image pickup unit 2 being moved to a negative direction (left direction (see an arrow F2 in FIG. 33)) of the X direction. An engaging protrusion (angle controlling member) 4g is positioned between the side wall section 1C and a biasing section when it is viewed in a left-right direction (XY direction) in this state.

In addition, in the image pickup unit 2, in a state where the camera-body connector section 12 and the image-pickup-unit connector section 11 are engaged with each other, when the image pickup unit 2 is moved to a positive direction (right direction) in the X direction with respect to the camera body 1, the camera-body connector section 12 and the image-pickup-unit connector section 11 are disengaged. Therefore, a direction in which the image pickup unit 2 is attached to or detached from the side surface wall of the side wall section 1C of the camera body 1 is the X direction (left-right direction).

Procedure for setting the image pickup unit 2 to the camera body 1 will be described in detail in the following.

Figure 33:
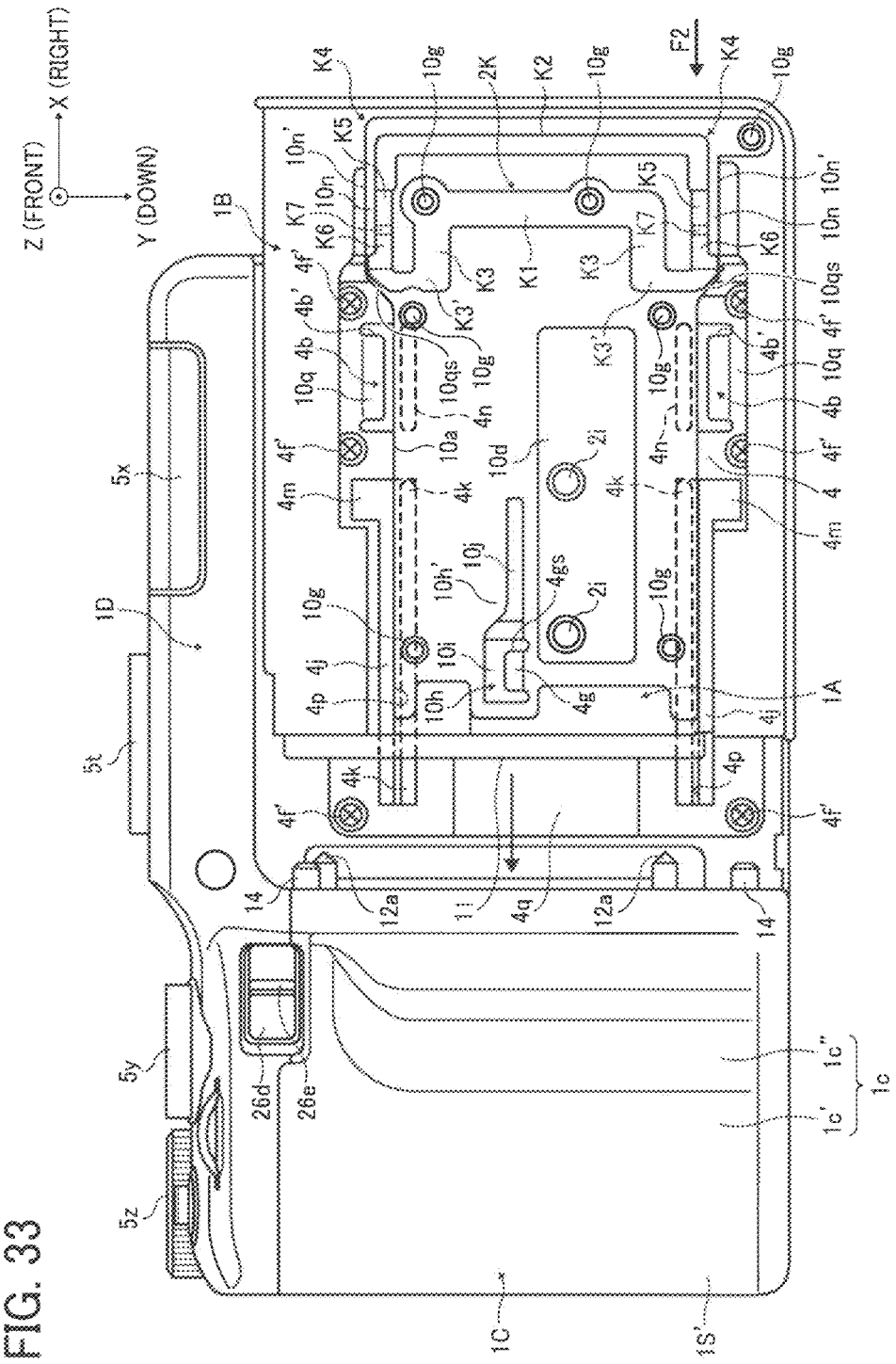
FIG. 33 is an explanatory diagram showing a state where the image pickup unit shown in FIG. 1 is placed on the camera body shown in FIG. 1, and an explanatory diagram showing a correspondence between engaging protrusions of the rear wall reinforcing sheet metal member for body and engaging protrusion guiding holes of the rear wall reinforcing sheet metal member for unit.

The camera body 1 is put into a horizontal state with a back wall section 1B of the camera body 1 on the downside. For example, the camera body 1 is put into a horizontal state by putting it on a left hand. The image pickup unit 2 is moved close to the camera body 1 from an arrow F1 direction shown in FIG. 32 (front-back direction or up-down direction in FIG. 32), to have an engaging protrusion 4g face an engaging protrusion entry allowing hole 10i, an engaging claw 4b and a rectangular stopper protrusion 4m face an engaging claw entry allowing hole 10q, the engaging claw 4b and the rectangular stopper protrusion 4m enter the engaging claw entry allowing hole 10q, and the engaging protrusion 4g enter the engaging protrusion entry allowing hole 10i, as shown in FIG. 33. Simultaneously, marginal edges 10a, 10a of a rear wall surface reinforcing sheet metal member for unit 10 are caused to be in sliding contact with guiding surfaces 4p, 4p of a rear wall surface reinforcing sheet metal member for unit 10.

Then, as shown in FIG. 33, a part of the marginal edge 10a of the rear wall surface reinforcing sheet metal member for unit 10 is in contact with sliding contact ribs 4k, 4n. If the image pickup unit 2 is moved in this state to an arrow F2 direction shown in FIG. 33, a cut and bent section 4e of the engaging claw 4b is guided along a guiding hole for engaging claw cut and bent section 10r, and a part of an engaging plate section 10n of the rear wall surface reinforcing sheet metal member for unit 10 comes into contact with the sliding contact rib 4n. In addition, simultaneously, a cut and bent section 4i of the engaging protrusion 4g is guided along a guiding hole for engaging protrusion cut and bent section 10j.

When the engaging claw 4b is guided along an inclined wall 10qs of the engaging plate section 10n, the engaging claw 4b elastically deforms a plate spring 2K, and the rear wall surface reinforcing sheet metal member for unit 10 is pressed against the back wall section 1B due to the elastic deformation force applied to the plate spring 2K. This absorbs rattling due to a dimensional error between the image pickup unit 2 and the camera body 1.

In addition, as the image pickup unit 2 is guided to the side wall section 1C, while a plate surface of the rear wall surface reinforcing sheet metal member for unit 10 slides the resin-made sliding contact ribs 4k, 4n, and while the marginal edges 10a, 10a of the rear wall surface reinforcing sheet metal member for unit 10 are in sliding contact with the guiding surfaces 4p, 4p, metallic scraping sound caused by scraping of the rear wall surface reinforcing sheet metal member for unit 10 and the rear wall surface reinforcing sheet metal member for body 4 is also avoided.

Fitting of an auxiliary fitting protrusion 14 and an auxiliary fitting hole 22 is started almost at the same time when the engaging claw 4b comes into contact with the plate spring 2K, and the auxiliary fitting protrusion 14 and the auxiliary fitting hole 22 roughly perform control of a position of the image-pickup-unit connector section 11 with respect to the camera-body connector section 12.

Then, the camera-body connector section 12 and the image-pickup-unit connector section 11 are fitted into each other, as shown in FIG. 22, and the camera body 1 and the image pickup unit 2 are electrically connected so that they can communicate.

A Main CPU 208 of the camera body 1 monitors whether a predetermined pin of the camera-body connector section 12 (camera-body connection detection pin) is connected or not. When it detects that the camera-body connection detection pin is connected with an image-pickup-unit connection detection pin, communications and power transmission between the camera-body connector section 12 and the image-pickup-unit connector section 11 start.

Alternatively, a configuration can be such that when the main CPU detects that the connection detection pin is connected, it immediately starts communications and power transmission between the camera-body connector section 12 and the image-pickup-unit connector section 11.

Alternatively, a configuration can be such that when the main CPU detects that the connection detection pin is connected, it starts communications and power transmission between the camera-body connector section 12 and the image-pickup-unit connector section 11 after predetermined time elapses. That is to say, a connection of the image-pickup-unit connector section 11 and the camera-body connector section 12 only has to establish a condition in which communication is possible, and it is not necessary to perform communications upon connection.

In addition, since a shock absorbing member 22a (see FIG. 8) is provided on the bottom of the auxiliary fitting hole 22, shock due to collision of the camera body 1 and the image pickup unit 2 is alleviated when the auxiliary fitting protrusion 14 and the auxiliary fitting hole 22 are fitted. In addition, the auxiliary fitting protrusion 14 and the auxiliary fitting hole 22 can further mitigate rattling of the image pickup unit 2 to the camera body 1 in a front-back direction.

When a connection of the camera-body connector section 12 and the image-pickup-unit connector section 11 is completed, as shown in FIGS. 24 to 29, the engaging claw 4b abuts on semicircular convex sections 10s, 10s while being subjected to elastic biasing force of the plate spring 2K.

In addition, when component force generated in an inclined wall 25c' by an inclined wall 20e of a to-be-locked claw 20d provided in the image pickup unit 2 abutting on and being pressed against the inclined wall 25c' of a locking claw 25c provided in the camera body 1, as shown in FIG. 14, almost at the same time as when the auxiliary fitting protrusion 14 and the auxiliary fitting hole 22 are fitted and immediately before a positioning protrusion 12a (see FIG. 4) and a positioning hole 63 (see FIG. 8) are fitted exceeds turning and biasing force by the locking spring 28 to the unlocking manipulating member 26, that is, the locking plate 25, the locking plate 25 is turned with a spindle 27 as a supporting point in a direction opposite (direction of action of the component force) to a direction in which the turning and biasing force acts (an arrow F3 direction in FIG. 14).

Then, when the to-be-locked claw 20d climbs over the locking claw 25c, the locking plate 25 turns to return to its original position by turning and biasing force of the locking spring 28. As a result, the locking claw 25c enters a notch section 20c and the to-be-locked claw 20d enters a notch section 25b. Accordingly, the locking claw 25c and the to-be-locked claw 20d are engaged with each other, and the image pickup unit 2 is in a state of being fixed in a left-right direction (X direction), a so-called locked state to the camera body 1. By the locking claw 25c as a locking member and the to-be-locked claw 20d as a to-be-locked member, rattling of the camera body 1 and the image pickup unit 2 in the left-right direction is restricted.

In the first embodiment, the paired engaging claws 4b, 4b reliably engages the engaging plate section 10n, 10n with the image pickup unit 2 locked to the camera body 1. Since the paired engaging plate sections 10n, 10n are formed in a left-right direction at positions far from the paired auxiliary fitting protrusions 14, 14 in the up-down direction formed on the side wall section 1C, force resulting from pullout when the image pickup unit 2 is pulled out to the front side (Z direction positive side) from the camera body 1 is dispersed, and the pullout is reliably inhibited. In addition, application to both connector sections 11, 12 of unreasonable force involved in the pull-out can be inhibited.

In addition, even when a user tries to hold a right lower marginal section of the image pickup unit 2 by hand and to forcibly pull it out to a lower right direction, the paired auxiliary fitting protrusions 14, 14, the paired engaging claws 4b, 4b, and the locking mechanism 24 prevents the pull-out and prevents application of unreasonable force involved in the pull-out to both connector sections 11, 12.

Furthermore, as one action of moving the image pickup unit 2 to the side wall section 1C almost simultaneously completes mechanical fixing of the camera body 1 and the image pickup unit 2 by the locking mechanism 24 and electrical connection of both connector sections 11, 12, an operation of attaching the image pickup unit 2 to the camera body 1 can be performed easily in a short time.

Thus, when the image pickup unit 2 is attached to the camera body 1, a connection with the image pickup unit 2 can be rightly and smoothly performed in the camera body 1.

Additionally, timing to fit both connector sections 11, 12 may differ from timing to start communications and power transmission/receipt of both connector sections 11, 12, independently of the camera-body connection detection pin of the camera body 1.

For example, a configuration may be such that a manipulating section (not shown) which instructs start/end of communications and power transmission/receipt by both connector sections 11, 12 may be provided in the camera body 1, and both connector sections 11, 12 starts/ends the communications and power transmission/receipt depending on manipulation of the manipulating section.

Alternatively, a configuration may be such that a lock state detection section which detects a position of the locking plate 25 is provided, and after the lock state detection section detects that the image pickup unit 2 is locked in a predetermined position of the locking plate 25, both connector sections 11, 12 start/end communications and power transmission and receipt.

Figure 34:
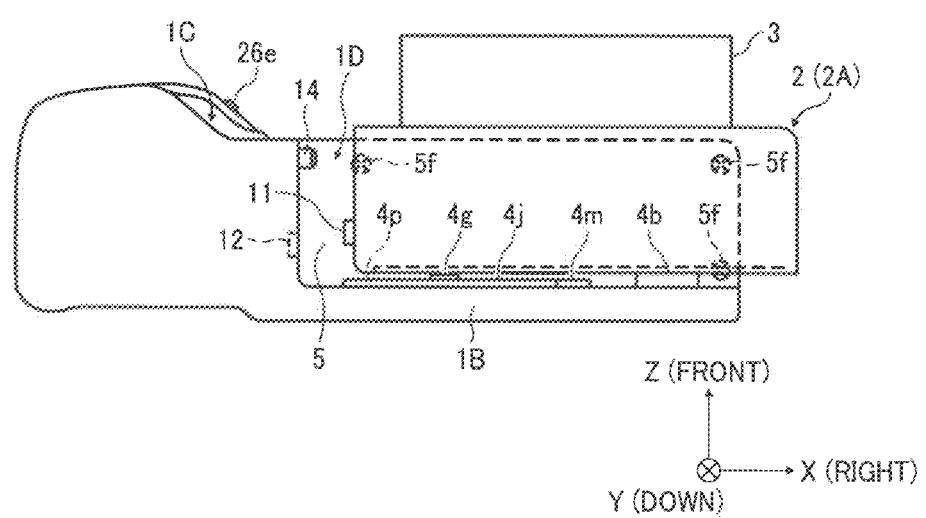
FIG. 34 is an explanatory diagram showing a state where a connection of the image-pickup-unit connector section and the camera-body connector section is prevented by the engaging protrusions shown in FIG. 33 abutting on a constituting wall section shown in FIG. 33 and by an engaging member abutting on an engaging plate section.

Furthermore, since inflected sections 4h of the engaging protrusion (angle controlling member) 4g abut on a constituting wall section 10h' from the outside of the image pickup unit 2 when inflected plate sections 4f of the paired engaging claws 4b abut on the engaging plate sections 10n from the outside (the inflected plate sections 4f rest on the engaging plate sections 10n), as shown in FIG. 34, the image pickup unit 2 floats parallel to the rear wall surface reinforcing sheet metal member for body 4 of the back wall section 1B, for example, and prevents the image pickup unit 2 from tilting to the camera body 1, thereby preventing a connection of the camera-body connector section 12 and the image-pickup-unit connector section 11 with the image pickup unit 2 at a tilt.

In addition, in the first embodiment, as a positional relationship of the auxiliary fitting protrusion 14 and the auxiliary fitting holes 22 is offset, prevention of a mutual connection of both connector sections 11, 12 can be secured. Consequently, destruction of both connector sections 11, 12 is securely prevented.

That is to say, the engaging protrusion 4g functions as an unnatural posture and angle avoidance member (angle controlling member) to prevent the image pickup unit 2 from being connected to the camera body 1 at an unnatural posture and angle, when the image pickup unit 2 is placed in the recess 1A and attached to or detached from the camera body 1, and a connection of the image-pickup-unit connector section 11 and the camera-body connector section 12 is made.

The engaging protrusion 4g also serves a function to prevent an opening section 52 (an annular groove 57) of the camera-body connector section 12 formed on the side wall section 1C of the camera body 1 and a connector cover section 59 as a fitting protrusion section of the image-pickup-unit connector section 11 of the image pickup unit 2 from being obliquely fitted.

In short, the angle controlling member (controlling member) prevents the image-pickup-unit connector section 11 and the camera-body connector section 12 from being connected at an unnatural posture and angle. When the controlling member (4g) is inserted into an insertion opening section (10i), the rear of the image pickup unit 2 and the back wall section 1B of the camera body 1 abut on each other in parallel, and the image-pickup-unit connector section 11 and the camera-body connector section 12 are connected as the image pickup unit 2 moves in a direction to the side wall section 1C.

In addition, when the controlling member (4g) abuts on a controlling member abutting section (10h'), the rear of the image pickup unit 2 and the back wall section 1B of the camera body 1 do not abut on each other in parallel, and the image-pickup-unit connector section 11 and the camera-body connector section 12 are not connected.

In addition, the angle controlling member can prevent the image-pickup-unit connector section 11 and the camera-body connector section 12 from being connected at an unnatural posture and angle, irrespective of presence of a biasing section.

In addition, in the first embodiment, since in the camera body 1, a biasing section which biases the image pickup unit 2 to the back wall section 1B of the camera body 1 is provided with the image pickup unit 2 attached to the camera body 1, a trouble that the image pickup body 2 is attached to the camera body 1 at an unnatural angle may occur. In the first embodiment, as the angle controlling member is provided, it can securely prevent inconvenience of the image pickup unit 2 being attached to the camera body 1 at unnatural angle and posture.

When the height from a back wall surface of the back wall section 1B to the inflected section 4h of the engaging protrusion (angle controlling member) 4g is the same as or greater than that from the back wall surface of the back wall section 1B to the inflected plate section 4f of the engaging claw 4b, a connection of the image pickup unit 2 to the camera body 1 at an unnatural posture and angle can be prevented. On the other hand, when the height from the back wall surface of the back wall section 1B to the inflected section 4h of the engaging protrusion 4g (angle controlling member) is lowered, the guiding hole 10h corresponding to the engaging protrusion 4g can be formed shallow, and thus the image pickup unit 2 can be downsized.

Thus, the engaging protrusion (angle controlling member) 4g is placed closer to the camera-body connector section 12, namely, closer to the side wall section 1C than to the biasing section. If the engaging protrusion 4g (angle controlling member) is thus placed closer to the camera-body connector section 12, even when the height of the engaging protrusion 4g is lower than that of the engaging claw 4b, not only the inflected plate sections 4f of the paired engaging claws 4b abut on the engaging plate section 10n, but also a tilt angle of the image pickup unit 2 to the camera body 1 when the inflected section 4h abuts on the constituting wall section 10h' can be reduced. That is to say, since the image pickup unit 2 can be made closer in parallel to the rear wall surface reinforcing sheet metal member for body 4 of the back wall section 1B, a connection of the image pickup unit 2 to the camera body 1 at an unnatural posture and angle can be prevented even when height of the engaging protrusion (angle controlling member) 4g is lowered.

(Procedure for Removing Image Pickup Unit 2 from Camera Body 1)

Now, a procedure for removing the image pickup unit 2 from the camera body 1 will be described.

The unlock button 26d is manipulated to the right direction (F4 direction in FIG. 1) when the image pickup unit 2 is viewed from the front face with the image pickup unit 2 placed in the recess 1A. This turns the unlocking manipulating member 26 to an opposite direction (opposite direction to F3 in FIG. 14) to turning and biasing force of the locking spring 28 with the spindle 27 as a supporting point.

Then, the locking plate 25 in which the fitting recess 25d is fitted into the fitting protrusion 26b is also turned to an opposite direction (opposite direction to F3 in FIG. 14) to the turning and biasing force of the locking spring 28, the locking claw 25c of the locking plate 25 is turned in a direction (backward) in which it retreats from the notch section 20c with the spindle 27 as a supporting point. This releases engagement of the locking claw 25c and the to-be-locked claw 20d. That is to say, locking of the image pickup unit 2 to the camera body 1 (a locked state) is released. Thus, in cooperation with the spindle 27, the unlocking manipulating member (unlocking plate) 26 is placed to be exposed outward from the exterior members of the camera body 1 (the front cover member 1S, the upper cover member 1U, and the back cover member 1T in the first embodiment) and serves as a first unlocking mechanism 24a in which an unlocking manipulation of the locked state by the locking mechanism 24 can be performed from outside of the exterior members.

In this state, the image pickup unit 2 is moved to the camera body 1 from the left to right direction (arrow F5 direction in FIGS. 1 and 2). Then, not only engagement of the both connector sections 11, 12 is released but also fitting of the auxiliary fitting protrusion 14 and the auxiliary fitting hole 22 is released.

Then, the image pickup unit 2 is moved from the left to right direction (arrow F5 direction in FIGS. 1 and 2 and opposite direction to arrow F2 in FIG. 33) until the notch wall 10b of the image pickup unit 2 (see FIG. 6 etc.) abuts on the rectangular stopper protrusion 4m (see FIG. 5C etc.). Then, the image pickup unit 2 is moved in a direction away from the back wall section 1B (opposite direction to F1 in FIG. 32). This completes removal of the image pickup unit 2 from the camera body 1. In addition, the unlocking manipulating member 26 and the locking plate 25 returns to its original position by biasing force of the locking spring 28 when a user takes his/her finger off from the unlock button 26*d*.

Thus, in the first embodiment, a state where a photographer uses the camera with the lens system facing a subject ahead while holding the grip section 1*c* by right hand when the upper wall section 1D is located topside is referred to as a normal use state. In this normal use state, as the right direction in which the user finds it difficult to manipulate (see F4 in FIG. 1) is an unlocking manipulation direction, a concern can be reduced that the image pickup unit 2 drops off from the camera body 1 due to erroneous operation during use while the user normally grips the grip section 1*c*.

Thus, when the image pickup unit 2 is detached from the camera body 1, unlocking of a connection with the image pickup unit 2 can be rightly and smoothly performed in the camera body 1, (Description of Forced Unlocking of the Locking Mechanism 24)

Next, described is an unlocking method for the locking mechanism 24 in a case where locked state of the locking mechanism 24 cannot be released even after manipulating the unlock button 26*d* (hereinafter, referred to as a case where the first unlocking mechanism 24*a* is inoperable).

The first unlocking mechanism 24*a* becomes inoperable because an eventuality occurs to hinder the integrated locking plate 25 and the unlocking manipulating member 26 from turning in the unlocking manipulation direction with an unlocking manipulation by pressing the unlock button 26*d*, or because connection between the locking plate 25 and the unlocking manipulating member 26 disconnects to hinder the locking plate 25 from turning in the unlocking manipulation direction with an unlocking manipulation by pressing the unlock button 26*d*.

Figure 35:
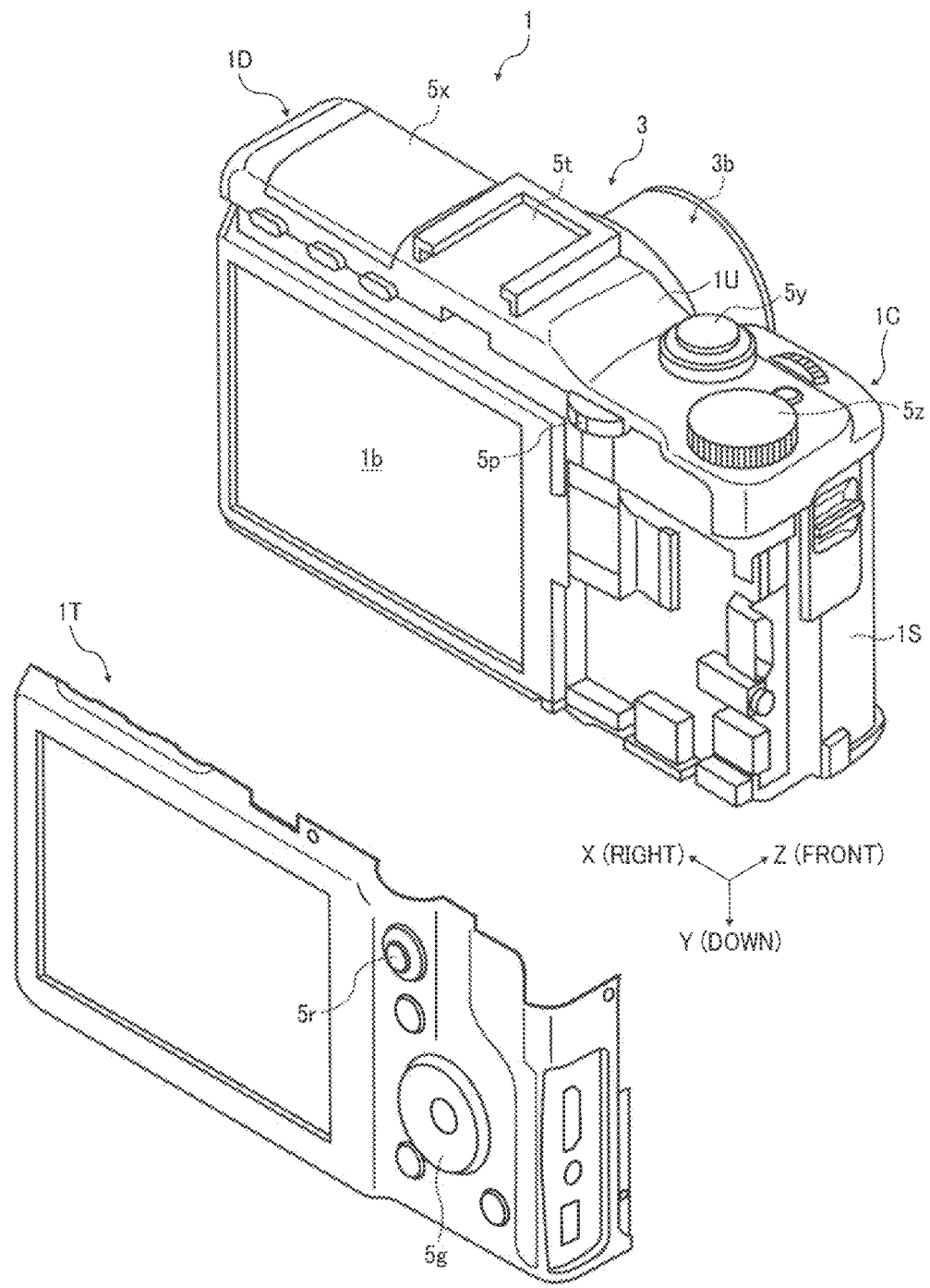
FIG. 35 is an explanatory diagram showing a state where a back cover member is removed in the camera body to which the image pickup device is attached.
Figure 36:
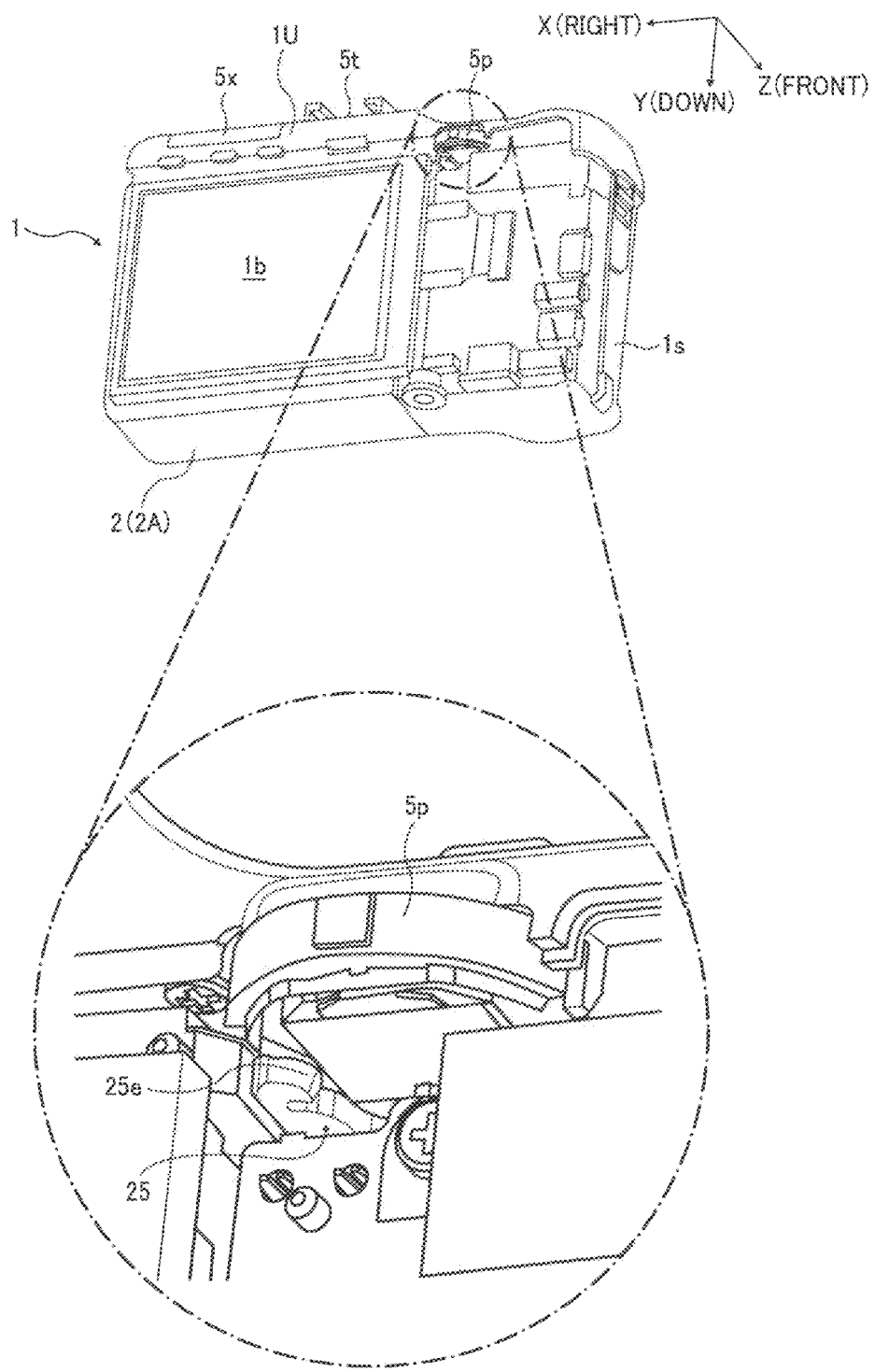
FIG. 36 is an explanatory diagram showing a camera body similarly to the camera body shown in FIG. 35 as viewed from a obliquely downward side and enlargedly showing the main part of the camera body.

First, with the image pickup unit 2 attached (set) to the recess 1A, the locking screws 1*p* for mounting the rear cover member 1T to the camera body 1 (there are seven locking screws in the embodiment 1, and for one of them, the grip member 1S' needs to be stripped off (see FIGS. 3B and 3C)) are removed to detach the rear cover member 1T from the camera body 1 (see FIG. 35). Then, as shown in FIG. 36, in the lower part of the ADJ lever 5*p*, the forced unlocking protrusion section 25*e* of the locking plate 25 is exposed, then can be manipulated to be pulled from the outside, i.e., to be turned in the unlocking manipulation direction.

Figure 39:
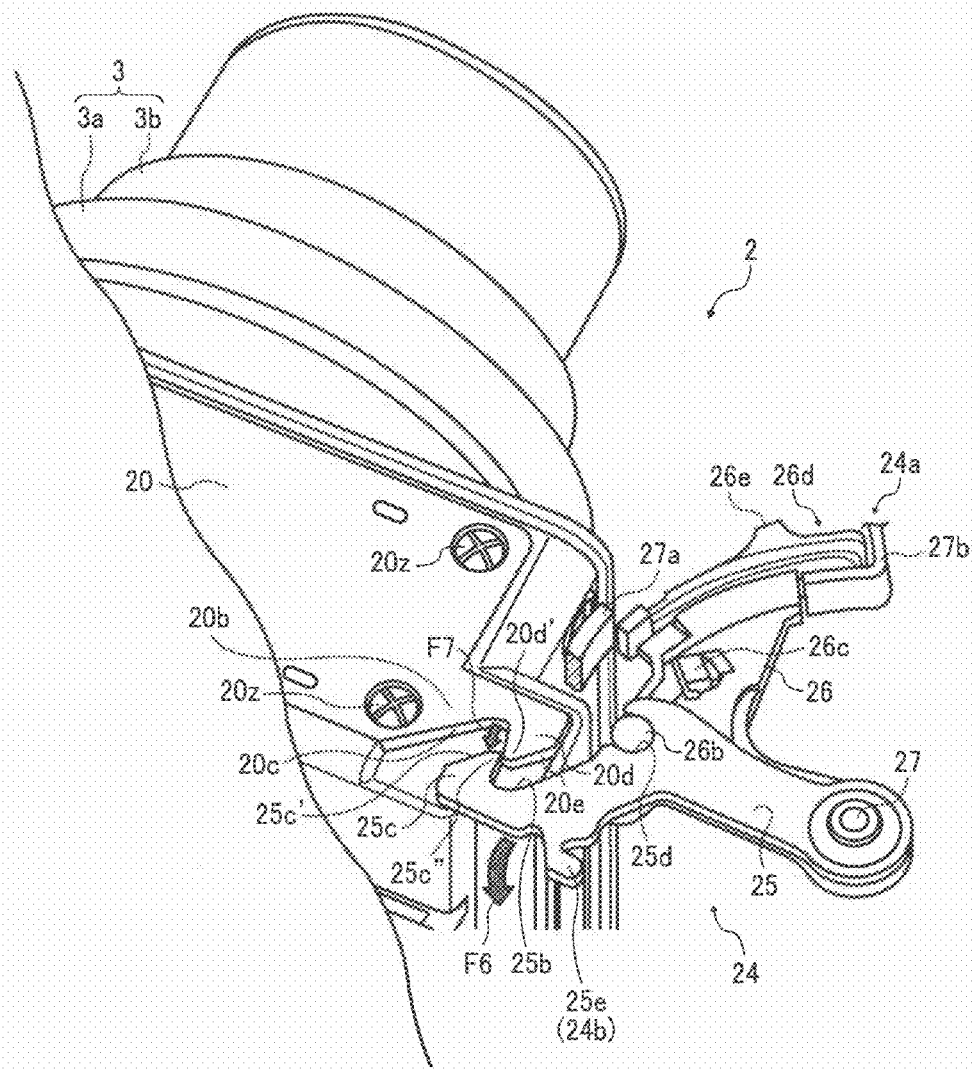
FIG. 39 is an explanatory diagram showing a state where the locked state is released by a second unlocking mechanism similarly to the enlarged main part of FIG. 37.

The forced unlocking protrusion section 25*e* is manipulated (in an F6 direction in FIGS. 38 and 39) so as to be pulled. Then, the locking plate 25 is turned in the unlocking manipulation direction (F7 direction in FIG. 39) with the spindle 27 as a supporting point so that the locking claw 25*c* of the locking plate 25 is turned in a direction (backward) in which it retreats from the notch section 20*c* with the spindle 27 as a supporting point. This releases tight fitting (engagement) of the locking claw 25*c* with the to-be-locked claw 20*d*. That is to say, locking (locked state) of the image pickup unit 2 to the camera body 1 is released.

Here, since the forced unlocking protrusion section 25*e* has a configuration to form a part of the locking plate 25 formed of a sheet metal member (configuration in which a part of a sheet metal member forming the locking plate 25, which is a locking member, is extended integrally with the locking plate 25), the locking plate 25 can be forced to be turned in the unlocking manipulation direction (the F6 direction in FIGS. 38 and 39) regardless of a cause by which the first unlocking mechanism 24*a* is made inoperable, and thus the locked state of the locking mechanism 24 can be released. Therefore, the forced unlocking protrusion section 25*e* is placed so as to be exposed by detaching a part of the exterior member (the rear cover member 1T in the embodiment 1) of the camera body 1 in cooperation with the locking plate 25 and the spindle 27, and thus serves as the second unlocking mechanism 24*b* that allows an unlocking manipulation from the outside to release the locked state of the locking mechanism 24 with the part of the exterior member detached.

Later, the image pickup unit 2 can be detached from the camera body 1 similarly to the above-mentioned normal procedure for detaching the image pickup unit 2 from the camera body 1.

In this manner, in the camera body 1 (imaging apparatus) of the embodiment 1, even if an eventuality occurs to cause the first unlocking mechanism 24*a* to be inoperable, the image pickup unit 2 can be still detached from the camera body 1 by removing the rear cover member 1T to manipulate the second unlocking mechanism 24*b*. That is to say, in the camera body 1 (imaging apparatus), the second unlocking mechanism 24*b* serves as a fail-safe mechanism to detach the image pickup unit 2, which can be freely attached to and detached from the camera body 1, and thus even if an eventuality occurs, the image pickup unit 2 can be detached from the camera body 1 by only removing the rear cover member 1T without disassembling the camera body 1 or the image pickup unit 2.

Also, in the camera body 1 (imaging apparatus) of the embodiment 1, the rear cover member 1T that is a part of the exterior member of the camera body 1 is configured not to interfere with the image pickup unit 2 attached to the recess 1A, and is attached to the camera body 1 with seven locking screws 1*p* to be screwed from the outside, and thus the rear cover member 1T can be detached from the camera body 1 with the image pickup unit 2 attached (set) to the recess 1A. Therefore, in the camera body 1 (imaging apparatus), in order to allow exposing and pulling manipulation (turning manipulation in the unlocking manipulation direction) of the forced unlocking protrusion section 25*e* as the second unlocking mechanism 24*b*, the rear cover member 1T can serve as an exposing function section, i.e., a part of the exterior member of the camera body 1, which is detachable with the image pickup unit 2 attached to the camera body 1.

Furthermore, in the camera body 1 (imaging apparatus) of the embodiment 1, in order to allow exposing and pulling manipulation (turning manipulation in the unlocking manipulation direction) of the forced unlocking protrusion section 25*e* as the second unlocking mechanism 24*b*, parts of the exterior member (the front cover member 1S and the upper cover member 1U) other than the rear cover member 1T that is set as a part of the exterior member of the camera body 1 and that is detachable with the image pickup unit 2 attached to the camera body 1 are attached to the camera body 1 with locking screws (three locking screws 5*f* and two locking screws 6*f* in the embodiment 1) to be screwed (arranged) in the wall surfaces included in the recess 1A in order to utilize the recess 1A. Thus, the camera body 1 in a normal use state has a high quality in appearance because the locking screws for mounting the upper cover member 1U and the front cover member 1S are not visually recognized.

In the camera body 1 (imaging apparatus) of the embodiment 1, seven locking screws 1*p* need to be removed to detach the rear cover member 1T in order to allow turning manipulation of the second unlocking mechanism 24*b* in the unlocking manipulation direction, and thus accidental unlocking manipulation of the second unlocking mechanism 24*b* by a user can be securely prevented.

In the camera body 1 (imaging apparatus) of the embodiment 1, in order to allow exposing and pulling manipulation (turning manipulation in the unlocking manipulation direction) of the forced unlocking protrusion section 25*e* as the second unlocking mechanism 24b, the rear cover member 1T is set as a part of the exterior member of the camera body 1, which is detachable with the image pickup unit 2 attached to the camera body 1. Accordingly, compared with, for example, setting the upper cover member 1U, which tends to have a complicated configuration due to movable section of the strobe device 5x, as a part of the exterior member, detaching operation of the part of the exterior member can be made easier with setting the upper cover member 1T.

In the camera body 1 (imaging apparatus) of the embodiment 1, by utilizing the recess 1A for attaching the image pickup unit 2, a member such as a screw that contributes to improvement in rigidity can be provided at a position that cannot be visually recognized from the outside with the image pickup unit 2 attached to the camera body 1. Thus, the rigidity of the camera body 1 itself, and eventually of the imaging apparatus to which the image pickup unit 2 is attached can be easily improved without reducing its quality in appearance. This is due to the following. In a camera body that is not provided with the recess 1A for attaching the image pickup unit 2, i.e., a camera body that has a configuration other than image pickup unit exchange type (common imaging apparatus where an imaging optical system is integrally housed in its camera body, not intended to allow the image pickup unit to be attached/detached), if an exterior member is attached to the camera body by screwing locking screws from the outside, the locking screws can be visually recognized, thereby reducing its quality in appearance, while if the number of such locking screws is reduced or the exterior member is provided with a configuration that allows engagement with the camera body, it becomes difficult to improve the rigidity of the camera body. In contrast, in the camera body 1 (imaging apparatus) of the present invention, the front cover member 1S and the upper cover member 1U which are parts of the exterior member other than the rear cover member 1T that is set as a part of the exterior member of the camera body 1 and that is detachable with the image pickup unit 2 attached to the camera body 1 are attached to the camera body 1 with three locking screws 5f and two locking screws 6f to be screwed (arranged) in the wall surfaces included in the recess 1A in order to utilize the recess 1A. In this manner, if the recess 1A is utilized so that the locking screws (the locking screws 5f and the locking screws 6f) are screwed (arranged) in the wall surfaces included in the recess 1A, such locking screws cannot be visually recognized with the image pickup unit 2 attached to the camera body 1, and thus compared with the above-mentioned common imaging apparatus, the rigidity of the camera body 1 itself, and eventually of the imaging apparatus to which the image pickup unit 2 is attached can be improved without reducing its quality in appearance. In addition, in the camera body 1 (imaging apparatus) of the embodiment 1, the back wall section 1B included in the recess 1A is provided with the back wall surface reinforcing sheet metal member for body 4, the side wall section 1C included in the recess 1A is provided with the side wall surface reinforcing sheet metal member for body 6, and the upper wall section 1D included in the recess 1A is provided with the upper wall surface reinforcing sheet metal member for body 5, (members that contribute to improvement in rigidity are provided utilizing the recess). Thus, compared with the above-mentioned common imaging apparatus, the rigidity of the camera body 1 itself, and eventually of the imaging apparatus to which the image pickup unit 2 is attached can be improved without reducing its quality in appearance.

In the above-mentioned embodiment 1, the forced unlocking protrusion section 25e as the second unlocking mechanism 24b is provided so as to be located below the ADJ lever 5p when the locking mechanism 24 is in a locked state in the side wall section 1C; however, the forced unlocking protrusion section 25e may be provided at a position allowing exposing and pulling manipulation thereof (turning manipulation in the unlocking manipulation direction) when the rear cover member 1T that is set as a part of the exterior member of camera body 1 and that is detachable with the image pickup unit 2 attached to the camera body 1 is detached from the camera body 1, and the invention is not limited to the embodiment 1.

Also, in the above-mentioned embodiment 1, the front cover member 1S and the upper cover member 1U which are parts of the exterior member other than the rear cover member 1T that is set as a part of the exterior member of the camera body 1 and that is detachable with the image pickup unit 2 attached to the camera body 1 are attached to the camera body 1 with the locking screws to be screwed (arranged) in the wall surfaces included in the recess 1A; however the front cover member 1S and the upper cover member 1U may be attached to the camera body 1 somehow, and the invention is not limited to the embodiment 1.

[Embodiment 2]

Figure 40:
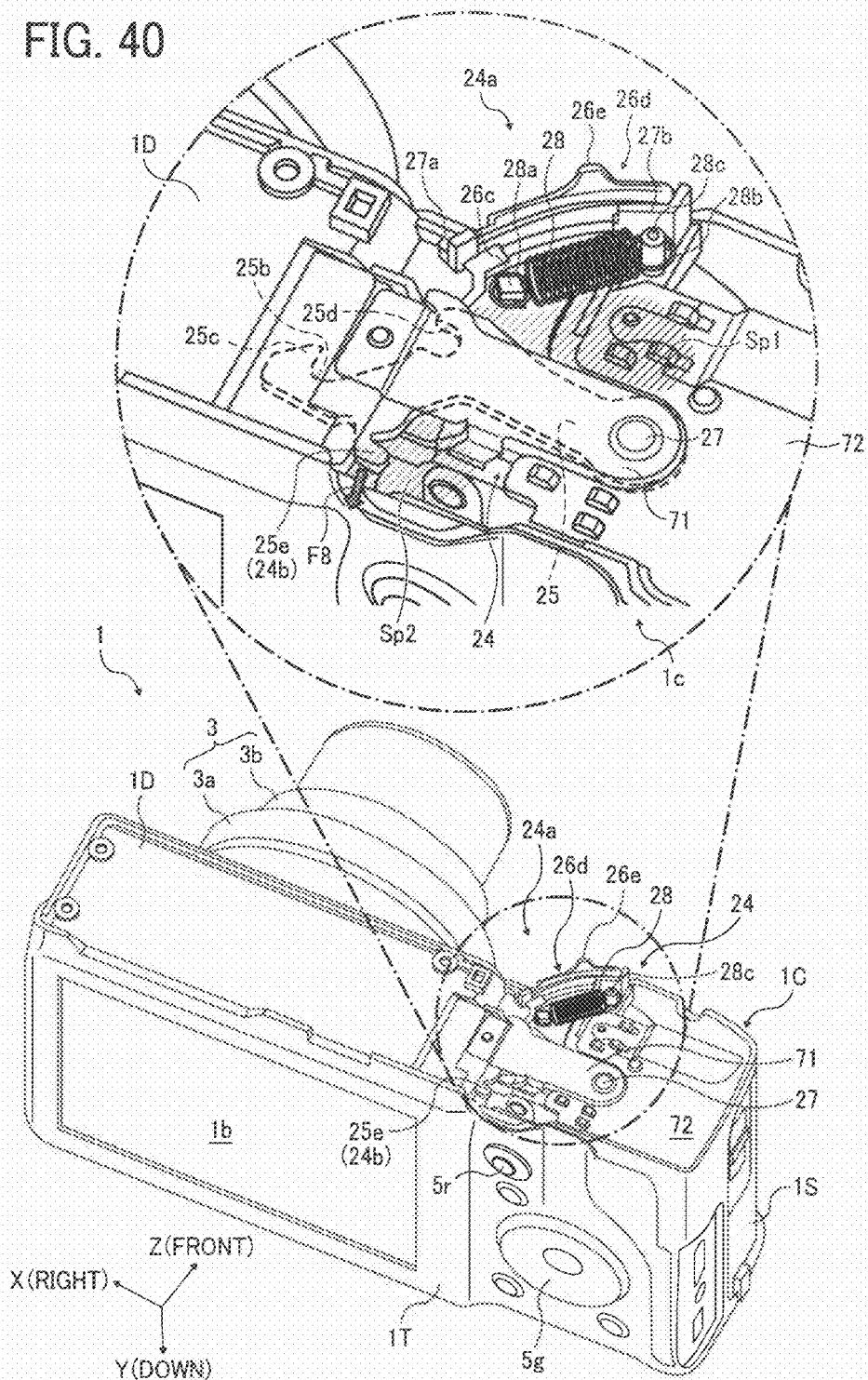
FIG. 40 is an explanatory diagram schematically showing a state where an upper cover member of the camera body according to an embodiment is removed and enlargedly showing a main part of the camera body.

Next, the camera body 1 (imaging apparatus) according to the embodiment 2 of the present invention is described. The embodiment 2 is an example with a different configuration for a forced unlocking of the locking mechanism 24 provided in the camera body 1. The camera body 1 (configuration for its attachment) and the image pickup unit 2 attached thereto of the embodiment 2 has a basic configuration similar to that of the above-mentioned camera body 1 and the image pickup unit 2 of the embodiment 1, and thus similar components are labeled with the same reference numerals, and their detailed descriptions are omitted. FIG. 40 is an explanatory view schematically showing an appearance and an enlarged essential portion after removing the upper cover member 1U of the camera body 1 according to the embodiment 2.

The camera body 1 of the embodiment 2 is an example where the upper cover member 1U (see FIG. 1) is set as a part of the exterior member of the camera body 1, which is detachable with the image pickup unit 2 attached to the camera body 1. That is to say, the camera body 1 of the embodiment 2 has a configuration (not shown) in which the upper cover member 1U is attached to the camera body 1 with multiple locking screws to be screwed from the outside, replacing the configuration, in which the upper cover member 1U is attached to the camera body 1 with the locking screws (three locking screws 5f) to be screwed (arranged) in the wall surfaces included in the recess 1A in order to utilize the recess 1A. The positions and the number of these locking screws (not shown) may be set properly in consideration of factors such as the configuration of the camera body 1 and the rigidity of the upper cover member 1U.

Also, in the camera body 1 of the embodiment 2, since the upper cover member 1U is set as a part of the exterior member of the camera body 1, which is detachable with the image pickup unit 2 attached to the camera body 1, the rear cover member 1T is configured to be attached to the camera body 1 with the locking screws to be screwed (arranged) in the wall surfaces included in the recess 1A in order to utilize the recess 1A provided in the front side of the camera body 1. In the embodiment 2, the rear cover member 1T is attached to the camera body 1 with eight locking screws 4f (see FIG. 5C) to be screwed (arranged) in the back wall section 1B, which is a part of the wall surfaces included in the recess 1A provided in the front side of the camera body 1, in order to fix the back wall surface reinforcing sheet metal member for body 4 to the back wall section 1B.

In this manner, in the camera body 1 of the embodiment 2, the upper cover member 1U can be detached from the camera body 1 with the image pickup unit 2 attached to the camera body 1. FIG. 40 is an explanatory view showing the state where the cover member 1U is detached. As shown in the FIG. 40, in the camera body 1 with the upper cover member 1U detached, a sheet metal member 71 spanning the grip section 1c, the side wall section 1C, and the back wall section 1B is only provided for reinforcement at an upper part of the locking plate 25 of the locking mechanism 24 (negative side in the Y direction). Also, around the perimeter of the locking mechanism 24, only a circuit board 72 stored in a storage space formed in the grip section 1c connected to the side wall section 1C is separately placed. Thus, in the camera body 1, the second unlocking mechanism 24b allowing exposing and pulling manipulation (turning manipulation in the unlocking manipulation direction) as the upper cover member 1U is detached can be provided in a space Sp1 in front of the sheet metal member 71 (positive side in the Z direction), and a space Sp2 in rear of the sheet metal member 71 (negative side in the Z direction) around the perimeter of the locking plate 25. The embodiment 2 is configured to be provided with the forced unlocking protrusion section 25e as the second unlocking mechanism 24b in the space Sp2 by using the locking plate 25 similar to that in the embodiment 1.

In the camera body 1 (imaging apparatus) of the embodiment 2, if the first unlocking mechanism 24a becomes inoperable, first, the locking screws (not shown) for mounting the upper cover member 1U to the camera body 1 are removed with the image pickup unit 2 attached (set) to the recess 1A, then the upper cover member 1U is detached from the camera body 1. Then, the forced unlocking protrusion section 25e of the locking plate 25 is exposed in the space Sp2, then can be manipulated to be pulled from the outside, i.e., to be turned in the unlocking manipulation direction.

The forced unlocking protrusion section 25e is manipulated to be pulled backward (F8 direction). Then, the locking plate 25 is turned in the unlocking manipulation direction (see F7 in FIG. 39) with the spindle 27 as a supporting point so that the locking claw 25c of the locking plate 25 is turned in a direction (backward) in which it retreats from the notch section 20c with the spindle 27 as a supporting point. This releases tight fitting (engagement) of the locking claw 25c with the to-be-locked claw 20d. That is to say, locking (locked state) of the image pickup unit 2 to the camera body 1 is released. In this manner, the forced unlocking protrusion section 25e is placed so as to be exposed by removing a part of the exterior member (the upper cover member 1U in the embodiment 2) of the camera body 1 in cooperation with the locking plate 25 and the spindle 27, and thus serves as the second unlocking mechanism 24b that allows an unlocking manipulation from the outside to release the locked state of the locking mechanism 24 with the part of the exterior member removed.

Later, the image pickup unit 2 can be detached from the camera body 1 similarly to the normal procedure described in the embodiment 1 for detaching the image pickup unit 2 from the camera body 1.

In this manner, in the camera body 1 (imaging apparatus) of the embodiment 2, even if an eventuality occurs to cause the first unlocking mechanism 24a to be inoperable, the image pickup unit 2 can be still detached from the camera body 1 by removing the upper cover member 1U to manipulate the second unlocking mechanism 24b. That is to say, in the camera body 1 (imaging apparatus), the second unlocking mechanism 24b serves as a fail-safe mechanism to detach the image pickup unit 2, which can be freely attached to and detached from the camera body 1, and thus even if an eventuality occurs, the image pickup unit 2 can be detached from the camera body 1 by only removing the upper cover member 1U without disassembling the camera body 1 or the image pickup unit 2.

Also, in the camera body 1 (imaging apparatus) of the embodiment 2, the upper cover member 1U that is a part of the exterior member of the camera body 1 is mounted to the camera body 1 with multiple locking screws (not shown) to be screwed from the outside, and thus the upper cover member 1U can be detached from the camera body 1 even with the image pickup unit 2 attached (set) to the recess 1A. Therefore, in the camera body 1 (imaging apparatus), in order to allow exposing and pulling manipulation (turning manipulation in the unlocking manipulation direction) of the forced unlocking protrusion section 25e as the second unlocking mechanism 24b, the upper cover member 1U can serve as an exposing function section, i.e., a part of the exterior member of the camera body 1, which is detachable with the image pickup unit 2 attached to the camera body 1.

Furthermore, in the camera body 1 (imaging apparatus) of the embodiment 2, in order to allow exposing and pulling manipulation (turning manipulation in the unlocking manipulation direction) of the forced unlocking protrusion section 25e as the second unlocking mechanism 24b, parts of the exterior member (the front cover member 1S and the rear cover member 1T) other than the upper cover member 1U that is set as a part of the exterior member of the camera body 1 and that is detachable with the image pickup unit 2 attached to the camera body 1 are attached to the camera body 1 with locking screws (two locking screws 6f and eight locking screws 4f' in the embodiment 2) to be screwed (arranged) in the wall surfaces included in the recess 1A in order to utilize the recess 1A. Thus, the camera body 1 in a normal use state has a high quality in appearance because the locking screws for mounting the front cover member 1S and the rear cover member 1T are not visually recognized.

In the camera body 1 (imaging apparatus) of the embodiment 2, the upper cover member 1U is set as a part of the exterior member of the camera body 1, and the second unlocking mechanism 24b can be placed at any position in the space Sp1 or the space Sp2 around perimeter of the locking plate 25 to be configured to allow exposing and pulling manipulation (turning manipulation in the unlocking manipulation direction) when the upper cover member 1U is detached, and thus flexibility of a set position of the second unlocking mechanism 24b, i.e., a configuration of the locking plate 25 is improved. This is because of the configuration such that the locking mechanism 24 (the locking plate 25) is provided in the vicinity of the upper cover member 1U, and the locking plate 25 is turned around the spindle 27 extending in the Y direction, and along the X-Z plane.

In the camera body 1 (imaging apparatus) of the embodiment 2, multiple locking screws need to be removed to detach the upper cover member 1U in order to allow turning manipulation of the second unlocking mechanism 24b in the unlocking manipulation direction, and thus accidental unlocking manipulation of the second unlocking mechanism 24b by a user can be securely prevented.

In the camera body 1 (imaging apparatus) of the embodiment 2, by utilizing the recess 1A for attaching the image pickup unit 2, a member such as a screw that contributes to improvement in rigidity can be provided at a position that cannot be visually recognized from the outside with the image pickup unit 2 attached to the camera body 1. Thus, the rigidity of the camera body 1 itself, and eventually of the imaging apparatus to which the image pickup unit 2 is attached can be easily improved without reducing its quality in appearance.

In the above-mentioned embodiment 2, the forced unlocking protrusion section 25e as the second unlocking mechanism 24b is provided so as to be located in the space Sp2 when the locking mechanism 24 is in a locked state; however, the forced unlocking protrusion section 25e may be provided at a position allowing exposing and pulling manipulation thereof (turning manipulation in the unlocking manipulation direction) when the upper cover member 1U that is set as a part of the exterior member of camera body 1 and that is detachable with the image pickup unit 2 attached to the camera body 1 is detached from the camera body 1, and the invention is not limited to the embodiment 2.

Also, in the above-mentioned embodiment 2, the front cover member 1S and the rear cover member 1T which are parts of the exterior member other than the upper cover member 1U that is set as a part of the exterior member of the camera body 1, and that is detachable with the image pickup unit 2 attached to the camera body 1, are attached to the camera body 1 with the locking screws to be screwed (arranged) in the wall surfaces included in the recess 1A in order to utilize the recess 1A; however the front cover member 1S and the rear cover member 1T may be attached to the camera body 1 somehow, and the invention is not limited to the embodiment 2.

Furthermore, as a part of the exterior member of the camera body 1, which is detachable with the image pickup unit 2 attached to the camera body 1, the rear cover member 1T is set in the above-mentioned embodiment 1, and the upper cover member 1U is set in the above-mentioned embodiment 2; however, the front cover member 1S, for example, may be set as a part of the exterior member, and the invention is not limited to the embodiments 1 and 2.

[Embodiment 3]

Figure 42:
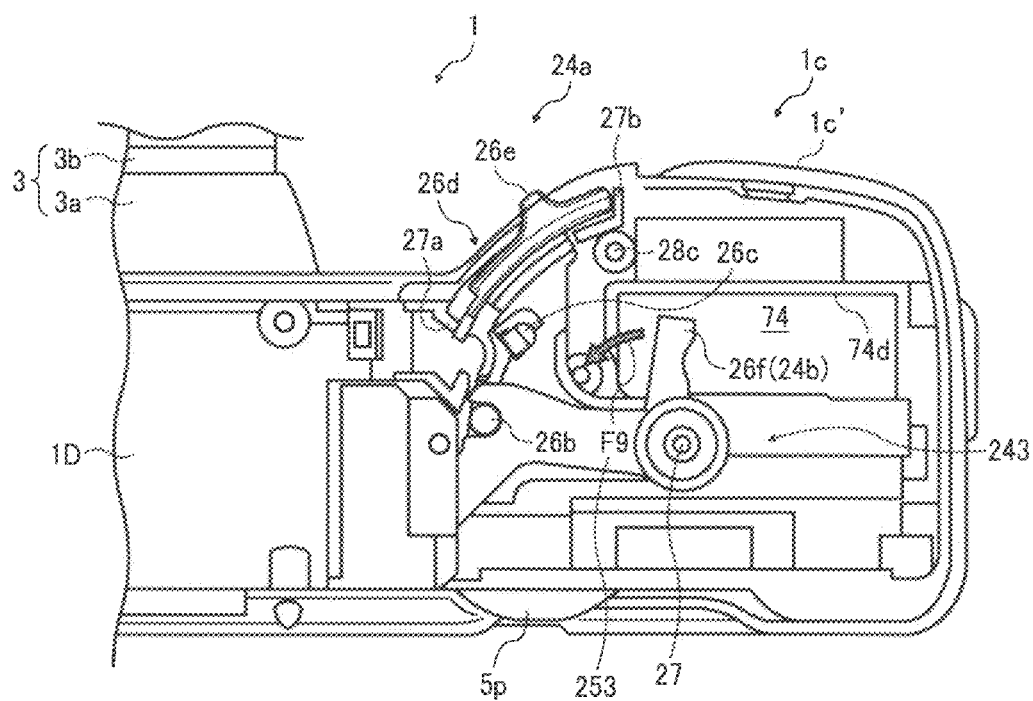
FIG. 42 is an explanatory diagram showing the camera body as viewed from an upper side (negative side in the Y direction) by omitting the upper cover member and explaining a configuration of the locking mechanism of an embodiment of the present invention.
Figure 42:
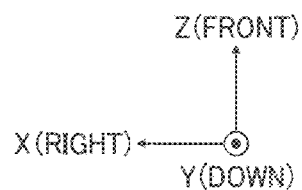
Figure 43:
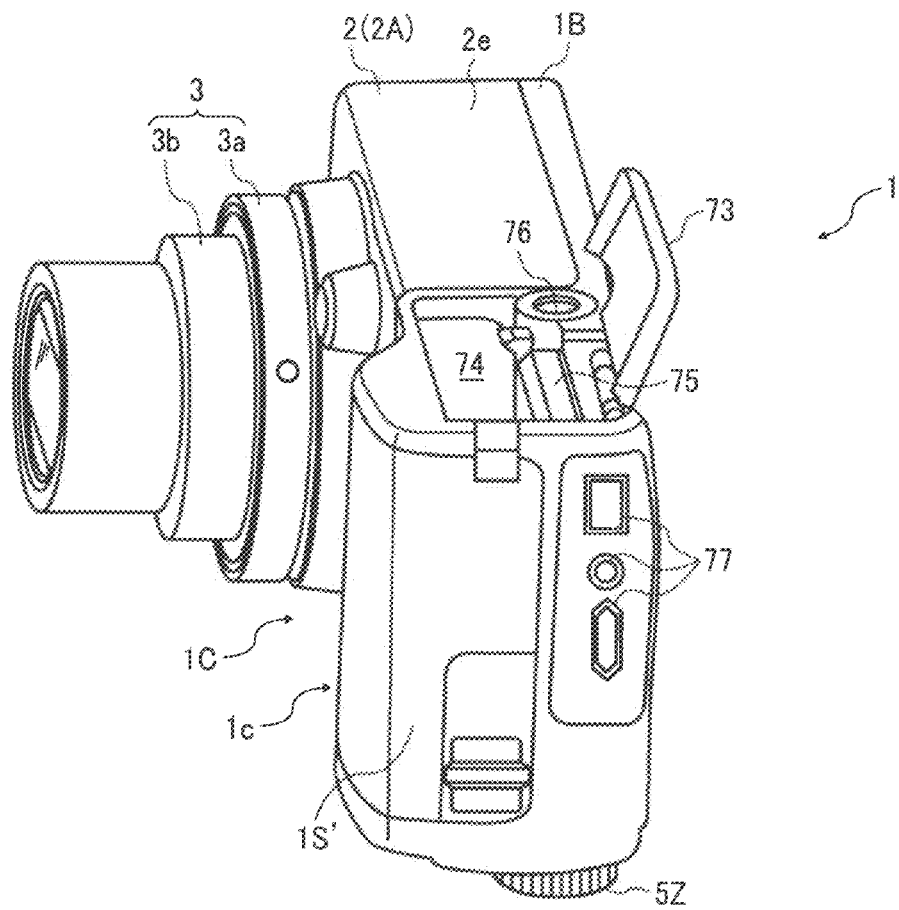
FIG. 43 is an explanatory diagram showing a state where a battery case lid is opened in the camera body.
Figure 43:
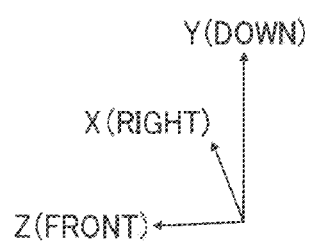
Figure 44:
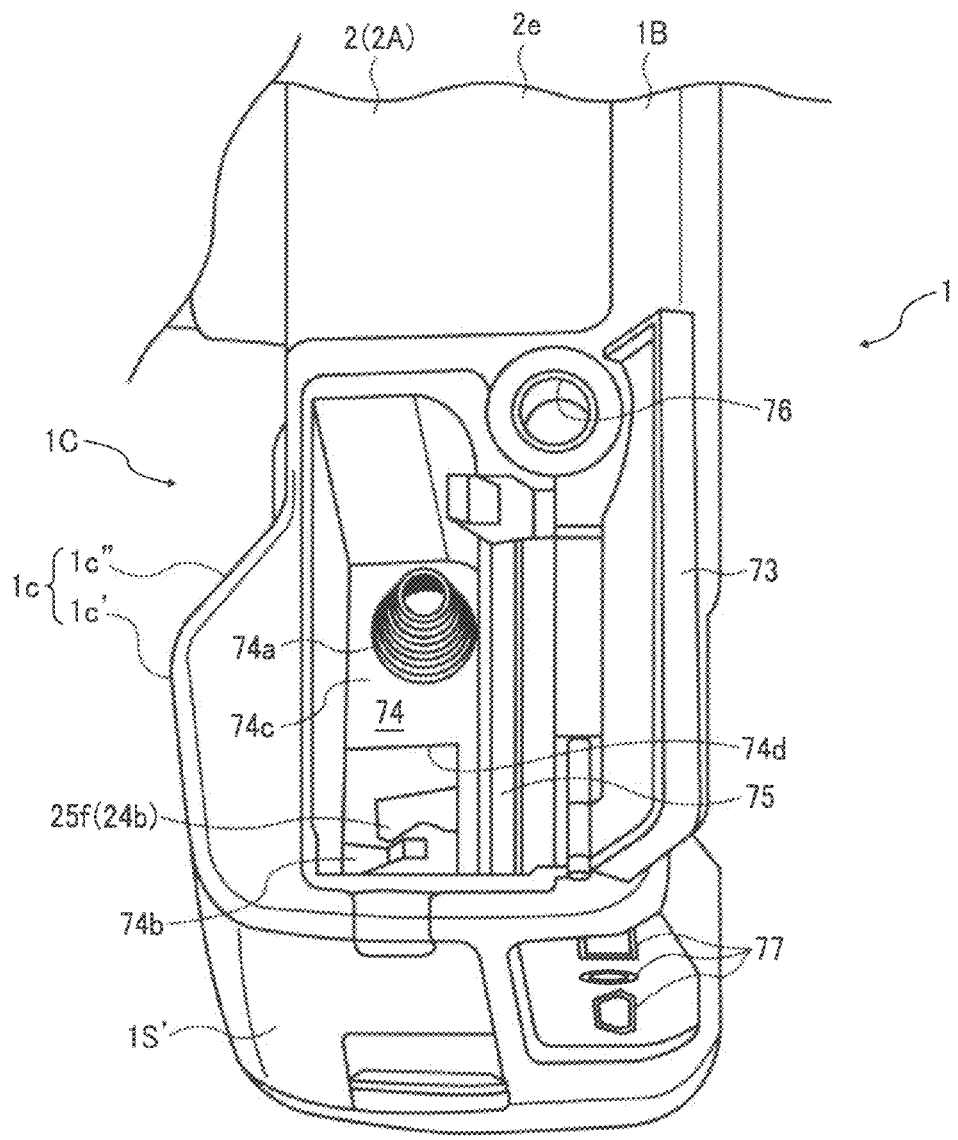
FIG. 44 is a perspective explanatory diagram showing a state where a space within a battery case is viewed from the opened battery case lid.
Figure 45:
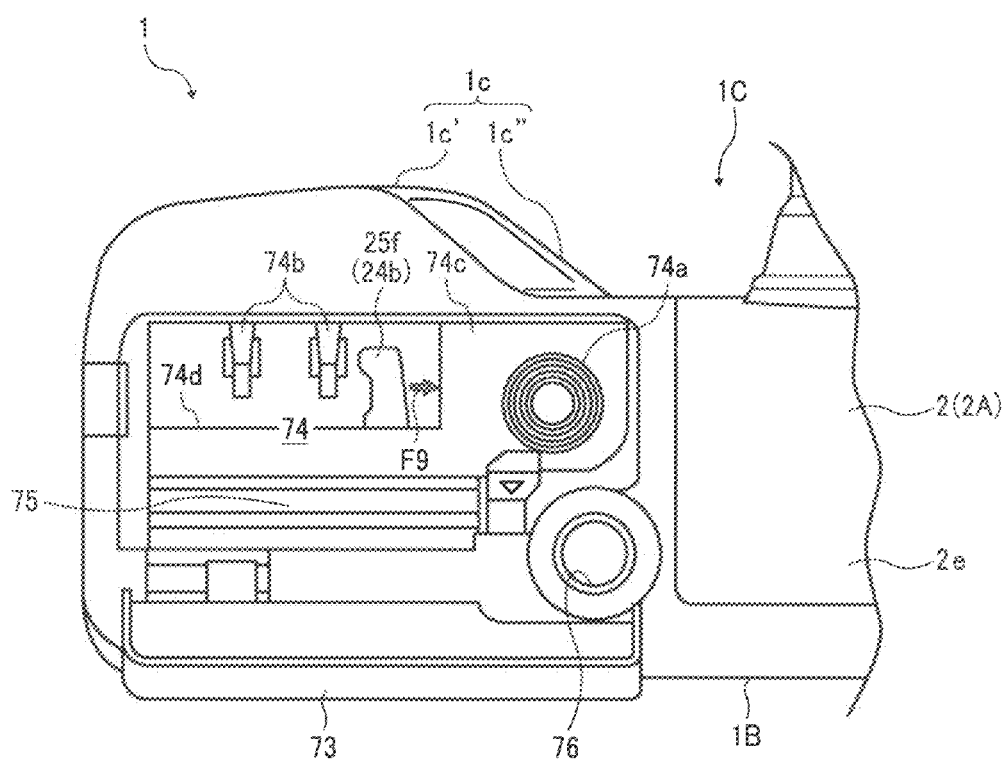
FIG. 45 is an explanatory diagram showing the space within the battery case viewed from downward side (positive side in the Y direction) from the opened battery case lid.
Figure 45:
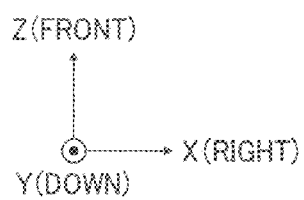

Next, the camera body 1 (imaging apparatus) according to the embodiment 3 of the present invention is described. The embodiment 3 is an example with a different configuration for a forced unlocking of the locking mechanism 243 provided in the camera body 1. The camera body 1 (configuration for its attachment) and the image pickup unit 2 attached thereto of the embodiment 3 has a basic configuration similar to that of the above-mentioned camera body 1 and the image pickup unit 2 of the embodiment 1, and thus similar components are labeled with the same reference numerals, and their detailed descriptions are omitted. FIG. 41 is an explanatory view similar to FIG. 37 for illustrating the configuration of the locking mechanism 243 of the embodiment 3. FIG. 42 is an explanatory view of the camera body 1 as viewed from an upper side (negative side in the Y direction) for illustrating the configuration of the locking mechanism 243 of the embodiment 3 with the upper cover member 1U omitted. FIG. 43 is an explanatory view of the camera body 1 where a battery cover 73 is opened. FIG. 44 is an explanatory perspective view of a battery storage space 74 as viewed from the battery cover 73 opened. FIG. 45 is an explanatory view of the battery storage space 74 as viewed from below (positive side in the Y direction) from the battery cover 73 opened.

As shown in FIG. 41, the locking mechanism 243 of the embodiment 3 has a different configuration (shape) of the locking plate 253 from that of the locking mechanism 24 of the embodiment 1. In the locking plate 253, a plate-shaped forced unlocking protrusion section 25f is provided instead of the forced unlocking protrusion section 25e at the middle position between the locking claw 25c and the fitting recess 25d. The forced unlocking protrusion section 25f is provided extending from the vicinity of a shaft hole 25a, so as to be located above the battery storage space 74 of the grip section 1c when the locking mechanism 24 is in a locked state (see FIG. 42).

As shown in FIGS. 43 to 45, the battery storage space 74 is included in a part of a storage space (not shown) formed in the grip section 1c. The battery storage space 74 allows a battery (not shown) to be attachable and detachable thereto and therefrom by opening the battery cover 73 provided freely openable and closable on the lower surface of the camera body 1. The battery storage space 74 is provided with an extraction spring 74a for extracting a battery, and a battery contact piece 74b as an electrical connection to the battery. A partition wall 74c that defines the battery storage space 74 is provided with a communication opening 74d. The communication opening 74d is provided to allow the forced unlocking protrusion section 25f, which is provided above the battery storage space 74 (back side of the battery storage space 74 as FIGS. 44 and 45 are viewed straight on), to be exposed and manipulated to be turned in the unlocking manipulation direction via the battery storage space 74 with no battery installed, with the battery cover 73 opened. Thus, the forced unlocking protrusion section 25f is placed so as not to interfere with the extraction spring 74a and the battery contact piece 74b as the battery storage space 74 is viewed from below (positive side in the Y direction) when the locking mechanism 24 is in a locked state (see FIG. 45).

Also, the camera body 1 is provided with a memory medium storage space 75 to and from which memory medium (not shown) is attachable and detachable by opening the battery cover 73, and a tripod screw section 76 via which a tripod can be mounted regardless of whether the battery cover 73 is open and closed, along with the battery storage space 74.

Also, in the camera body 1 of the embodiment 3, if the battery cover 73 is opened, the forced unlocking protrusion section 25f is exposed through the battery storage space 74 and the communication opening 74d and can be manipulated to be turned in the unlocking manipulation direction. Thus, although not shown, the front cover member 1S, the rear cover member 1T, and the upper cover member 1U are configured to be attached to the camera body 1 with the locking screws (for example, three locking screws 5f, two locking screws 6f, and eight locking screws 4f' (see FIG. 5C)) to be screwed (arranged) in the wall surfaces included in the recess 1A in order to utilize the recess 1A provided in the front side of the camera body 1.

In the camera body 1 (imaging apparatus) of the embodiment 3, if the first unlocking mechanism 24a becomes inoperable, first, as shown in FIGS. 43 to 45, the battery cover 73 provided on the lower surface of the camera body 1 is opened to take out the batteries (not shown) with the image pickup unit 2 attached (set) to the recess 1A. Then, as shown in FIGS. 44 and 45, the forced unlocking protrusion section 25f of the locking plate 25 can be viewed via the battery storage space 74, through the communication opening 74d. Here, the forced unlocking protrusion section 25f, i.e., the locking plate 253 (the locking mechanism 243) is provided in the vicinity of the upper cover member 1U, and thus is located in the back of the battery storage space 74 when viewed from the lower surface side of the camera body 1. Thus, the forced unlocking protrusion section 25f needs to be manipulated to be turned in the unlocking manipulation direction through the battery storage space 74, and the communication opening 74d using a long member such as tweezers.

The forced unlocking protrusion section 25f is manipulated to be moved backward (negative side in the Z direction) (F9 direction in FIGS. 42 and 45). Then, the locking plate 253 is turned in the unlocking manipulation direction (F9 direction in FIGS. 42 and 45) with the spindle 27 as a supporting point so that the locking claw 25c of the locking plate 253 is turned in a direction (backward) in which it retreats from the notch section 20c with the spindle 27 as a supporting point. This releases tight fitting (engagement) of the locking claw 25c with the to-be-locked claw 20d. That is to say, locking (locked state) of the image pickup unit 2 to the camera body 1 is released.

Here, since the forced unlocking protrusion section 25f has a configuration to form a part of the locking plate 253 formed of a sheet metal member (configuration in which a part of a sheet metal member forming the locking plate 253, which is a locking member, is extended integrally with the locking plate 253), the locking plate 253 can be forced to be turned in the unlocking manipulation direction (the F9 direction in FIGS. 42 and 45) regardless of a cause by which the first unlocking mechanism 24a is made inoperable, and thus the locked state of the locking mechanism 243 can be released. In this manner, the forced unlocking protrusion section 25f is placed so as to be exposed by removing a part of the exterior member (the upper cover member 1U in the embodiment 3) of the camera body 1 in cooperation with the locking plate 253 and the spindle 27, and thus serves as the second unlocking mechanism 24b that allows an unlocking manipulation from the outside to release the locked state of the locking mechanism 243 with the part of the exterior member removed.

Later, the image pickup unit 2 can be detached from the camera body 1 similarly to the normal procedure described in the embodiment 1 for detaching the image pickup unit 2 from the camera body 1.

In this manner, in the camera body 1 (imaging apparatus) of the embodiment 3, even if an eventuality occurs to cause the first unlocking mechanism 24a to be inoperable, the image pickup unit 2 can be still detached from the camera body 1 by opening the battery cover 73 to take out the batteries (not shown) and manipulating the second unlocking mechanism 24b. That is to say, in the camera body 1 (imaging apparatus), the second unlocking mechanism 24b serves as a fail-safe mechanism to detach the image pickup unit 2, which can be freely attached to and detached from the camera body 1, and thus even if an eventuality occurs, the image pickup unit 2 can be detached from the camera body 1 by just opening the battery cover 73 without disassembling the camera body 1 or the image pickup unit 2.

Also, in the camera body 1 (imaging apparatus) of the embodiment 3, the battery cover 73 is configured to be freely openable and closable for attaching/detaching a battery, and thus can be detached from the camera body 1 even with the image pickup unit 2 attached (set) to the recess 1A. Thus, in the camera body 1 (imaging apparatus), the battery cover 73 can be utilized as an exposing function section, i.e., an opening-and-closing mechanism that is provided freely openable and closable at the exterior member regardless of attachment of the image pickup unit 2 to the camera body 1, and that can be opened for turning manipulation of the second unlocking mechanism 24b in the unlocking manipulation direction.

Furthermore, in the camera body 1 (imaging apparatus) of the embodiment 3, the front cover member 1S, the rear cover member 1T, and the upper cover member 1U are attached to the camera body 1 with the locking screws (for example, three locking screws 5f, two locking screws 6f, and eight locking screws 4f (see FIG. 5C)) to be screwed (arranged) in the wall surfaces included in the recess 1A in order to utilize the recess 1A, and thus, the camera body 1 in a normal use state has a high quality in appearance because the locking screws are not visually recognized. This is because the battery cover 73 provided freely openable and closable at an exterior member regardless of attachment of the image pickup unit 2 to the camera body 1, is utilized as an opening-and-closing mechanism that can be opened for turning manipulation of the forced unlocking protrusion section 25f as the second unlocking mechanism 24b in the unlocking manipulation direction, and thus the front cover member 1S, the rear cover member 1T, and the upper cover member 1U are not required to be removed with the image pickup unit 2 attached to the camera body 1.

In the camera body 1 (imaging apparatus) of the embodiment 3, the forced unlocking protrusion section 25f (the second unlocking mechanism 24b), which is located further in the back through the communication opening 74d at the back wall of the battery storage space 74 as viewed from the battery cover 73 in an open state, needs to be manipulated to be turned in the unlocking manipulation direction, and thus accidental unlocking manipulation of the second unlocking mechanism 24b by a user can be securely prevented.

In the camera body 1 (imaging apparatus) of the embodiment 3, by utilizing the recess 1A for attaching the image pickup unit 2, a member such as a screw that contributes to improvement in rigidity can be provided at a position that cannot be visually recognized from the outside with the image pickup unit 2 attached to the camera body 1. Thus, the rigidity of the camera body 1 itself, and eventually of the imaging apparatus to which the image pickup unit 2 is attached can be easily improved without reducing its quality in appearance.

Also, in the above-mentioned embodiment 3, the battery cover 73 is utilized as an opening-and-closing mechanism that can be opened for turning manipulation of the second unlocking mechanism 24b in the unlocking manipulation direction; however the battery cover 73 may be replaced by a member provided freely openable and closable at an opening of the exterior member regardless of attachment of the image pickup unit 2 to the camera body 1. For example, the battery cover 73 may be replaced by a cover member (not shown) to cover a connection terminal for connecting a USB or AV cable (see reference numeral 77 in FIGS. 43 and 44), or may be a popup type strobe device 5x (see FIG. 1), and the invention is not limited to the embodiment 3.

Also, in the above-mentioned embodiment 3, the front cover member 1S, the rear cover member 1T, and the upper cover member 1U are attached to the camera body 1 with the locking screws to be screwed (arranged) in the wall surfaces included in the recess 1A in order to utilize the recess 1A; however the front cover member 1S, the rear cover member 1T, and the upper cover member 1U may be attached to the camera body 1 somehow, and the invention is not limited to the embodiment 3.

[Embodiment 4]

Figure 46:
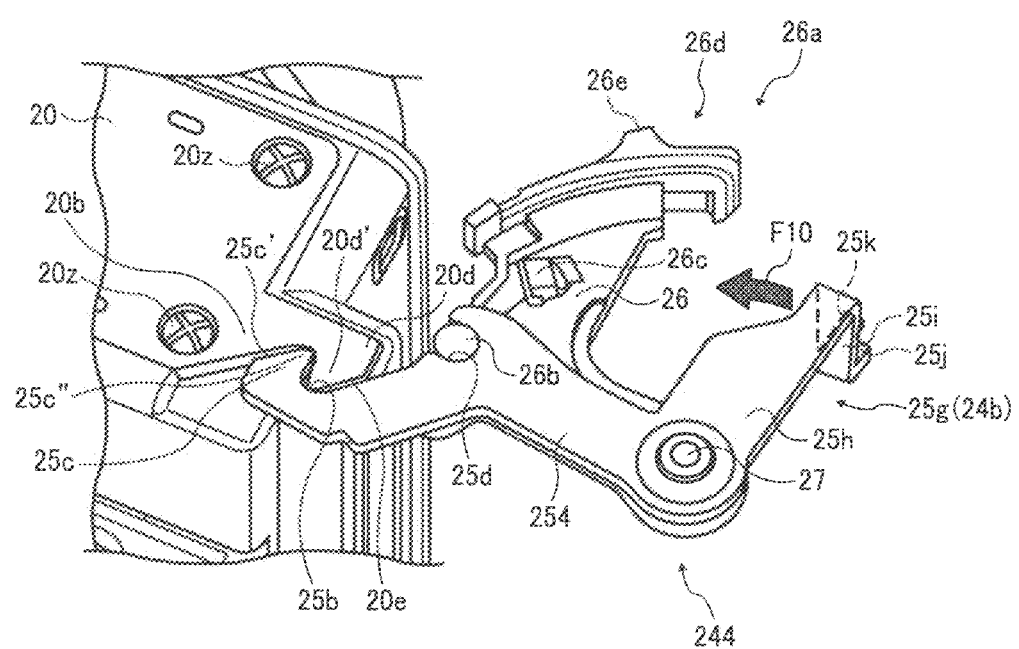
FIG. 46 is an explanatory diagram explaining a configuration of the locking mechanism according to an embodiment of the present invention similarly to FIG. 37.
Figure 46:
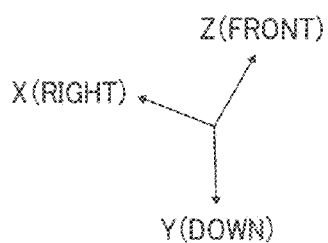
Figure 47:
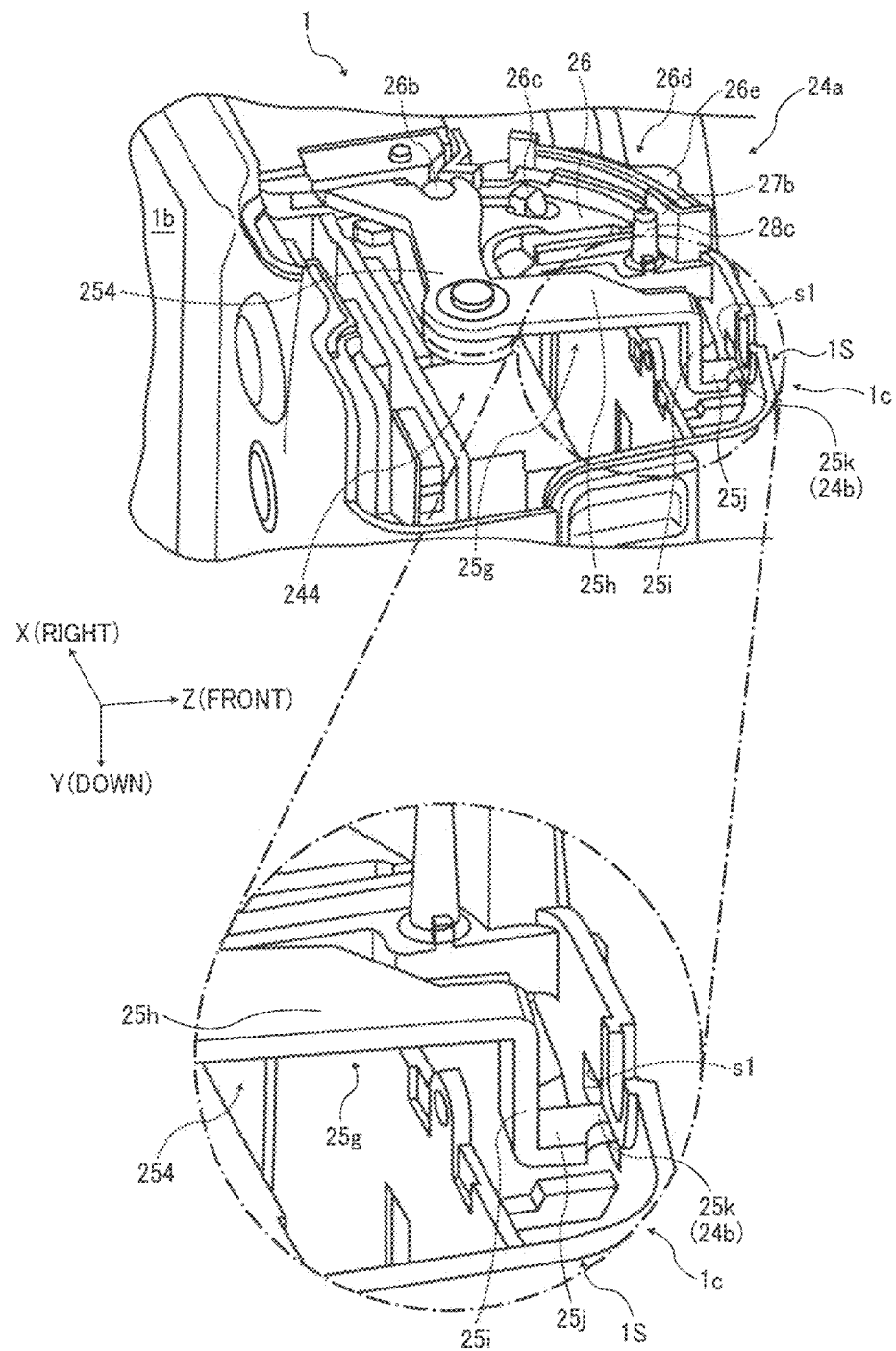
FIG. 47 is an explanatory diagram showing an upper surface (negative side in the Y direction) of a grip section of the camera body by omitting the upper cover member and explaining a configuration of the locking mechanism of an embodiment of the present invention and enlargedly showing a main part thereof.
Figure 48:
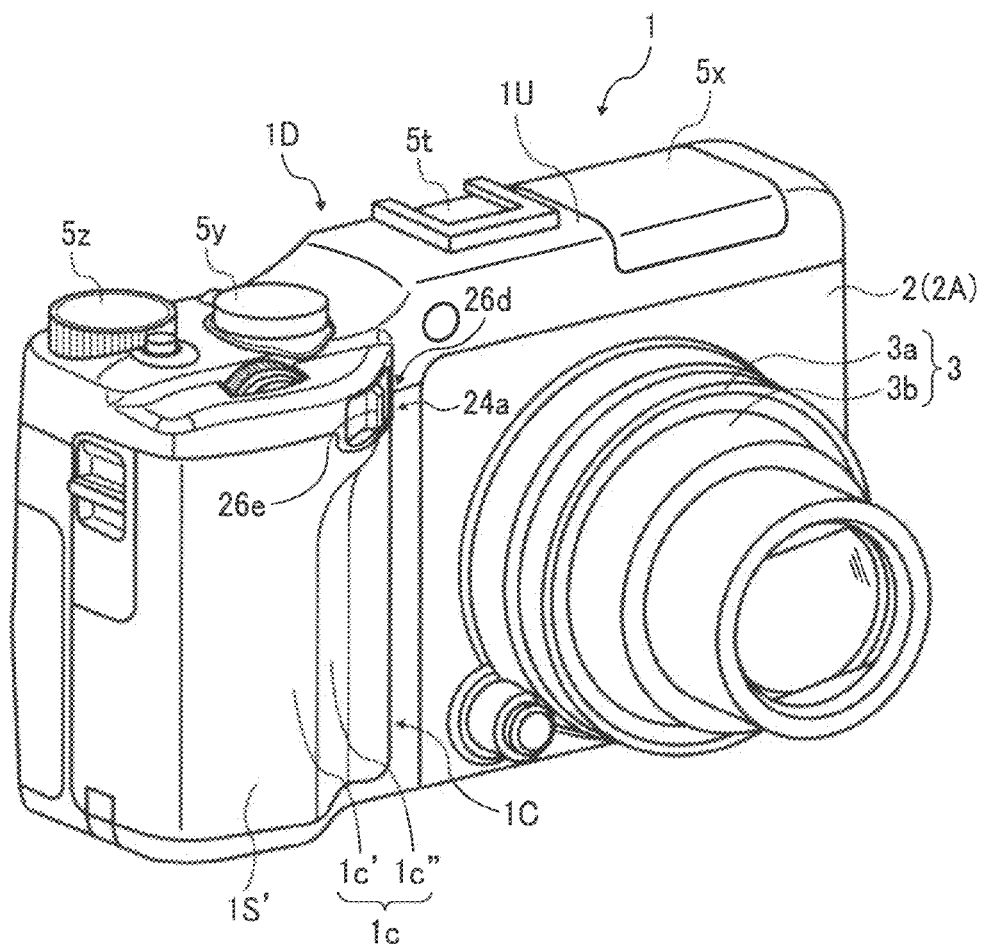
FIG. 48 is an explanatory diagram showing a state where a grip member is attached to a surface of the front cover member and explaining the locking mechanism.
Figure 48:
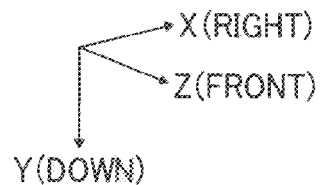
Figure 49:
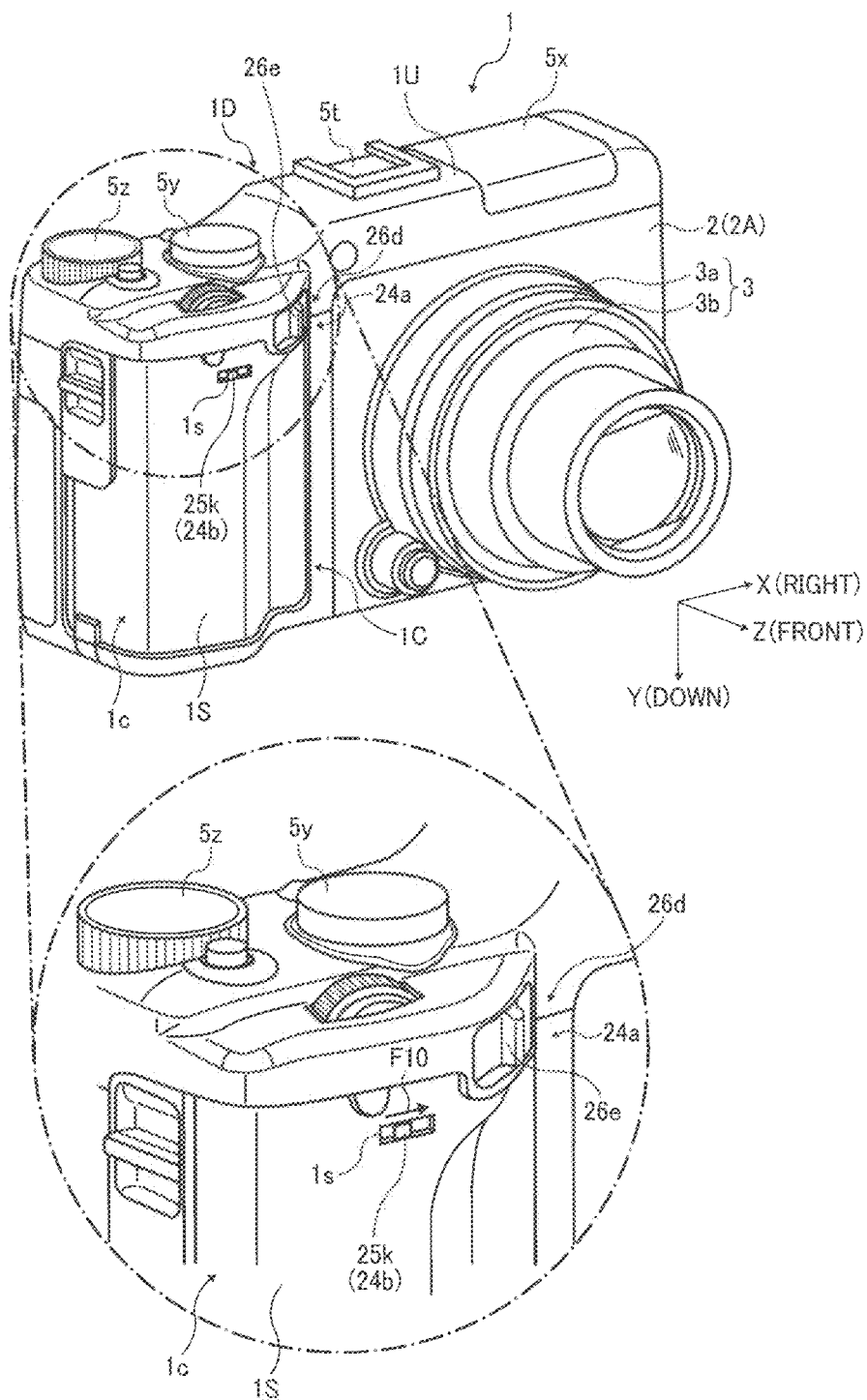
FIG. 49 is an explanatory diagram enlargedly showing a state where a grip member is removed from the surface of the front cover member and a main part thereof and explaining the locking mechanism.

Next, the camera body 1 (imaging apparatus) according to the embodiment 4 of the present invention is described. The embodiment 4 is an example with a different configuration for a forced unlocking of the locking mechanism 244 provided in the camera body 1. The camera body 1 (configuration for its attachment) and the image pickup unit 2 attached thereto of the embodiment 4 has a basic configuration similar to that of the above-mentioned camera body 1 and the image pickup unit 2 of the embodiment 1, and thus similar components are labeled with the same reference numerals, and their detailed descriptions are omitted. FIG. 46 is an explanatory view similar to FIG. 37 for illustrating the configuration of the locking mechanism 244 of the embodiment 4. FIG. 47 is an explanatory view showing the upper part of the grip section 1c of the camera body 1 (negative side in the Y direction) with its essential portion enlarged, and the upper cover member 1U omitted, for illustrating the configuration of the locking mechanism 244 of the embodiment 4. FIG. 48 is an explanatory view showing the camera body 1 where a grip member 1S' is affixed on the surface of the front cover member 1S for illustrating the configuration of the locking mechanism 244. FIG. 49 is an explanatory view showing the camera body 1 where the grip member 1S' is stripped off from the surface of the front cover member 1S, with its essential portion enlarged for illustrating the configuration of the locking mechanism 244.

As shown in FIG. 46, the locking mechanism 244 of the embodiment 4 has a different configuration (shape) of the locking plate 254 from that of the locking mechanism 24 of the embodiment 1 or that of the locking mechanism 243 of the embodiment 3. In the locking plate 254, a forced unlocking protrusion section 25g is provided instead of the forced unlocking protrusion section 25e at the middle position between the locking claw 25c and the fitting recess 25d, and the plate-shaped forced unlocking protrusion section 25f extending from the vicinity of the shaft hole 25a. The forced unlocking protrusion section 25g is provided extending from the vicinity of the shaft hole 25a to the front cover member 1S.

As shown in FIGS. 46 and 47, the forced unlocking protrusion section 25g includes an extending base section 25h that extends forward (positive side in the Z direction) from the vicinity of the shaft hole 25a, a downward extending section 25i that extends downward (positive side in the Y direction) from the tip end of the extending base section 25h, a forward extending section 25j that extends forward (positive side in the Z direction) from the lower end of the downward extending section 25i, and an insertion manipulation section 25k that extends forward (positive side in the Z direction) from the end of the forward extending section 25j, with a rod-shaped shape thinner than the forward extending section 25j. In a state where the spindle 27 is inserted through the shaft hole 25a of the locking plate 254, the forced unlocking protrusion section 25g is such that the insertion manipulation section 25k can be loosely fitted into a forced unlocking opening s1 of the front cover member 1S to be described later (see FIGS. 47 and 49), and the insertion manipulation section 25k has a length dimension so as not to protrude forward (positive side in the Z direction) from the forced unlocking opening s1. Also, the insertion manipulation section 25k has a minimum thickness dimension that can bear the biasing force (see an arrow F10 shown in FIG. 49) of unlocking manipulation which may be applied to turn the locking plate 254 in the unlocking manipulation direction. In the embodiment 4, the portion from the extending base section 25h to the forward extending section 25j of the forced unlocking protrusion section 25g is configured to be bent by the downward extending section 25i and the forward extending section 25j, and thus the forced unlocking protrusion section 25g does not interfere with a storage space (not shown) formed in the grip section 1c.

In the camera body 1 of the embodiment 4, a forced unlocking opening s1 is provided in the front cover member 1S (see FIGS. 47 and 49). In a state where the grip member 1S' is affixed on the surface of the front cover member 1S, the forced unlocking opening s1 is provided at a position so as to be covered by the grip member 1S' (see FIG. 48). As shown in FIG. 49, the forced unlocking opening s1 has a minimum dimension that allows the insertion manipulation section 25k to be loosely fitted thereinto as viewed in the up-and-down direction (the Y direction). Also, the forced unlocking opening s1 has a minimum dimension that allows movement of the insertion manipulation section 25k along with the turning of the locking plate 254 in its turning range as viewed from the direction following the appearance shape of the grip section 1c on the horizontal plane (the X-Z plane), as well as allows a rod-shaped member for unlocking manipulation (not shown) to be inserted at the left side (negative side in the X direction, and opposite side from the arrow F10 shown in FIG. 49) of the insertion manipulation section 25k when the locking mechanism 244 is in a locked state.

Because of such configuration, in the camera body 1 of the embodiment 4, turning manipulation can be performed in the unlocking manipulation direction by biasing the insertion manipulation section 25k loosely fitted in the forced unlocking opening s1 in the direction of the arrow F10 shown in FIG. 49. Thus, in the camera body 1 of the embodiment 4, although not shown, the front cover member 1S, the rear cover member 1T, and the upper cover member 1U are configured to be attached to the camera body 1 with the locking screws (for example, three locking screws 5f, two locking screws 6f, and eight locking screws 4f (see FIG. 5C)) to be screwed (arranged) in the wall surfaces included in the recess 1A in order to utilize the recess 1A provided in the front side of the camera body 1.

In the camera body 1 (imaging apparatus) of the embodiment 4, if the first unlocking mechanism 24a becomes inoperable, first, the grip member 1S' (see FIG. 48) affixed on the surface of the front cover member 1S of the camera body 1 is stripped off with the image pickup unit 2 attached (set) to the recess 1A. Then, as shown in FIG. 49, the forced unlocking opening s1 provided in the front cover member 1S is exposed. In the forced unlocking opening s1, a rod-shaped member for unlocking manipulation (not shown) is inserted into the left side of the insertion manipulation section 25k to bias the insertion manipulation section 25k to the right side (see the arrow F10) to turn the same in the unlocking manipulation direction. Then, the locking plate 254 is turned in the unlocking manipulation direction (F10 direction in FIG. 46) with the spindle 27 as a supporting point so that the locking claw 25c of the locking plate 254 is turned in a direction (backward) in which it retreats from the notch section 20c with the spindle 27 as a supporting point. This releases tight fitting (engagement) of the locking claw 25c with the to-be-locked claw 20d. That is to say, locking (locked state) of the image pickup unit 2 to the camera body 1 is released.

Here, since the forced unlocking protrusion section 25g (the insertion manipulation section 25k) has a configuration to form a part of the locking plate 254 formed of a sheet metal member (configuration in which a part of a sheet metal member forming the locking plate 254, which is a locking member, is extended integrally with the locking plate 254), the locking plate 254 can be forced to be turned in the unlocking manipulation direction (F10 direction in FIG. 46) regardless of a cause by which the first unlocking mechanism 24a is made inoperable, and thus the locked state of the locking mechanism 244 can be released. In this manner, the forced unlocking protrusion section 25g is placed so as to be exposed by removing a member fixed to an exterior member (the grip member 1S' in the embodiment 4) from the outside in cooperation with the locking plate 254 and the spindle 27, and thus serves as the second unlocking mechanism 24b that allows an unlocking manipulation from the outside to release the locked state of the locking mechanism 244 in a state where the member fixed to the exterior member is removed.

Later, the image pickup unit 2 can be detached from the camera body 1 similarly to the normal procedure described in the embodiment 1 for detaching the image pickup unit 2 from the camera body 1.

In this manner, in the camera body 1 (imaging apparatus) of the embodiment 4, even if an eventuality occurs to cause the first unlocking mechanism 24a to be inoperable, the image pickup unit 2 can be still detached from the camera body 1 by stripping off the grip member 1S' and manipulating the second unlocking mechanism 24b. That is to say, in the camera body 1 (imaging apparatus), the second unlocking mechanism 24b serves as a fail-safe mechanism to detach the image pickup unit 2, which can be freely attached to and detached from the camera body 1, and thus even if an eventuality occurs, the image pickup unit 2 can be detached from the camera body 1 by only stripping off the grip member 1S' without disassembling the camera body 1 or the image pickup unit 2.

Also, in the camera body 1 (imaging apparatus) of the embodiment 4, the grip member 1S' is attached from the outside of the exterior member, and thus the grip member 1S' can be detached from the camera body 1 even with the image pickup unit 2 attached (set) to the recess 1A. Thus, in the camera body 1 (imaging apparatus), the grip member 1S' can be utilized as an exposing function section, i.e., a covering member that is fixed from the outside of the exterior member regardless of attachment of the image pickup unit 2 to the camera body 1, and that covers an unlocking opening (the forced unlocking opening s1 in the embodiment 4) provided at an exterior member (the front cover member 1S in the embodiment 4) in order to allow turning manipulation of the second unlocking mechanism 24b in the unlocking manipulation direction.

Furthermore, in the camera body 1 (imaging apparatus) of the embodiment 4, the front cover member 1S, the rear cover member 1T, and the upper cover member 1U are attached to the camera body 1 with the locking screws (for example, three locking screws 5f, two locking screws 6f, and eight locking screws 4f' (see FIG. 5C)) to be screwed (arranged) in the wall surfaces included in the recess 1A in order to utilize the recess 1A, and thus the camera body 1 in a normal use state has a high quality in appearance because the locking screws are not visually recognized. This is because the grip member 1S' fixed from the outside of the exterior member is utilized as a covering member to cover the forced unlocking opening s1 provided at the front cover member 1S to allow turning manipulation of the second unlocking mechanism 24b in the unlocking manipulation direction regardless of attachment of the image pickup unit 2 to the camera body 1, and thus the front cover member 1S, the rear cover member 1T, and the upper cover member 1U are not required to be removed with the image pickup unit 2 attached to the camera body 1.

In the camera body 1 (imaging apparatus) of the embodiment 4, the forced unlocking opening s1 provided at the front cover member 1S to allow turning manipulation of the second unlocking mechanism 24b in the unlocking manipulation direction has an extremely small dimension, and thus uncomfortable feeling of a user when the user grips the grip section 1c over the grip member 1S' can be prevented. This is because the insertion manipulation section 25k has a minimum thickness dimension that can bear the biasing force (see the arrow F10 shown in FIG. 49) of unlocking manipulation which may be applied to turn the locking plate 254 in the unlocking manipulation direction, and because the forced unlocking opening s1 has a minimum dimension that allows the insertion manipulation section 25k to be loosely fitted thereinto, allows movement of the insertion manipulation section 25k along with the turning of the locking plate 254 in its turning range, as well as allows a rod-shaped member for unlocking manipulation (not shown) to be inserted at the left side of the insertion manipulation section 25k when the locking mechanism 244 is in a locked state.

In the camera body 1 (imaging apparatus) of the embodiment 4, in a state where the spindle 27 is inserted through the shaft hole 25a of the locking plate 254, the forced unlocking protrusion section 25g is such that the insertion manipulation section 25k loosely fitted into the opening (the forced unlocking opening s1) provided at the exterior member (the front cover member 1S) has a length dimension so as not to protrude forward of the opening. Thus uncomfortable feeling of a user when the user grips the grip section 1c over the grip member 1S' can be prevented, while the grip member 1S', whose specification is not provided with a configuration for the second unlocking mechanism 24b, can be utilized as a covering member to cover the forced unlocking opening s1.

In the camera body 1 (imaging apparatus) of the embodiment 4, the grip member 1S' fixed to the front cover member 1S needs to be stripped off to allow turning manipulation of the second unlocking mechanism 24b in the unlocking manipulation direction, and thus accidental unlocking manipulation of the second unlocking mechanism 24b by a user can be securely prevented.

In the camera body 1 (imaging apparatus) of the embodiment 4, by utilizing the recess 1A for attaching the image pickup unit 2, a member such as a screw that contributes to improvement in rigidity can be provided at a position that cannot be visually recognized from the outside with the image pickup unit 2 attached to the camera body 1. Thus, the rigidity of the camera body 1 itself, and eventually of the imaging apparatus to which the image pickup unit 2 is attached can be easily improved without reducing its quality in appearance.

In the above-mentioned embodiment 4, the grip member 1S' is utilized as a covering member to cover an unlocking opening (the forced unlocking opening s1 in the embodiment 4) provided at an exterior member (the front cover member 1S in the embodiment 4) in order to allow turning manipulation of the second unlocking mechanism 24b in the unlocking manipulation direction; however the grip member 1S' may be replaced by a member fixed from the outside of the exterior member regardless of attachment of the image pickup unit 2 to the camera body 1, for example, a license plate or a products logo nameplate (not shown), and the invention is not limited to the embodiment 4.

Also, in the above-mentioned embodiment 4, the front cover member 1S is the exterior member provided with an opening (the forced unlocking opening s1 in the embodiment 4) in order to allow turning manipulation of the second unlocking mechanism 24b in the unlocking manipulation direction; however the front cover member 1S may be replaced by a member fixed from the outside of the exterior member regardless of attachment of the image pickup unit 2 to the camera body 1, for example, the rear cover member 1T, or the upper cover member 1U, and the invention is not limited to the embodiment 4.

Furthermore, in the above-mentioned embodiment 4, the front cover member 1S, the rear cover member 1T, and the upper cover member 1U are attached to the camera body 1 with the locking screws to be screwed (arranged) in the wall surfaces included in the recess 1A in order to utilize the recess 1A, however the front cover member 1S, the rear cover member 1T, and the upper cover member 1U may be attached to the camera body 1 somehow, and the invention is not limited to the embodiment 4.

In each of the above-mentioned embodiments, the locking mechanism 24 is configured to have the locking plate 25 (253, 254) and the unlocking manipulating member 26 that freely turn around the spindle 27; however the locking mechanism 24 may be replaced by a mechanism that serves a function to lock the image pickup unit 2 in cooperation with a to-be-locked member provided in the image pickup unit 2 (the to-be-locked claw 20d in each of the above-mentioned embodiments) in order to prevent the image pickup unit 2 attached to the recess 1A from detaching therefrom, and a locking plate or an unlocking manipulating member with a different shape or configuration may be used for the mechanism, and the invention is not limited to each of the above-mentioned embodiments. Here, it is desirable that the second unlocking mechanism 24b (the forced unlocking protrusions 25e, 25f, 25g) is integrally formed with a member same as the locking member (the locking plates 25, 253, 254) that is directly engaged with a to-be-locked member (the to-be-locked claw 20d in each of the above-mentioned embodiments) provided in the image pickup unit 2.

Also, in each of the above-mentioned embodiments, the recess 1A for attaching the image pickup unit 2 is configured by the back wall section 1B, the side wall section 1C, and the upper wall section 1D that are integrally formed, however the recess 1A may be configured such that the image pickup unit is attachable thereto and detachable therefrom, and the invention is not limited to each of the above-mentioned embodiments. In addition, a configuration of a guide mechanism to an attachment position (the recess 1A in each of the above-mentioned embodiments) of the image pickup unit, a configuration of the locking mechanism to control the movement of the image pickup unit in the attachment direction with respect to the camera body, a configuration for unlocking a locked state by the locking mechanism, or the like may be the one with an equivalent function, and the invention is not limited to each of the above-mentioned embodiments.

Furthermore, in each of the above-mentioned embodiments, in the recess 1A for attaching the image pickup unit 2, the side wall section 1C is provided with the side wall surface reinforcing sheet metal member for body 6, and the upper wall section 1D is provided with the upper wall surface reinforcing sheet metal member for body 5; however both or either one of the side wall surface reinforcing sheet metal member for body 6 and the upper wall surface reinforcing sheet metal member for body 5 may not be provided, and the invention is not limited to each of the above-mentioned embodiments. Here, the back wall surface reinforcing sheet metal member for body 4 forms a guide mechanism for the camera body side, and thus needs to be provided. However, in other words, if the guide mechanism for the camera body side is not formed (for example, if the guide mechanism for the camera body side is formed by the upper wall surface reinforcing sheet metal member for body 5), the back wall surface reinforcing sheet metal member for body 4 may not be provided.

(Configuration of the Imaging Apparatus in which a Guiding Hole 10h is Formed in the Rear Wall Surface Reinforcing Sheet Metal Member for Body 4 and the Engaging Protrusion 4g is Provided in the Rear Wall Reinforcing Sheet Metal Member for Unit 10)

Figure 50:
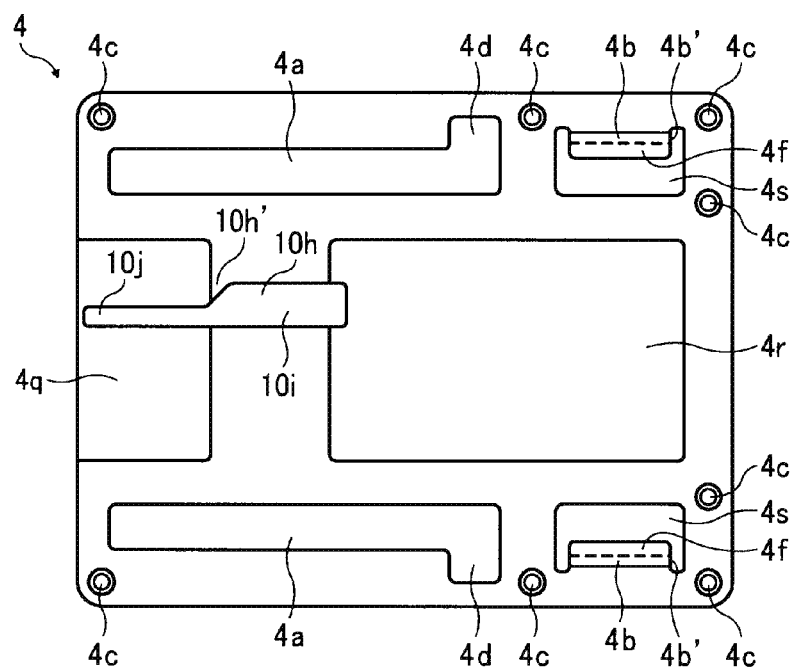
FIG. 50 is a plan view in which an engaging protrusion guiding hole is formed on the rear wall reinforcing sheet metal member for body shown in FIG. 7A.
Figure 51:
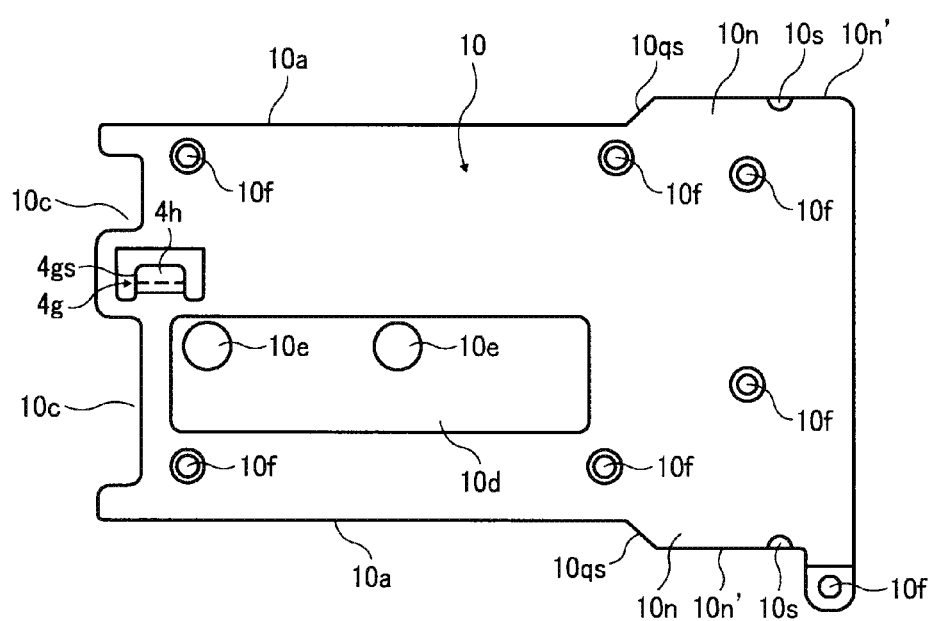
FIG. 51 is a plan view in which an engaging protrusion is formed on the rear wall reinforcing sheet metal member for unit shown in FIG. 11B.
Figure 52:
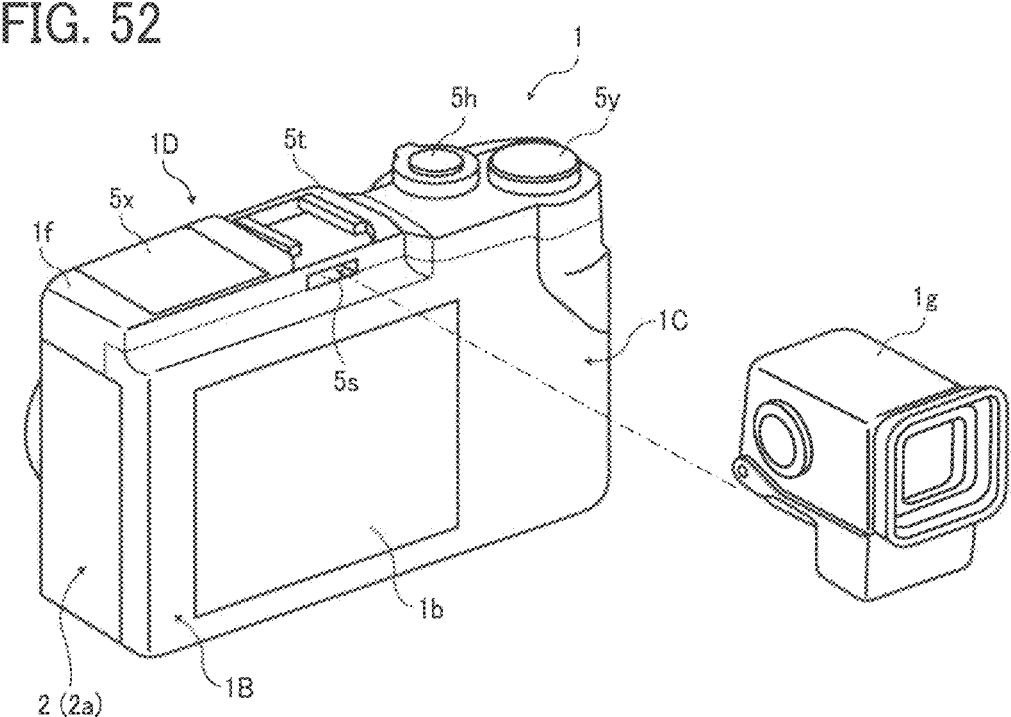
FIG. 52 is an external view showing a state before an electronic viewfinder is attached to the camera body, as viewed from the rear side.

In each of the embodiments described above, as enlarged and shown in FIG. 7C, the engaging protrusion 4g is formed in the rear wall surface reinforcing sheet metal member for body 4 of the camera body 1 and the guiding hole 10h which guides the engaging protrusion 4g is formed in the rear wall reinforcing sheet metal member for unit 10 of the image pickup unit 2 as shown in FIG. 11C. However, even a configuration in which the guiding hole 10h is formed in the rear wall surface reinforcing sheet metal member for body 4 of the camera body 1 as shown in FIG. 50 and in which the engaging protrusion 4g is formed in the rear wall reinforcing sheet metal member for unit 10 of the image pickup unit 2 as shown in FIG. 51 also achieves a similar effect.

(Other Configuration 1)

In these embodiments described above, although the configuration is such that the guiding protrusion section 4j is provided in the camera body 1 and the guiding protrusion entry allowing hole 10p is provided in the image pickup unit 2, a configuration may be such that the guiding protrusion entry allowing hole 10p is provided in the camera body 1 and the guiding protrusion section 4j is provided in the image pickup unit 2. Note that, in this case, the engaging claw 4b is formed in the image pickup unit 2.

In addition, in these embodiments, although the engaging plate section 10n, the plate spring 2K, and the guiding hole for engaging claw cut and bent section 10r are provided in the image pickup unit 2 and the engaging claw 4b is provided in the camera body 1, a configuration may be such that the engaging claw 4b is provided in the image pickup unit 2, the engaging plate section 10n, the plate spring 2K, and the guiding hole for engaging claw cut and bent section 10r are provided in the camera body 1.

Furthermore, in these embodiments, although the auxiliary fitting protrusions 14 are provided in the camera body 1 and the auxiliary fitting holes 22 are provided in the image pickup unit 2, a configuration may be such that the auxiliary fitting holes 22 are provided in the camera body 1 and the auxiliary fitting protrusions 14 are provided in the image pickup unit 2.

In addition, in these embodiments, each two of the guiding holes for engaging claw cut and bent sections 10r, guiding protrusion sections 4j, the engaging plate sections 10n, the guiding protrusion entry allowing holes 10p, the auxiliary fitting protrusions 14, and the auxiliary fitting holes 22 are provided, and two biasing sections including the inclined elastic plate sections k5, k6 and the abutting plate section k7 are formed for one plate spring 2K. However, the number of these may be three or more.

In addition, in these embodiments, although the unlocking manipulating member 26 is configured so that the unlock button 26d (also referred to as an unlocking lever) turns with the spindle 27 as a supporting point, the unlock button 26d may be configured to be a pushbutton or sliding type.

Furthermore, in these embodiments, although the configuration is such that the image-pickup-unit connector section 11 protrudes from the left side surface 2c of the image pickup unit 2 and the camera-body connector section 12 is provided in the opening 52 formed on the side wall section 1C of the camera body 1, a configuration may be such that the opening 52 is provided on the left side surface 2c of the image pickup unit 2, the image-pickup-unit connector section 11 is placed in the opening 52, and the camera-body connector section 12 is protruded from the side wall section 1C of the camera body 1.

That is to say, the connector section may protrude from any one of the left side surface 2c of the image pickup unit 2 and the side wall section 1C of the camera body 1, and the opening may be provided in any other one of the left side surface 2c of the image pickup unit 2 and the side wall section 1C of the camera body 1.

In addition, if the engaging protrusion (angle controlling member) 4g is placed between the side wall section 1C and the biasing section with the image pickup unit 2 placed in the recess 1A of the camera body 1 and with the camera-body connector section 12 and the image-pickup-unit connector section 11 connected to each other, an angle around the direction (the Y direction) orthogonal to the first direction can be controlled even when the height of the engaging protrusion (angle controlling member) 4g is low.

In addition, even if the engaging protrusion (angle controlling member) 4g is placed at a position closer to the side wall section 1C than to the biasing section with the image pickup unit 2 placed in the recess 1A of the camera body 1 and with the camera-body connector section 12 and the image-pickup-unit connector section 11 connected to each other, the engaging protrusion (angle controlling member) 4g can perform similar angle control.

If the engaging protrusion (angle controlling member) 4g is placed almost at the center of the camera-body connector section 12 when it is viewed in a direction (Y direction) perpendicular to the first direction (the X direction) in which the image pickup unit 2 moves toward or away from the side wall section 1C, with the image pickup unit 2 placed in the recess 1A of the camera body 1 and with the camera-body connector section 12 and the image-pickup-unit connector section 11 connected to each other, the engaging protrusion (angle controlling member) 4g can control an angle around the first direction (the X direction) of the image pickup unit 2.

If the engaging protrusion (angle controlling member) 4g is placed almost at the center of the recess 1A when it is viewed in the direction (the Y direction) perpendicular to the first direction (the X direction) in which the image pickup unit 2 moves toward or away from the side wall section 1C, with the image pickup unit 2 placed in the recess 1A of the camera body 1 and with the camera-body connector section 12 and the image-pickup-unit connector section 11 connected to each other, the engaging protrusion (angle controlling member) 4g can further control an angle around the first direction (the X direction) of the image pickup unit 2.

When the biasing section includes a first biasing section (any one of the engaging claws 4b, 4b) and a second biasing section (any other one of the engaging claws 4b, 4b) arranged at an interval in a direction perpendicular to the first direction (the X direction) in which the image pickup unit 2 moves toward or away from the side wall section 1C, and the engaging protrusion (angle controlling member) 4g is placed almost at the center between the first engaging claw 4b and the second engaging claw 4b when it is viewed in the direction (the Y direction) almost perpendicular to the first direction (the X direction), an angle around the first direction (the X direction) of the image pickup unit 2 can be further controlled even when a failure occurs in any one of engagement with the first engaging claw 4b and engagement with the second engaging claw 4b.

In a state where the guiding mechanism includes the camera-body guiding mechanism and the image-pickup-unit guiding mechanism, the image-pickup-unit guiding mechanism includes the guiding groove provided on the rear part 2b of the image pickup unit 2 and extending in a direction corresponding to the first direction, the camera-body guiding mechanism includes the guiding protrusion provided on the back wall section 1B of the camera body 1 and to be inserted in the guiding groove, the guide protrusion includes the first guiding protrusion and the second guiding protrusion arranged at an interval in a direction perpendicular to the first direction, the image pickup unit 2 is placed in the recess 1A of the camera body 1, and the camera-body connector section 12 and the image-pickup-unit connector section 11 are connected to each other, the engaging protrusion (angle controlling member) 4g is positioned between the first guiding protrusion and the second guiding protrusion when it is viewed in a direction perpendicular to the first direction.

(Other Configuration 2)

In the embodiments of the present invention described above, when the image pickup unit 2 is moved to the camera body 1 in the arrow F2 direction shown in FIG. 33 or in a direction opposite thereto, although the configuration is such that the rear part 2b (rear wall surface reinforcing sheet metal member for unit 10) of the image pickup unit 2 is caused to abut on the back wall section 1B (rear wall surface reinforcing sheet metal member for body 4) of the camera body 1 and to slide, a configuration may be such that the upper wall section 1D (upper wall surface reinforcing sheet metal member for body 5) of the camera body 1 is caused to abut on the upper surface 2d (surrounding wall 2x or upper wall surface reinforcing sheet metal member for image pickup unit 20) of the housing 2A of the image pickup unit 2 and to slide in the arrow F2 direction or in an direction opposite thereto.

With such a configuration, the upper wall section 1D (upper wall surface reinforcing sheet metal member for body 5) of the camera body 1 and the upper surface 2d (surrounding wall 2x or upper wall surface reinforcing sheet metal member for unit 20) of the housing 2A of the image pickup unit 2 function as a guiding mechanism which guides the image pickup unit 2 in the first direction.

Alternatively, the guiding protrusion section 4j, the rectangular stopper protrusion 4m and the engaging claw 4b may be provided on the upper wall section 1D of the camera body 1, and the guiding protrusion entry allowing hole 10p, the notch wall 10b, the engaging claw entry allowing hole 10q and the guiding hole for engaging claw cut and bent section 10r may be provided on the upper surface 2d of the housing 2A.

With such a configuration, the guiding protrusion section 4j, the rectangular stopper protrusion 4m and the engaging claw 4b which are provided on the upper wall section 1D of the camera body 1, the guiding protrusion entry allowing holes 10p provided on the upper surface 2d of the image pickup unit 2, the notch wall 10b, the engaging claw entry allowing hole 10q, and the guiding hole for engaging claw cut and bent section 10r function as a guiding mechanism which guides the image pickup unit 2 in the first direction.

In addition, on the contrary, the guide protrusion section 4j, the rectangular stopper protrusion 4m and the engaging claw 4b may be provided on the upper surface 2d of the image pickup unit 2, and the guiding protrusion entry allowing holes 10p, the notch wall 10b, the engaging claw entry allowing hole 10q, and the guiding hole for engaging claw cut and bent section 10r may be provided on the upper wall section 1D of the camera body 1.

With such a configuration, the guiding protrusion section 4j, the rectangular stopper protrusion 4m and the engaging claw 4b which are provided on the upper surface 2d of the image pickup unit 2, and the guiding protrusion entry allowing holes 10p, the notch wall 10b, the engaging claw entry allowing hole 10q, and the guiding hole for engaging claw cut and bent section 10r which are provided on the upper wall section 1D of the camera body 1 function as a guiding mechanism which guides the image pickup unit 2 in the first direction.

Thus, rattling in the up-down direction between the image pickup unit 2 and the camera body 1 can be further controlled by arranging a part of the guiding mechanism on the upper wall section 1D of the camera body 1 and the upper surface 2d of the image pickup unit 2.

Furthermore, the guiding mechanisms may be provided on both back wall section 1B and the upper wall section 1D.

(Other Configuration 3)

Although the embodiments of the present invention have been described above, the present invention is not limited to them. As shown in FIGS. 52 to 55, for example, a configuration may be such that the hot shoe section 5t to which the strobe device and the electronic viewfinder 1g can be attached, the electronic viewfinder connection terminal 5s, the popup type strobe light emitting section 5x, and a mode dial switch 5h are provided on an upper surface if of the upper wall section 1D of the camera body 1. In addition, the electronic viewfinder connection terminal 5s shown in FIG. 52 includes a female type connector. The electronic viewfinder connection terminal 5s' as the male type connector shown in FIG. 54 is fitted into the electronic viewfinder connection terminal 5s.

Figure 53:
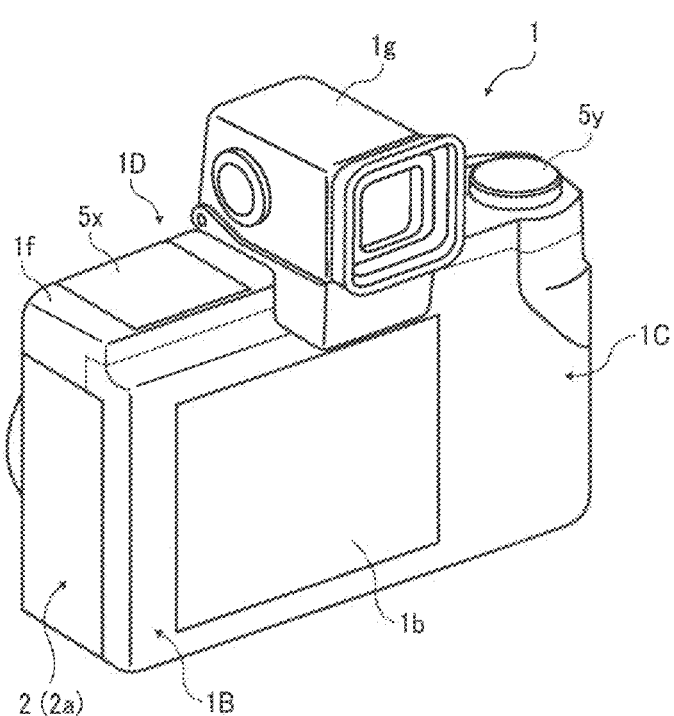
FIG. 53 is an external view showing a state where an electronic viewfinder is attached to the camera body, as viewed from the rear side.
Figure 54:
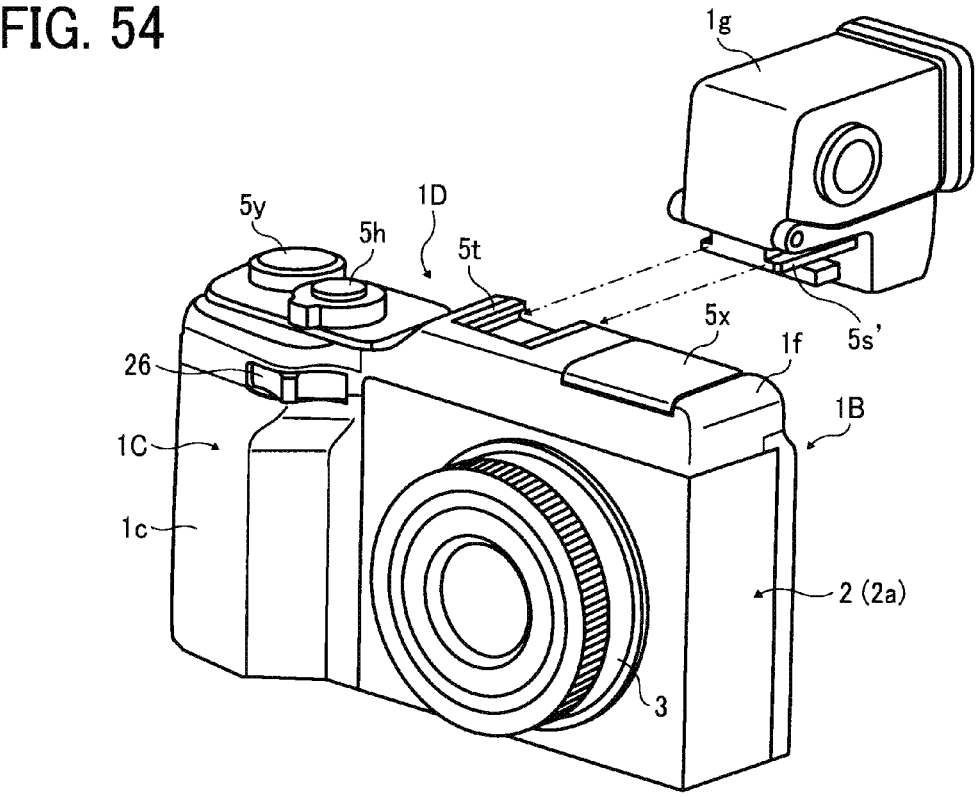
FIG. 54 is an external view showing a state before an electronic viewfinder is attached to the camera body, as viewed from the front side.
Figure 55:
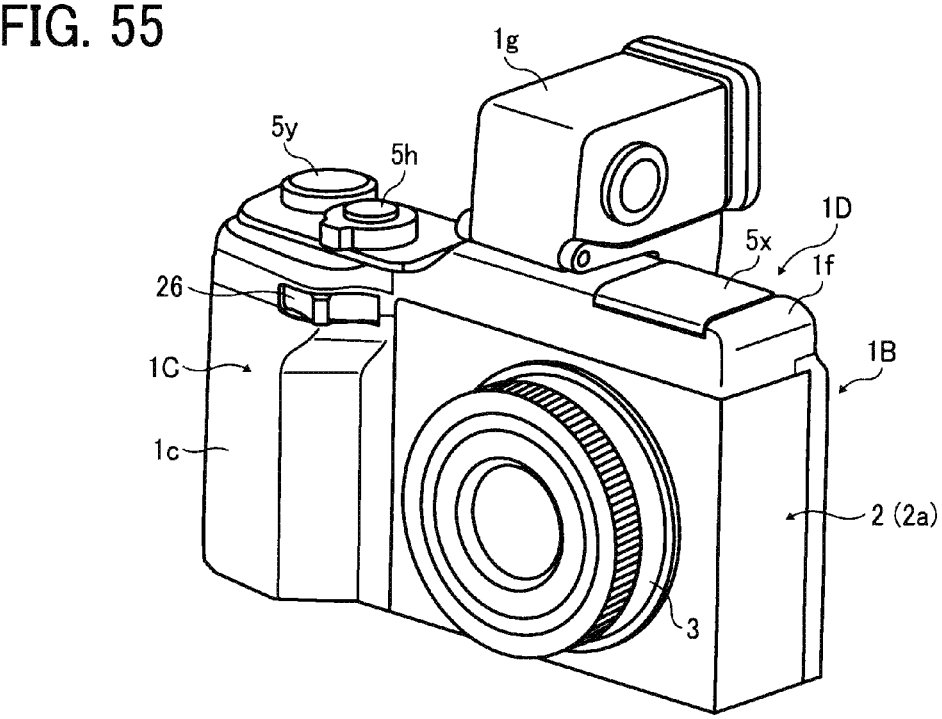
FIG. 55 is an external view showing a state where an electronic viewfinder is attached to the camera body, as viewed from the front side.

In addition, in FIGS. 52 to 55, FIG. 52 shows a state before the electronic viewfinder 1g is attached to the camera body 1 when the camera body 1 is viewed from the rear side, FIG. 53 shows a state where the electronic viewfinder 1g is attached to the camera body 1 when the camera body 1 is viewed from the rear side, FIG. 54 shows a state before the electronic viewfinder 1g is attached to the camera body 1 when the camera body 1 is viewed from the front face side, and FIG. 55 shows a state where the electronic viewfinder 1g is attached to the camera body 1 when the camera body 1 is viewed from the front face.

Although the embodiments have been described above, the imaging apparatus according to the present invention can be formed by combining the configurations of these embodiments as appropriate.

According to an embodiment of the present invention, the first unlocking mechanism exposed from the camera body can be utilized as a manipulation section for detaching the image pickup unit, while the image pickup unit locked to the camera body by a locking mechanism can be easily unlocked by manipulating the second unlocking mechanism even if an eventuality occurs to cause the first unlocking mechanism to be inoperable.

Also, according to the present invention, by utilizing a recess for attaching the image pickup unit, a member such as a screw that contributes to improvement in rigidity can be provided at a position that cannot be visually recognized from the outside with the image pickup unit attached to the camera body. Thus, compared with the camera body in a configuration other than image pickup unit exchange type (common imaging apparatus where an imaging optical system is integrally housed in its camera body, not intended to allow the image pickup unit to be attached/detached), the rigidity of the camera body itself, and eventually of the imaging apparatus to which the image pickup unit is attached can be easily improved. Now, since the member such as a screw that contributes to improvement in rigidity cannot be visually recognized from the outside with the image pickup unit attached to the camera body, reduction of the quality in appearance can be prevented even if the rigidity of the camera body itself, and eventually of the imaging apparatus to which the image pickup unit is attached is increased.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. A camera body to which an image pickup unit is detachably attached, the image pickup unit including an optical system configured to guide light incoming from a subject, an image pickup device configured to convert a subject image formed by light guided by the optical system into an electrical signal, and an image-pickup-unit connector section configured to perform communication with an outside, the camera body comprising:
    a recess to which the image pickup unit is freely detachably attached and which includes a back wall section, an upper wall section, and a side wall section to be opened on a lower side, a lateral side, and a front side of the camera body, the back wall section facing a rear of the image pickup unit when viewed from an image-pickup-unit side, the upper wall section being connected to the back wall section and located on an upper side of the camera body in a normal use state, and the side wall section being connected to the back wall section and the upper wall section;
    a locking mechanism placed in the recess in a direction in which the image pickup unit moves away from the side wall section and including a locking member that rotates around a spindle, the locking mechanism configured to control a movement of the image pickup unit;
    a first unlocking mechanism provided to be exposed from the camera body and configured to unlock a locked state made by the locking mechanism in response to a first unlocking manipulation; and
    a second unlocking mechanism provided to be enclosed inside the camera body and including a protrusion extending inside the camera body from a portion of the locking member, the protrusion configured to rotate the locking member around the spindle to unlock the locked state made by the locking mechanism in response to a second unlocking manipulation.

2. The camera body according to claim 1, further comprising an exposing function section configured to expose the second unlocking mechanism to allow the second unlocking manipulation in a state where the image pickup unit is attached to the camera body.

3. The camera body according to claim 2, wherein the exposing function section is a part of an exterior member of the camera body.

4. The camera body according to claim 3, wherein the exterior member includes cover members including a front cover member which covers a front-surface side of the camera body, an upper cover member which covers an upper-surface side of the camera body, and a rear cover member which covers a rear-surface side of the camera body,
    wherein one of the cover members is set as the exposing function section, and
    wherein other cover members that are not set as the exposing function section are mounted on the camera body with a locking screw placed on a wall surface included in the recess.

5. The camera body according to claim 2, wherein the exterior member of the camera body is provided with an unlocking opening for the second unlocking manipulation, and
    wherein the exposing function section is a covering member which is fixed from the outside of the exterior member and which covers the unlocking opening.

6. The camera body according to claim 2, wherein the exposing function section is an opening-and-closing mechanism provided to an exterior member of the camera body in a freely openable and closable manner.

7. The camera body according to claim 6, further comprising cover members,
    wherein the exterior member includes a front cover member which covers a front-surface side of the camera body, an upper cover member which covers an upper-surface side of the camera body, and a rear cover member which covers a rear-surface side of the camera body, and wherein the cover members are each mounted on the camera body with a locking screw placed on a wall surface included in the recess.

8. The camera body according to claim 1, wherein the locking member engages with a to-be-locked member provided in the image pickup unit, and wherein the first unlocking mechanism and the second unlocking mechanism move the locking member via different paths in order to disengage the locking member from the to-be-locked member.

9. The camera body according to claim 8, wherein the second unlocking mechanism is formed integrally with the first unlocking mechanism by a connection between the protrusion and the portion of the locking member.

10. The camera body according to claim 8, wherein the locking member is placed at an intersecting portion between the side wall section and the upper wall section.

11. The camera body according to claim 1, wherein the locking member extends in the recess in the direction in which the image pickup unit moves away from the side wall section and engages a to-be-locked member of the image pickup unit within the recess in the locked state, wherein the to-be-locked member extends in a direction in which the image pickup unit moves toward the side wall section.

12. An imaging apparatus comprising:

an image pickup unit including an optical system configured to guide light incoming from a subject, an image pickup device configured to convert a subject image formed by the light guided by the optical system into an electrical signal, and an image-pickup-unit connector section configured to perform communication with an outside;

a camera body to which the image pickup unit is detachably attached, the camera body including a recess to which the image pickup unit is freely detachably attached and which includes a back wall section, an upper wall section and a side wall section to be opened on a lower side, a lateral side, and a front side of the camera body, the back wall section facing a rear of the image pickup unit when viewed from an image-pickup-unit side, an upper wall section being connected to the back wall section and located on the upper side in a normal use state, and a side wall section being connected to the back wall section and the upper wall section;

a locking mechanism placed in the recess in a direction in which the image pickup unit moves away from the side wall section and including a locking member that rotates around a spindle, the locking mechanism configured to control a movement of the image pickup unit;

a first unlocking mechanism provided to be exposed from the camera body and configured to unlock a locked state made by the locking mechanism in response to a first unlocking manipulation; and a second unlocking mechanism provided to be enclosed inside the camera body and including a protrusion extending inside the camera body from a portion of the locking member, the protrusion configured to rotate the locking member around the spindle to unlock the locked state made by the locking mechanism in response to a second unlocking manipulation.

13. A camera body to which an image pickup unit is detachably attached, the image pickup unit comprising an optical system configured to guide light incoming from a subject, an image pickup device configured to convert a subject image formed by the light guided by the optical system into an electrical signal, and an image-pickup-unit connector section configured to perform communication with an outside, the camera body comprising:

a locking mechanism including a locking member that rotates around a spindle, the locking mechanism configured to control a movement of the image pickup unit in a direction in which the image pickup unit moves away from the camera body, a first unlocking mechanism provided to be exposed from the camera body and configured to unlock a locked state made by the locking mechanism in response to a first unlocking manipulation, and a second unlocking mechanism provided to be enclosed inside the camera body and including a protrusion extending inside the camera body from a portion of the locking member, the protrusion configured to rotate the locking member around the spindle to unlock the locked state made by the locking mechanism in response to a second unlocking manipulation.

14. An imaging apparatus comprising:

the camera body according to claim 1, and an image pickup unit including an optical system configured to guide light incoming from a subject, an image pickup device configured to convert a subject image formed by the light guided by the optical system into an electrical signal, and an image-pickup-unit connector section configured to perform communication with outside.

* * * * *